US011809688B1

(12) United States Patent
Parasnis et al.

(10) Patent No.: US 11,809,688 B1
(45) Date of Patent: Nov. 7, 2023

(54) INTERACTIVE PROMPTING SYSTEM FOR MULTIMODAL PERSONALIZED CONTENT GENERATION

(71) Applicant: Typeface Inc., Los Altos, CA (US)

(72) Inventors: Abhay Parasnis, Los Altos, CA (US); Anish Pimpley, Los Altos, CA (US); Kang Chen, Los Altos, CA (US); Hari Srinivasan, Los Altos, CA (US); Jonathan Moreira, Los Altos, CA (US); Vishal Sood, Los Altos, CA (US); Yue Ning, Los Altos, CA (US)

(73) Assignee: Typeface Inc., Los Altos, CA (US)

( * ) Notice: Subject to any disclaimer, the term of this patent is extended or adjusted under 35 U.S.C. 154(b) by 0 days.

(21) Appl. No.: 18/203,524

(22) Filed: May 30, 2023

Related U.S. Application Data

(60) Provisional application No. 63/444,162, filed on Feb. 8, 2023.

(51) Int. Cl.
*G06F 3/0482* (2013.01)
*G06F 3/04812* (2022.01)
(Continued)

(52) U.S. Cl.
CPC ........ *G06F 3/0482* (2013.01); *G06F 3/04812* (2013.01); *G06F 40/103* (2020.01); *G06T 11/00* (2013.01); *G06T 2200/24* (2013.01)

(58) Field of Classification Search
CPC ............................................. G06F 3/048–05
See application file for complete search history.

(56) References Cited

U.S. PATENT DOCUMENTS 8,655,889 B2  2/2014  Hua et al.
8,717,367 B2  5/2014  Clifton et al.
(Continued)

FOREIGN PATENT DOCUMENTS

WO  2013075316  5/2013
WO  2023069561  4/2023

OTHER PUBLICATIONS

U.S. Appl. No. 18/203,534, Non Final Office Action dated Aug. 23, 2023.

(Continued)

*Primary Examiner* — Daniel Rodriguez
(74) *Attorney, Agent, or Firm* — Schwegman Lundberg & Woessner, P.A.

(57) ABSTRACT

Methods, systems, and computer programs are presented for providing a prompt tool with interactive entry. One method includes operations for providing a multimodal prompt tool for entering textual description of an item to be generated, and detecting an input that is one of a special character entered in the textual description or a mouse action requesting assistance. Furthermore, a menu is presented with options for the item to be generated, and a list of products, previously added to a data store, is obtained. Further, the method includes providing the list of products for selection; in response to a selection of a product from the list of products, including text associated with the selected product in the textual description; and detecting submittal of the textual description. Further, the textual description is entered as input to a generative artificial intelligence (GAI) tool, and causing presentation of items generated by the GAI tool.

20 Claims, 38 Drawing Sheets

(51) Int. Cl.
  *G06T 11/00* (2006.01)
  *G06F 40/103* (2020.01)

(56) References Cited

U.S. PATENT DOCUMENTS

| | | | |
|---|---|---|---|
| 9,411,830 | B2 | 8/2016 | Mei et al. |
| 10,268,669 | B1* | 4/2019 | Allen .................... G06F 3/0483 |
| 10,991,012 | B2 | 4/2021 | Balakrishnan et al. |
| 11,392,659 | B2 | 7/2022 | Jain et al. |
| 11,516,158 | B1 | 11/2022 | Luzhnica et al. |
| 11,550,884 | B2 | 1/2023 | Kumar et al. |
| 2012/0110432 | A1 | 5/2012 | Mei et al. |
| 2015/0112980 | A1* | 4/2015 | Sanio .................... G06F 16/532 |
| | | | 707/728 |
| 2016/0140622 | A1* | 5/2016 | Wang .................... G06Q 50/01 |
| | | | 705/14.66 |
| 2016/0314502 | A1 | 10/2016 | Lindsay et al. |
| 2017/0180443 | A1 | 6/2017 | Raichelgauz et al. |
| 2017/0206190 | A1 | 7/2017 | Satterfield et al. |
| 2019/0377460 | A1* | 12/2019 | Butcher ................. G06N 3/045 |
| 2020/0279008 | A1 | 9/2020 | Jain et al. |
| 2020/0285703 | A1 | 9/2020 | Ramachandra |
| 2020/0410552 | A1 | 12/2020 | Stohlman |
| 2021/0118012 | A1 | 4/2021 | Chung |
| 2022/0005235 | A1* | 1/2022 | Gou ...................... G06T 11/203 |
| 2022/0179899 | A1* | 6/2022 | Dong .................... G06F 16/538 |
| 2022/0244818 | A1* | 8/2022 | Strecher ................. G06F 9/451 |
| 2022/0301118 | A1 | 9/2022 | Frey et al. |
| 2022/0357914 | A1* | 11/2022 | Krishnamurthy ..... A63F 13/215 |
| 2022/0366435 | A1 | 11/2022 | Boatner et al. |
| 2022/0398379 | A1* | 12/2022 | Hou ....................... G06F 40/30 |
| 2022/0414320 | A1* | 12/2022 | Dolan .................... G06F 3/0481 |
| 2023/0005108 | A1 | 1/2023 | Gopalkrishna et al. |
| 2023/0021797 | A1 | 1/2023 | Gupta et al. |
| 2023/0104661 | A1* | 4/2023 | Wu ...................... G06Q 30/0276 |
| | | | 705/14.51 |
| 2023/0119466 | A1 | 4/2023 | Sjölander et al. |
| 2023/0186535 | A1* | 6/2023 | Malur Srinivasan ... G06T 11/00 |
| | | | 345/441 |
| 2023/0214583 | A1* | 7/2023 | Sawyer ................. G06F 40/284 |
| | | | 715/231 |
| 2023/0230198 | A1 | 7/2023 | Zhang et al. |
| 2023/0237980 | A1 | 7/2023 | Pajjuri et al. |

OTHER PUBLICATIONS

U.S. Appl. No. 18/203,537, Non Final Office Action dated Aug. 3, 2023.

Anyword, "Facebook Post Generator", from Nov. 26, 2022, available at: https://web.archive.org/web/20221126225805/https://anyword.com/facebook-post-generator/. Accessed Jul. 28, 23. 6 pages. (Year: 2022), 6 pgs.

Anyword, "Instagram Caption Generator", archived screenshot from Dec. 4, 2022, available at: https://web.archive.org/web/20221204212425/https://anyword.com/instagram-caption-generator/. Accessed Jul. 28, 23., 8 pgs.

Dutta, Debashri, "How to Write a Blog Post Outline in 8 Steps", https://web.archive.Org/web/20221206180953/https://dmdutta.com/how-to-write-a-blog-post-outline/, posted Oct. 3, 22, accessed Jul. 28, 2023. 13 pages. (Year: 2022), 13 pgs.

Gatt, Albert, et al., "Survey of the State of the Art in Natural Language Generation: Core tasks, applications and evaluation", Journal of Artificial Intelligence Research. Jan. 27, 2018;61:65-170. (Year: 2018), 106 pgs.

Lee, Young-Soul, et al., "Automatic Weblog Generation using Mobile Context", In Proceedings of the 7th International Conference on Advances in Mobile Computing and Multimedia Dec. 14, 2009 (pp. 622-626). (Year: 2009), 5 pgs.

Vasquez, Sean, et al., "MelNet: A Generative Model for Audio in the Frequency Domain", arXiv preprint arXiv:1906.01083. Jun. 4, 2019. (Year: 2019), 14 pgs.

Vincent, James, "All these images were generated by Google's latest text-to-image AI", The Verge. Vox Media.Retrieved Jul. 28, 2023. 7 pages. (Year: 2022), 8 pgs.

Wang et al., "Microblog hashtag generation via encoding conversation contexts.", arXiv preprint arXiv: 1905.07584. May 18, 2019. (Year: 2019), 10 pgs.

U.S. Appl. No. 18/203,530, Non Final Office Action dated Aug. 31, 2023.

* cited by examiner

GENERATE TEXT ⌄  ⊙ COMMANDS

PLEASE WRITE A TWO-PAGE BLOG POST ABOUT THE BENEFITS OF USING CONTRACT MANAGEMENT SOFTWARE. IN YOUR POST, DISCUSS HOW IT CAN HELP CREATE CONTRACTS WITH EASE, FACILITATE COLLABORATION AND NEGOTIATION, AUTOMATE CONTRACT WORKFLOWS, MANAGE CONTRACTS IN ONE PLACE, AND UNCOVER OPPORTUNITIES, RISKS AND TRENDS

% GENERATE

1004

WHEN IT COMES TO CREATING CONTRACTS, CONTRACT MANAGEMENT SOFTWARE CAN MAKE YOUR LIFE A WHOLE LOT EASIER. NOT ONLY CAN IT HELP YOU CREATE CONTRACTS WITH EASE, BUT IT CAN ALSO FACILITATE COLLABORATION AND NEGOTIATION, AUTOMATE CONTRACT WORKFLOWS, MANAGE CONTRACTS IN ONE PLACE, AND UNCOVER OPPORTUNITIES, RISKS AND TRENDS. HERE'S A CLOSER LOOK AT EACH OF THESE BENEFITS:

1. CREATING CONTRACTS WITH EASE WITH CONTRACT MANAGEMENT SOFTWARE, GONE ARE THE DAYS OF STRUGGLING TO CREATE CONTRACTS FROM SCRATCH. NOW, YOU CAN SIMPLY INPUT THE RELEVANT INFORMATION AND LET THE SOFTWARE DO THE REST. THIS NOT ONLY SAVES YOU TIME, BUT IT ALSO REDUCES THE RISK OF ERRORS.

≡ TEXT
☒ IMAGE

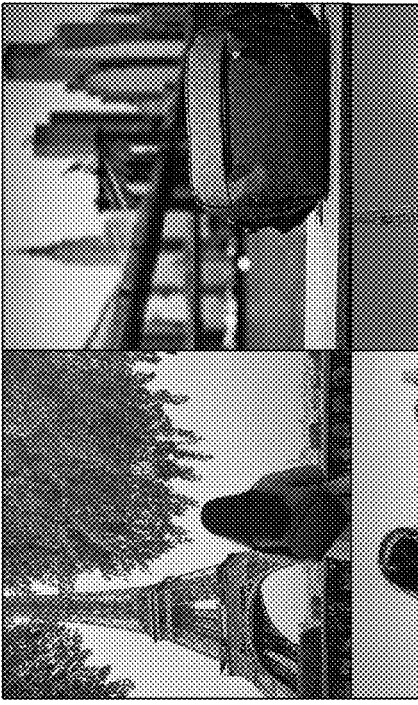
FIG. 12A

FIG. 13

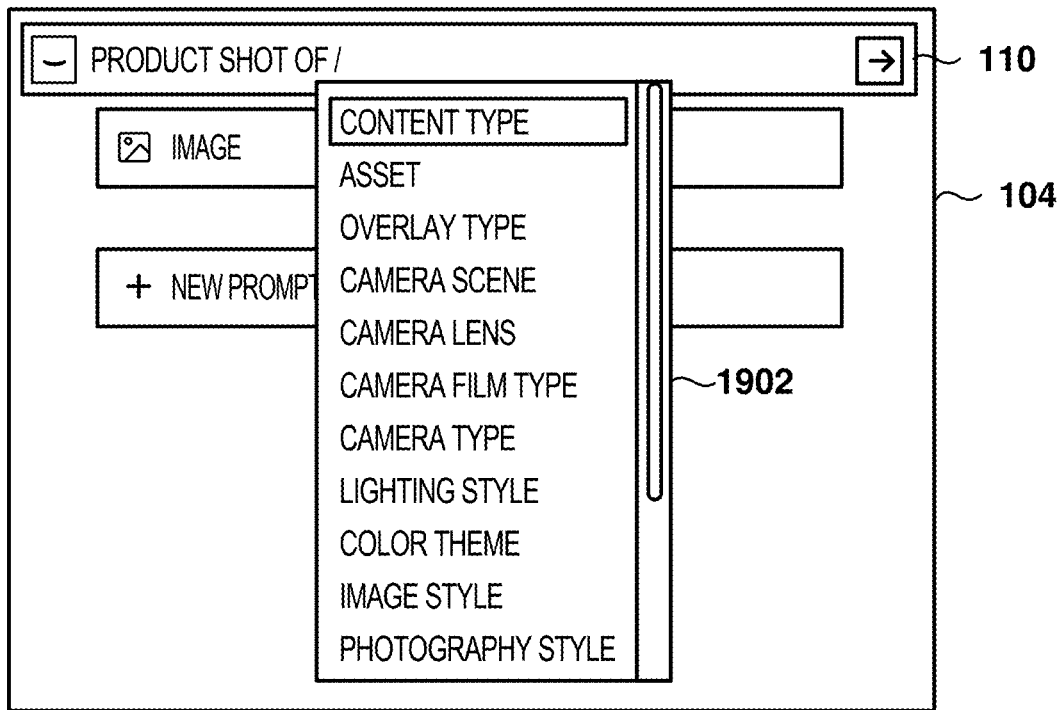
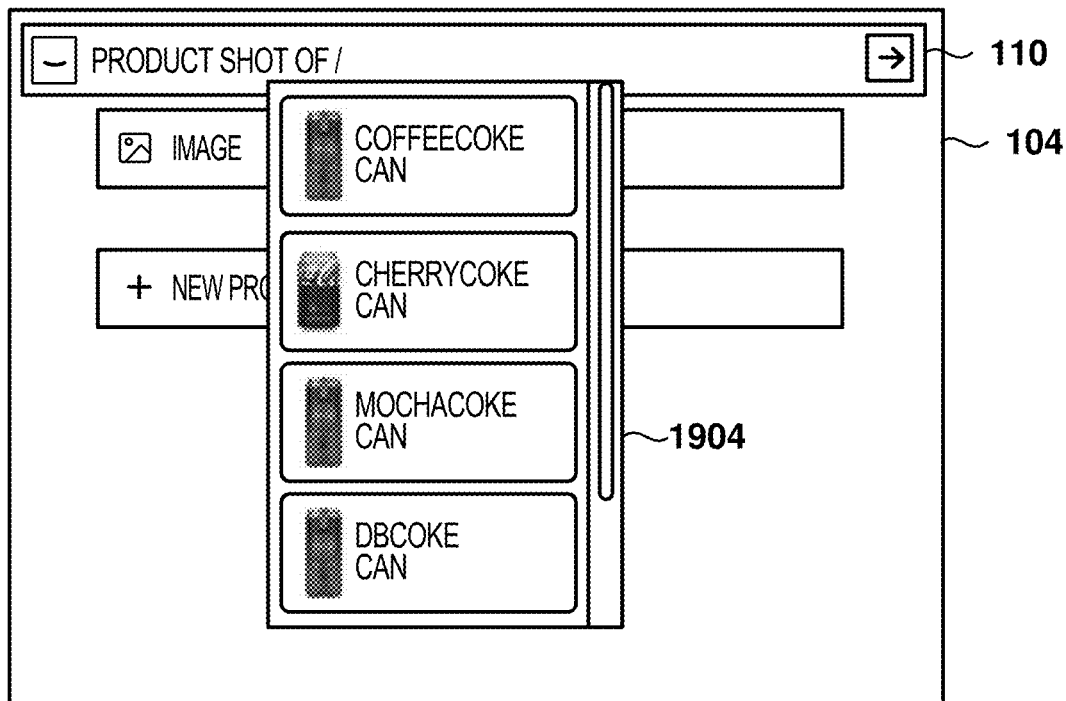
FIG. 19

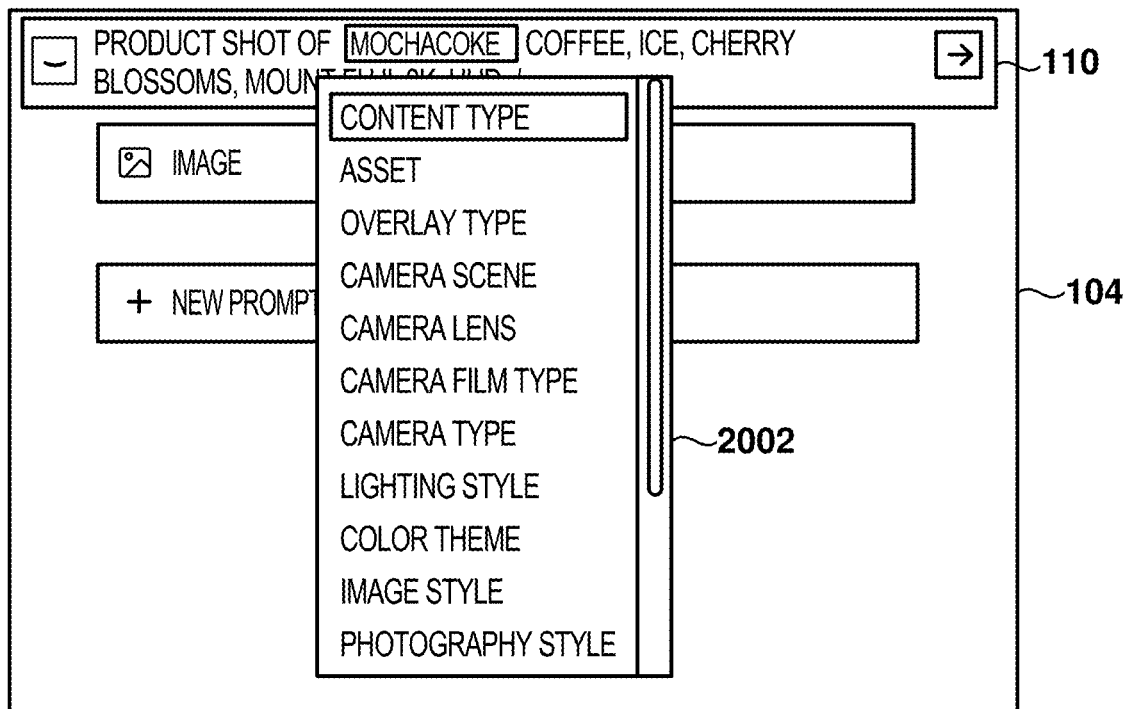
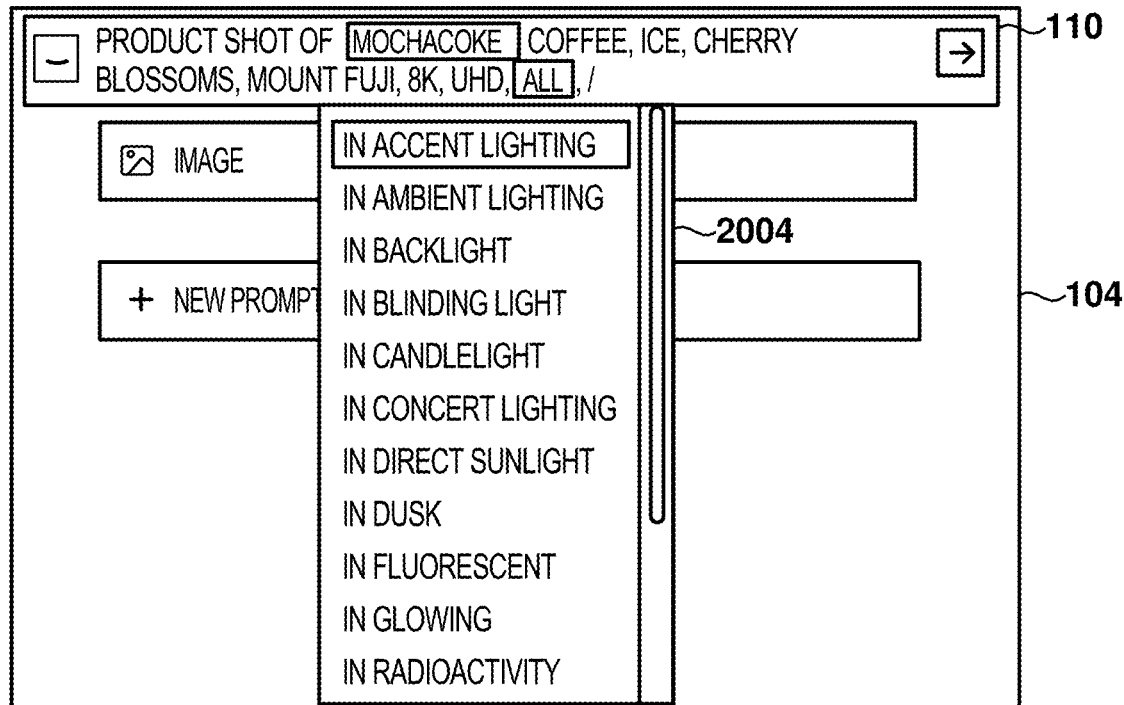
FIG. 20

GENERATED IMAGE WITH ASSET VIEW
FROM CATALOG
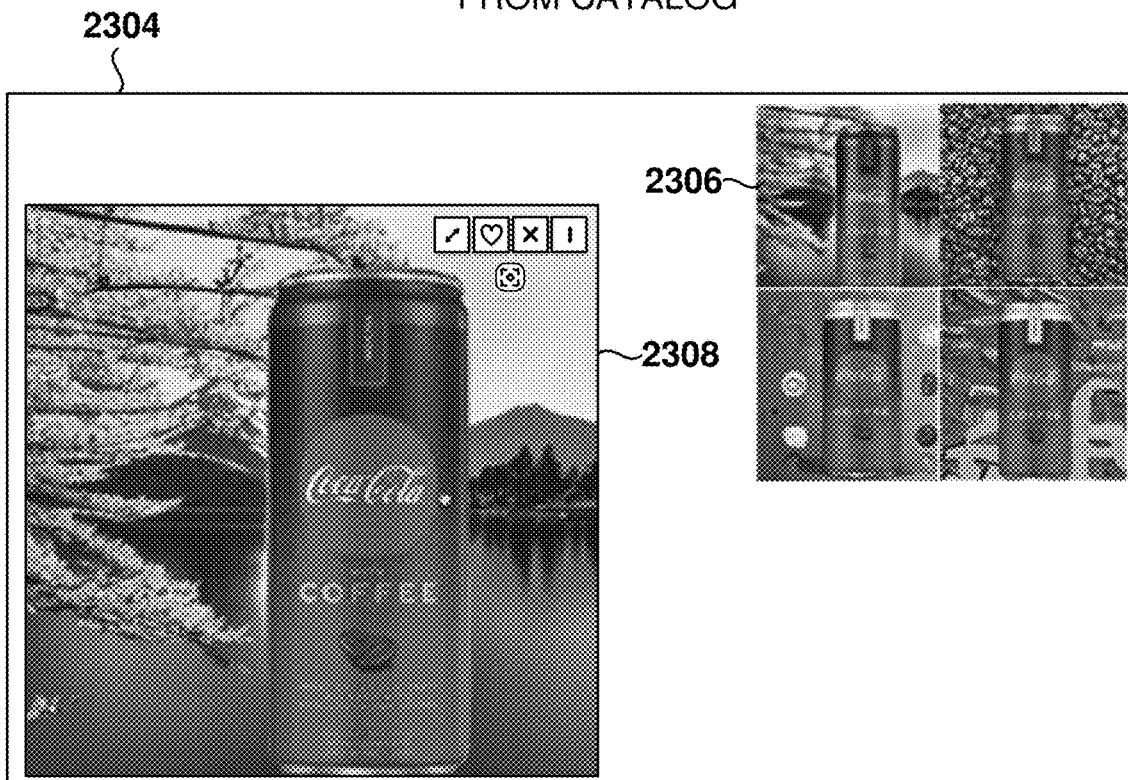
FIG. 23

INTERACTIVE PROMPTING SYSTEM FOR MULTIMODAL PERSONALIZED CONTENT GENERATION

CROSS-REFERENCE TO RELATED APPLICATIONS

This application claims the benefit of U.S. Provisional Patent No. 63/444,162, filed Feb. 8, 2023, and entitled "Multimodal Personalized Content Generation System." This provisional application is herein incorporated by reference in its entirety.

TECHNICAL FIELD

The subject matter disclosed herein generally relates to methods, systems, and machine-readable storage media for automatically generating content in multiple formats, such as text, images, video, voice, and audio, or a combination thereof.

BACKGROUND

Generative Artificial Intelligence (GAI) is one of the most promising advances in the field of Artificial Intelligence (AI) in recent times. GAI refers to an AI system that relies on unsupervised or semi-supervised learning algorithms to create new digital images, video, audio, and text. Through GAI, computers can learn fundamental patterns relevant to input, which enables them to output similar content.

Some users want to use GAI to generate content to help them with their tasks, such as generating marketing materials to place ads on social media. However, GAI systems may produce erroneous outputs (e.g., a distorted image of a product, garbled text) or low-quality outputs, so the users have to monitor GAI outputs and carefully edit materials before presenting the results to the world. Thus, the advantages of using GAI are reduced by the extra work needed to supervise and edit the generated content.

GAI performs well when dealing with general or universal concepts (e.g., car, shoe), but lacks knowledge regarding specific products or services (e.g., a particular car model, a particular shoe model). Thus, GAI often fails to produce content relevant to users' particular needs as GAI generally lacks understanding specific to the users' businesses and their voices.

BRIEF DESCRIPTION OF THE DRAWINGS

Various of the appended drawings merely illustrate example embodiments of the present disclosure and cannot be considered as limiting its scope.

FIG. 2 is a screenshot of multimodal content generated by the content-generation tool, according to some example embodiments.

FIG. 5 is a UI for the management of catalogs, according to some example embodiments.

FIG. 7 is UI for the management of projects, according to some example embodiments.

FIG. 11 illustrates the generation of text with the content-generation tool, according to some example embodiments.

FIG. 12A illustrates the generation of a blog post with the content-generation tool, according to some example embodiments.

FIG. 13 illustrates the options for regenerating content based on content present in the canvas, according to some example embodiments.

FIG. 19 illustrates the use of the prompt tool in the content-generation tool, according to some example embodiments.

FIG. 20 illustrates the use of the prompt tool in the content-generation tool, according to some example embodiments.

FIG. 23 illustrates the results of using the asset images in the generated content, according to some example embodiments.

DETAILED DESCRIPTION

Example methods, systems, and computer programs are directed to providing versatile tools for creating and managing multimodal content utilizing Generative Artificial Intelligence (GAI). Examples merely typify possible variations. Unless explicitly stated otherwise, components and functions are optional and may be combined or subdivided, and operations may vary in sequence or be combined or subdivided. In the following description, for purposes of explanation, numerous specific details are set forth to provide a thorough understanding of example embodiments. It will be evident to one skilled in the art, however, that the present subject matter may be practiced without these specific details.

In one aspect, a content-generation tool, also referred to as Typeface, is provided for generating high-quality, affinitized, multimodal (text, image, video, voice, audio) content. Affinitized means that the content is customized for the specific assets associated with the user, such as the images of products in their product line; that is, the GAI models used to generate the multimodal content are custom models tailored for each user and their assets of interest.

The content-generation tool provides a powerful and versatile interface for generating multimodal content, which means that the same user interface (UI) is used for generating any combination of text, images, videos, etc. Further, generated content may be used to generate additional content, such as generated text may be used to generate images for an advertisement.

Figure 1:
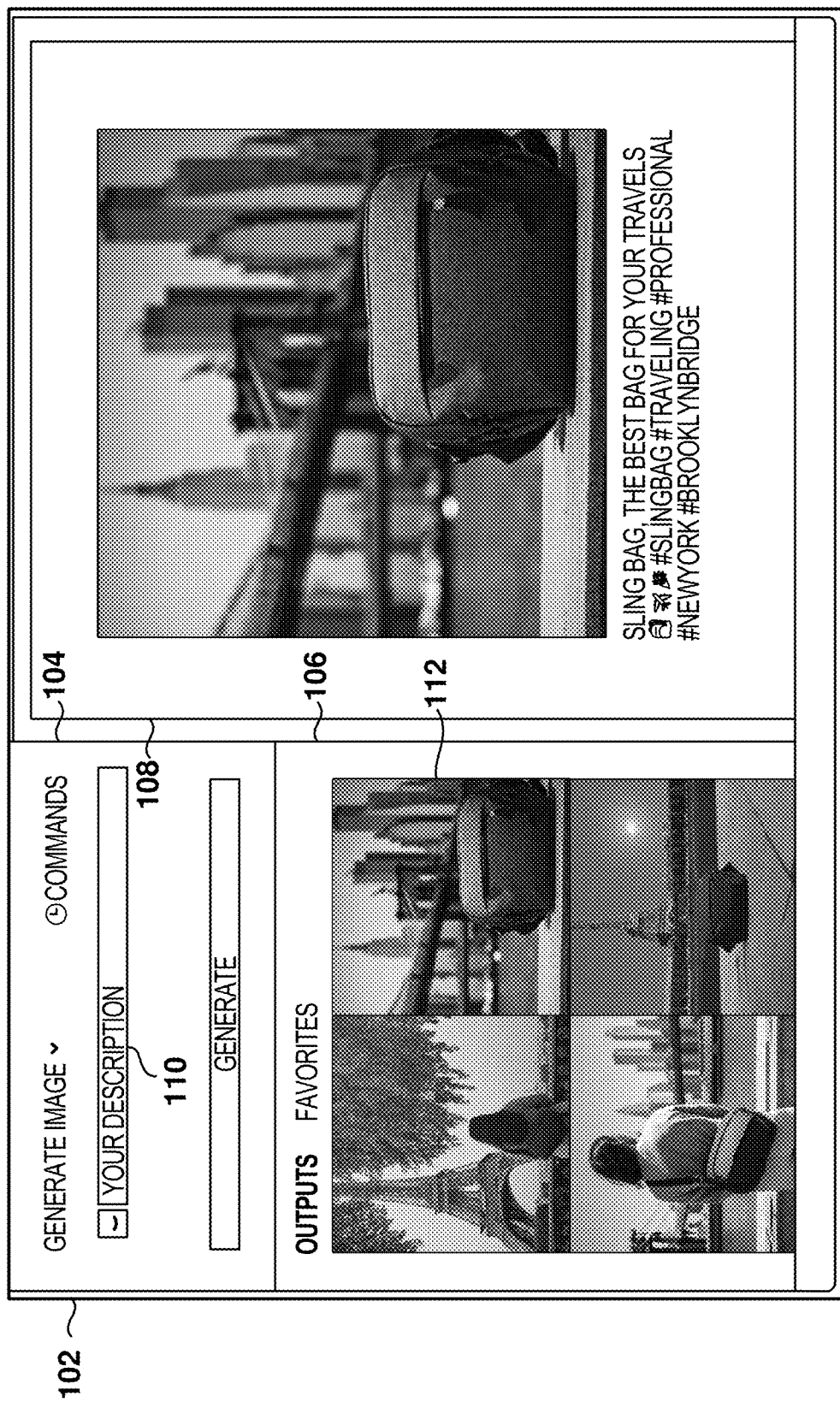
FIG. 1 is user interface (UI) for a canvas tool to generate multimodal content, according to some example embodiments.

FIG. 1 is UI 102 for a canvas tool, also referred to herein simply as canvas, to generate multimodal content, according to some example embodiments. The UI 102 includes a prompt panel 104, the canvas 108, and a variations panel 106.

The prompt panel 104 includes a prompt tool 110 for entering descriptive text for the desired results. The prompt tool 110 is more than a simple input field because the prompt tool 110 includes interactive tools for easy entering input, as described in more detail below with reference to FIGS. 14 and 19-20.

After an input is entered in the prompt tool 110, the content-generation tool generates results in the variations panel 106 with one or more options that can be selected by the user. The results are referred to herein as variations 112 or outputs. In the illustrated example, the input is for generating an image with certain characteristics and the variations panel 106 shows several variations 112. If the user selects one of the variations 112, the selection is then added to the canvas 108. Additional new inputs may be entered in the prompt tool 110 and new variations added to the canvas 108.

The content-generation tool is a platform that can generate multiple types of generative content that are customized for the user and the user's particular environment (e.g., assets, products, services, voice, style, company of the user). Further, a template-creation tool allows the user to create custom templates to extend and customize the content-generation tool using no-code options that are easy to use. The prompt tool 110 allows the user to express creative ideas naturally and seamlessly integrate with brand assets.

It is noted that embodiments are presented with reference to marketing-purpose outputs, but the same principles may be used in other environments, such as generation of documents, contracts, employee newsletters, manuals, instructions, etc. The presented embodiments should therefore not be interpreted to be exclusive or limiting, but rather illustrative.

GAI can create new content by utilizing existing text, audio files, or images. It enables computers to detect the underlying pattern related to the input to produce similar content. GAI may create this content using several techniques, such as Generative Adversarial Networks (GANs), transformers, and variational auto-encoders.

One of the challenges of GAI is that GAI algorithms need a large amount of training data to successfully perform tasks. Another challenge of GAI is unexpected outcomes, so the content-generation tool has to make sure that the generated results are high-quality and safe to present.

Figure 2:
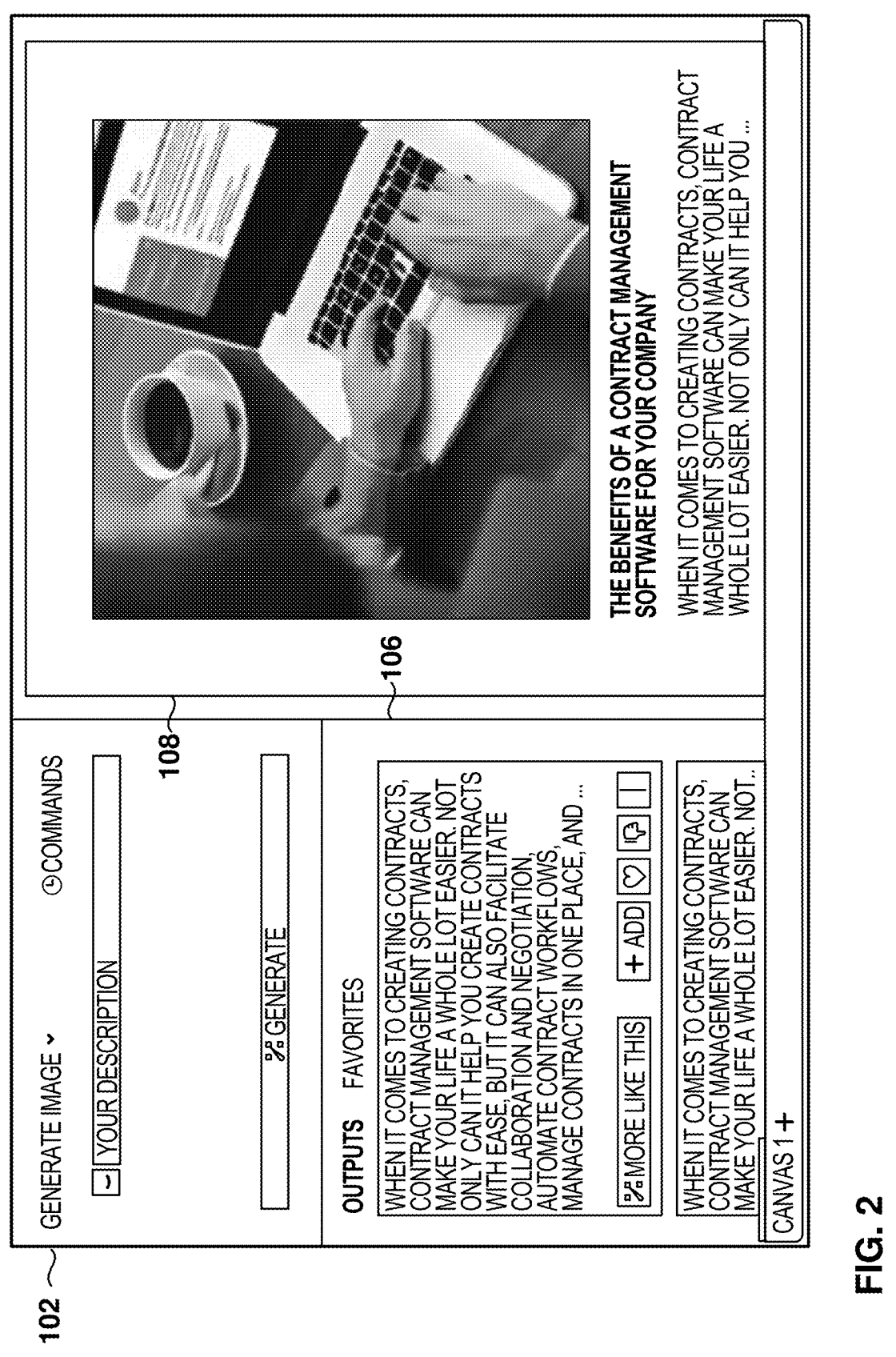

FIG. 2 is a screenshot of multimodal content generated by the content-generation tool, according to some example embodiments. In the illustrated example, a created image has been selected and is presented in the canvas 108.

Further, the user has entered in the prompt tool, "Please write a two-page blog post about the benefits of using contract management software. In your post, discuss how it can help create contracts with ease, facilitate collaboration and negotiation, automated contract workflows, manage contracts in one place, in and cover opportunities risk in trends."

The variations panel 106 shows multiple variations 112 for the blog, and the user has selected one of the generated variations to be added to the canvas 108. The different parts of the canvas are editable, including the results, and the selected content added to the canvas 108. The process may be repeated, and new variations (text, image, video) added to the canvas. That is, the canvas may be generated through a sequence of content-generation requests until the desired outcome is achieved. This sequence of operations may be saved to create a template, as described in more detail below, and the user may then use the template in the future to generate similar type of material (e.g., a magazine advertisement, a poster for a conference, multimedia presentation).

The content-generation tool also provides a safety feature to make sure that the content generated is safe, meaning that the brand of the user is protected from erroneous content (e.g., incorrect product images), as well as protected from incorrect grammar or plagiarism. The content-generation tool provides a grammar checker and a plagiarism checker to make sure that the generated content is safe to use and of high quality. Further, the user is able to specify what type of content is acceptable and what type of content is not acceptable.

Further yet, the content-generation tool includes an authenticity checker for the generated image to make sure that the asset is always presented correctly. The content-generation tool provides complete brand control to the user and guarantees that the brand is protected.

Figure 3:
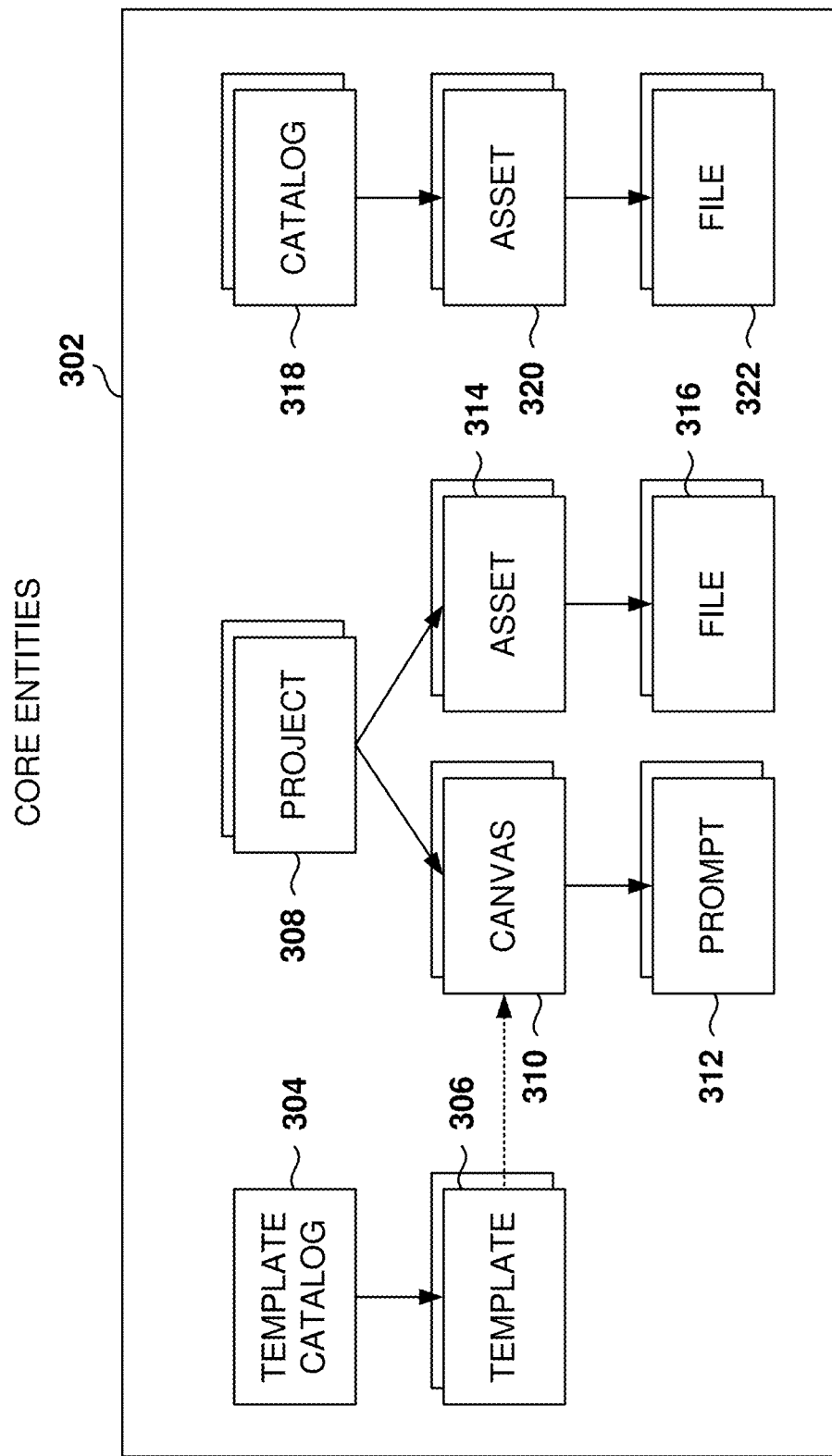
FIG. 3 is a diagram illustrating the entity structure of the content-generation tool, according to some example embodiments.

FIG. 3 is a diagram illustrating the entity structure of the content-generation tool, according to some example embodiments. A user account includes core entities 302 comprising a template catalog 304, projects 308, and catalogs 318.

The template catalog 304 includes a collection of templates 306. A template 306 defines the structure of prompts, prompt rules, and other additional context used to generate a canvas 310. Thus, the template 306 is a skeleton structure that can be used to create the canvas 310 for a particular type of content associated with the template (e.g., a Facebook ad). The content-generation tool includes some default templates, but the user may also generate new templates using an interactive tool to add prompt inputs to be included in the template, as well as other template metadata.

A project is a task created by the user with a particular goal, such as Spring Campaign for new-shoe release. Each project 308 may be associated with one or more canvas 310 and one or more assets 314. An asset 314 is a group of related files 316 and additional metadata that provides information about the asset. The files 316 can be of different types, such as text, image, video, etc. An example of an asset is a product or service offered for sale (e.g., shoes, soda, computer, coffee, tax services).

Each canvas 310 includes a collection of one or more prompts 312. The prompt 312 is the text input used to generate content. The canvas 310 can have an associated type (e.g., related to the template used to generate the canvas), such as an Instagram post, a Facebook post, a Twitter post, a blog post, a Google ad, etc.

A catalog 318 is a collection of related assets 320. The assets in the catalog 318 can be added by the user or imported from an existing product catalog (e.g., a product catalog created to generate Instagram ads). Each catalog 318 includes one or more assets 320, and each asset 320 may be associated with one or more files 322. Thus, there could be assets 314 associated with a particular project 308 and assets 320 associated with a particular catalog 318.

Figure 4:
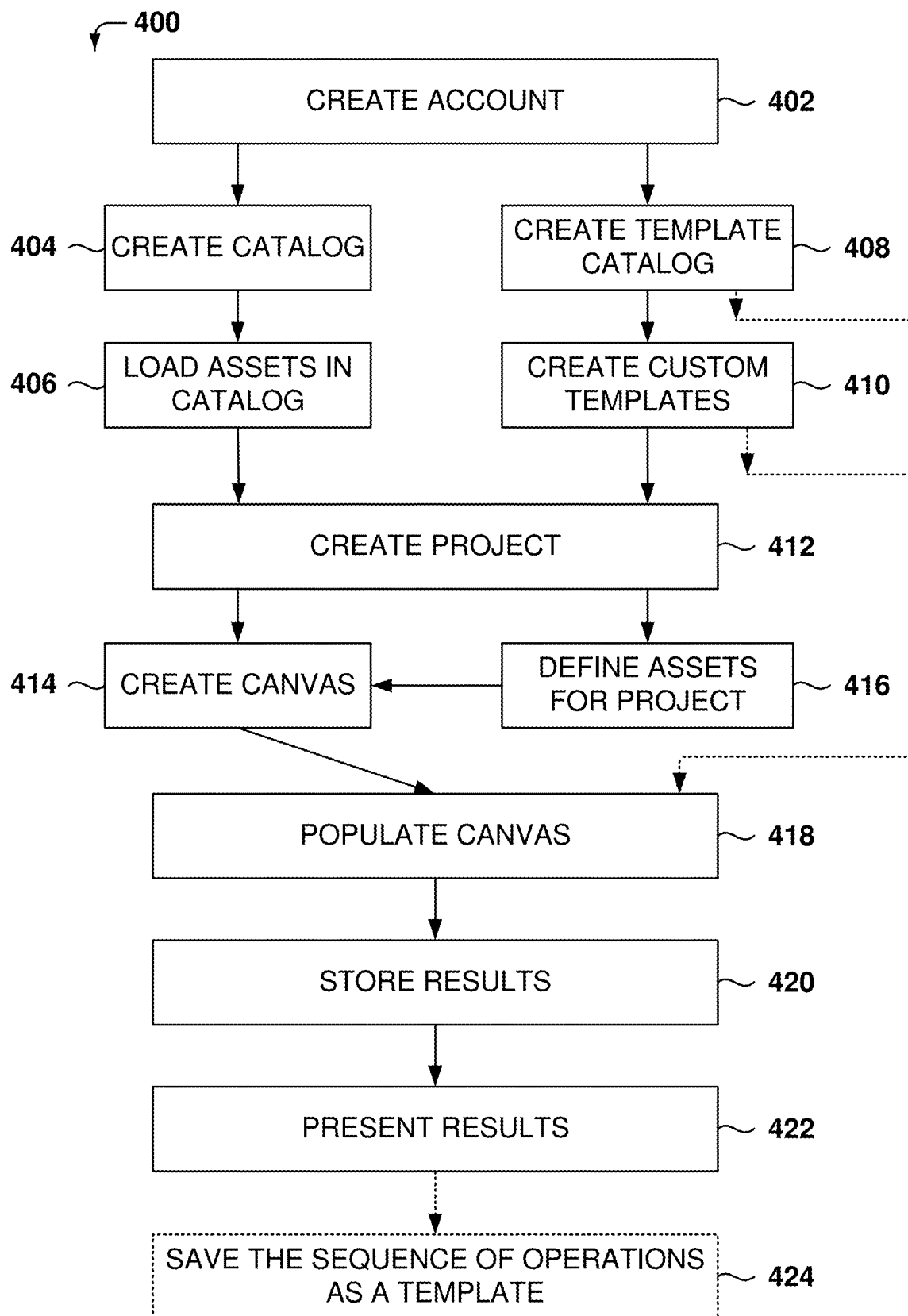
FIG. 4 is a flowchart of a method for the use of the content-generation tool, according to some example embodiments.

FIG. 4 is a flowchart of a method 400 for the use of the content-generation tool, according to some example embodiments. While the various operations in this flowchart are presented and described sequentially, one of ordinary skill will appreciate that some or all of the operations may be executed in a different order, be combined or omitted, or be executed in parallel.

At operation 402, the user account is created. This means setting up user logins and passwords, as well as preparing the user to use the content-generation tool, such as by providing system templates. Additionally, data structures are initialized to prepare the system to create the core entities 302, as illustrated above with reference to FIG. 3.

At operation 404, a catalog is created in response to a request from the user. Further, at operation 406, one or more assets are loaded in the catalog created at operation 404. In some example embodiments, adding an asset includes the following operations:
1. Identifying the catalog;
2. Selecting option to add an asset; and
3. Providing information about the asset, such as asset metadata (e.g., name, type of asset) and related files (e.g., images, logos).

At operation 408, the template catalog is created for the user account. The user has the option to now create custom templates at operation 410.

Further, at operation 412, the user selects the option to create a project, and within the scope of this project, the canvas can be created. Optionally, at operation 416, the user may define project-specific assets.

There are several ways to use project assets. For example, the user may upload images for the asset. Further, the user may generate and image for the asset using the prompt tool and then save the asset image for later use. Further yet, the user can access all the assets from the asset catalog. For example, all generated images for a product will show up under the product view.

At operation 414, a new canvas is created after receiving a request from the user. At operation 418, the canvas is populated with prompts. The canvas can be populated using a template or by using the prompt tool to receive input requests. Further, an AI interactive tool may also be used to assist the user in creating inputs to generate the prompts.

At operation 420, the results are saved, and, at operation 422, the results are presented, such as by posting on social media, sending via email to clients and potential clients, etc.

Also, reinforcement learning is used as content gets generated and the user provides additional information regarding what content they liked and what content was rejected. The additional information is used to refine the components of the content-generation tool to improve the generation algorithm. This way, the content-generation tool improves performance as the user uses it more.

Operation 424 is optional and is for saving the sequence of operations that created the canvas as a custom template. The template may be generated based on the sequence of content-generation operations that the user utilized to create a particular canvas. That is, the user may generate a canvas in several steps, e.g., add title, add image, add description text, etc., and the content-generation tool keeps track of the history of operations. An UI may present the history of operations for the generation of a particular output in the canvas, and an option is provided to let the user create a template based on this history of operations. The sequence used to generate the canvas now becomes a predefined set of operations that is the template.

The template is stored as a custom template and the user may invoke the template to generate similar types of outputs. When the user invokes the template, each operation is performed in sequence and the user is prompted for the corresponding input, e.g., enter text for the title, select a product from the catalog, enter a description of the image, enter a prompt input for generating text for the description section, etc.

By capturing the history of actions and saving them as a template, the user is able to generate new templates without having to program the sequences or having to spend time formatting and reformatting the template (such as when a user defines a template for a word-processing application.) This means great savings in user time and efficiency in the generation of new content since users tend to periodically repeat the same type of content (e.g., quarterly report, summer campaign, weekly ad).

Figure 5:
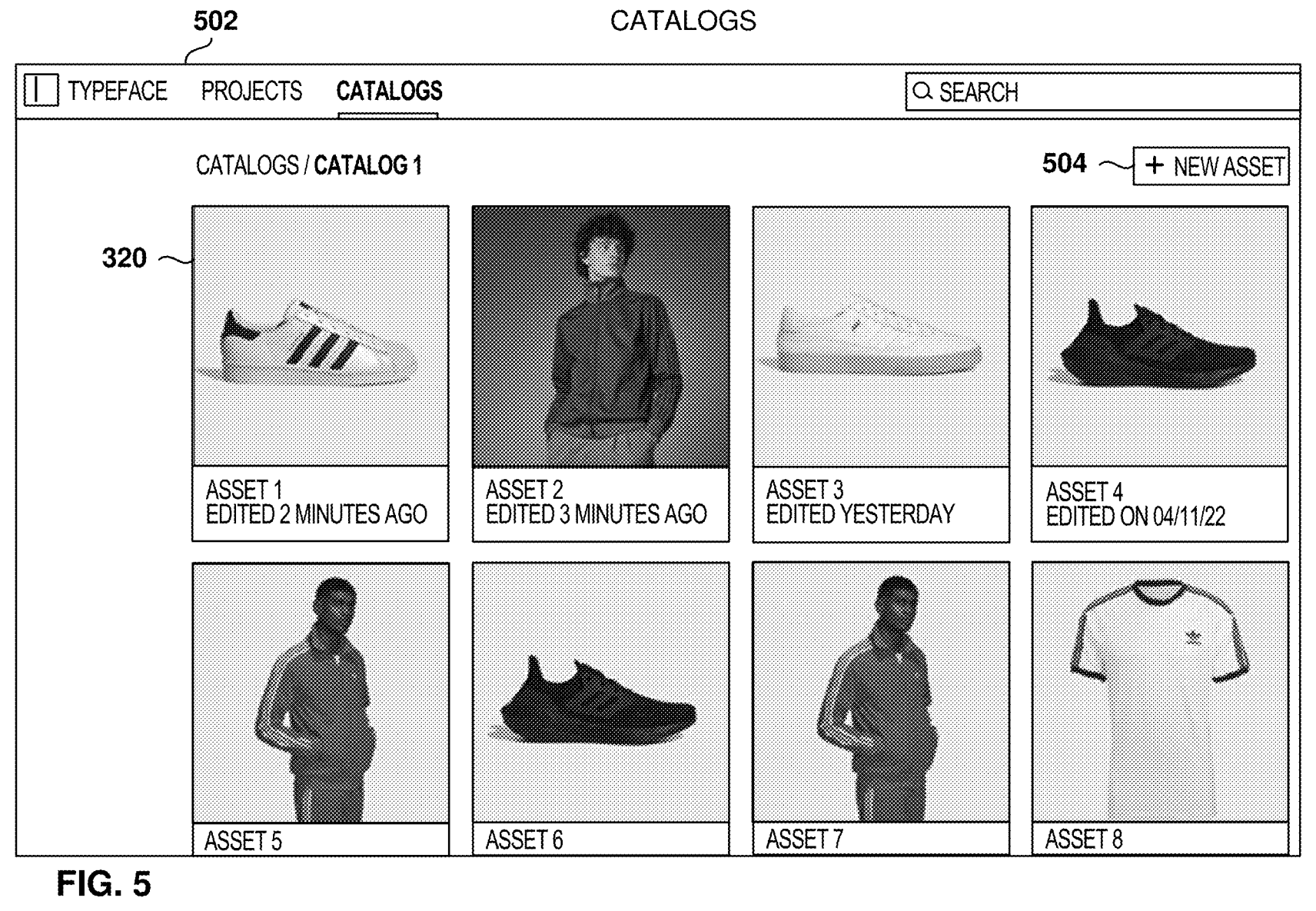

FIG. 5 is a UI 502 for the management of catalogs, according to some example embodiments. The UI 502 shows the assets 320 associated with the illustrated catalog.

There could be multiple catalogs that can be selected under the "Catalogs" option of the top bar.

The UI 502 includes an option 504 to add new assets. Further, selecting an asset provides options for managing the asset, such as deleting, copying, updating, etc. The illustrated example shows assets associated with images, but other assets may be associated with other types of media, such as text, videos, voice, music, etc. In some example embodiments, one asset may have text, image, video, or any combination thereof.

Further, a catalog may be created by importing an existing catalog used for another application, as described in more detail with reference to FIG. 24. Additionally, new assets can be created from the canvas when new images are generated by the content-generation tool.

The inclusion of assets allows the content-generation tool to provide true personalization for the product when generating content. The content-generation tool learns about the user's product and is able to generate better content based on the in-depth knowledge of the products.

Figure 6:
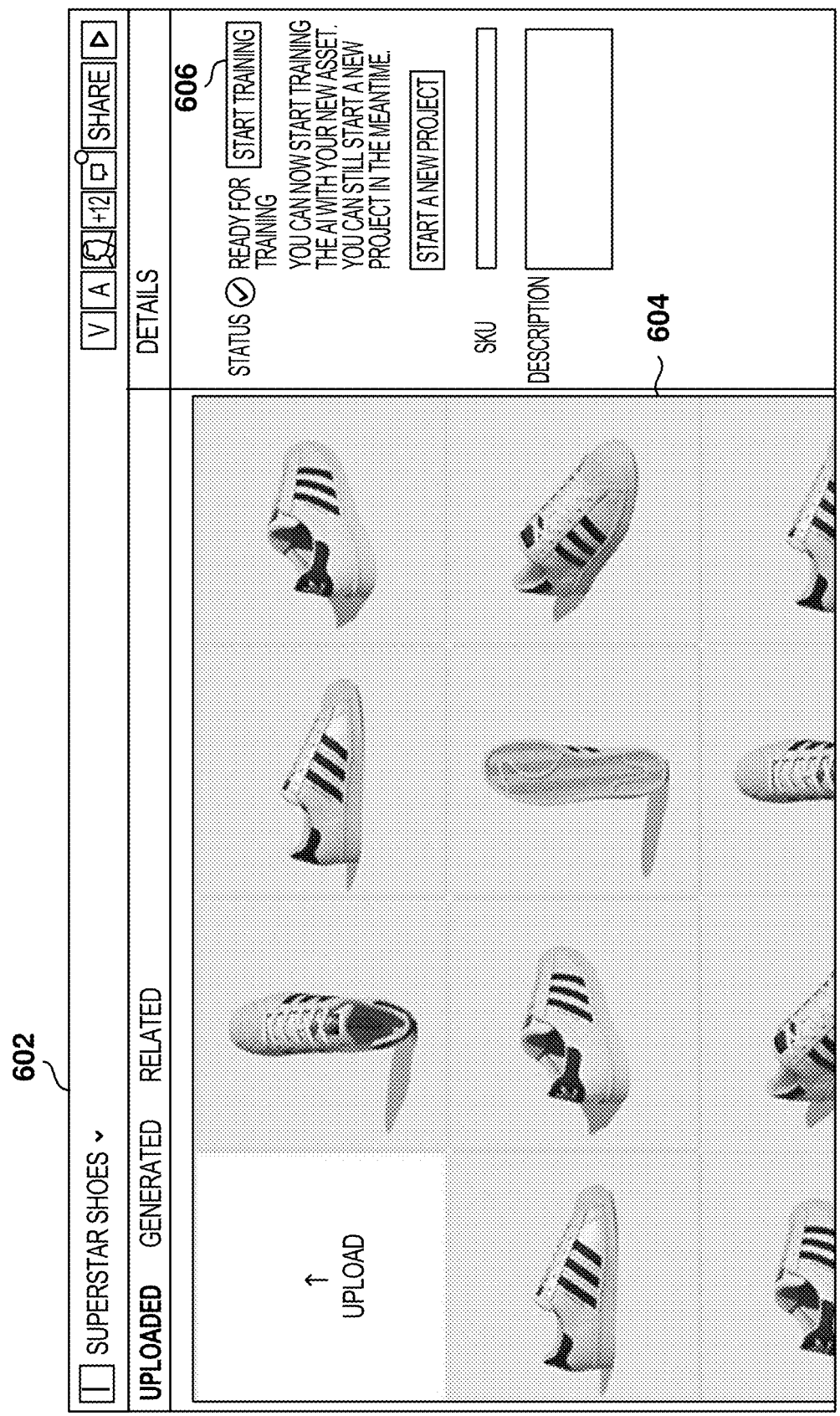
FIG. 6 is a UI for the management of assets in a catalog, according to some example embodiments.

FIG. 6 is a UI 602 for the management of assets in a catalog, according to some example embodiments. The UI 602 provides three options for assets: Uploaded, Generated, and Related. The illustrated UI 602 is for the option Uploaded. In the illustrated example, a list 604 of all the images for the "Superstar Shoes" is presented.

The Uploaded option lists the assets that have been uploaded or imported. The Generated option shows the files that were generated/derived from this asset in the prompt. The Related option shows the list of projects that use this asset in one or more prompts inside the project.

Further, an option 606 to "Start training" is provided to generate a custom model for the asset. At a high level, selecting the start-training option 606 means telling the content-generation tool to learn about this particular product, so when an input in the prompt includes the "Superstar Shoes," the content-generation tool will generate images with the Superstar Shoes. More details about the training are provided below with reference to FIG. 26.

Images are generated with awareness of the context for the user and the user's products or services. Let's say a company which manufactures Pokémon plush toys utilizes the content-generation tool to generate images to run ads. The ad images should have the original plush toys the company manufactures instead of something that company does not sell that may be generated by the GAI tool. To achieve this, models are created for each user, the models being "aware" of the actual look and properties of the user products, so the generated images match perfectly the plush toys company is selling. On stable diffusion this fine tuning can be done at multiple levels.

Figure 7:
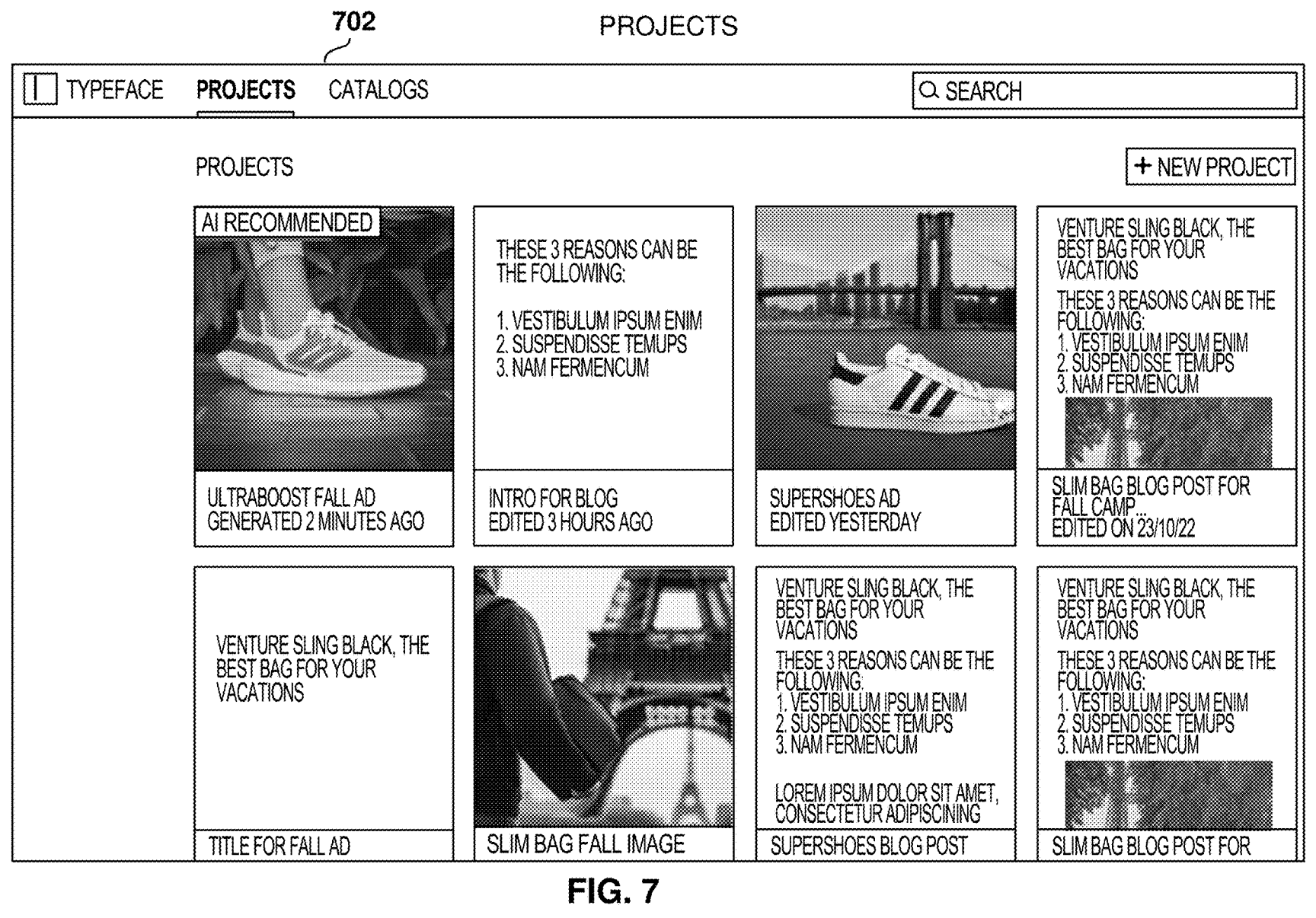

FIG. 7 is a UI 702 for the management of projects, according to some example embodiments. The UI 702 lists the projects created by the user. As the example shows, projects may include one or more prompts, which can be of different types (text, image, video, etc.).

In general, people do not want to just work with one tool at a time, but rather have a tool that represents the flow of their work. For example, a user may want to create an Instagram ad and would like to create the ad with just one tool instead of having to go to separate tools for creating the text and creating the image. Further, having the text and image corelated provides for a better Instagram ad (e.g., by creating the image based on the selected text). Thus, the projects of the content-generation tool represent the tasks of interest to the user.

Further, the content-generation tool provides a project history (not shown) for each project where the different steps taking to generate items for the project are presented. The user may refer to some of these steps and generate new content, such as by regenerating an image based on a different asset.

Figure 8:
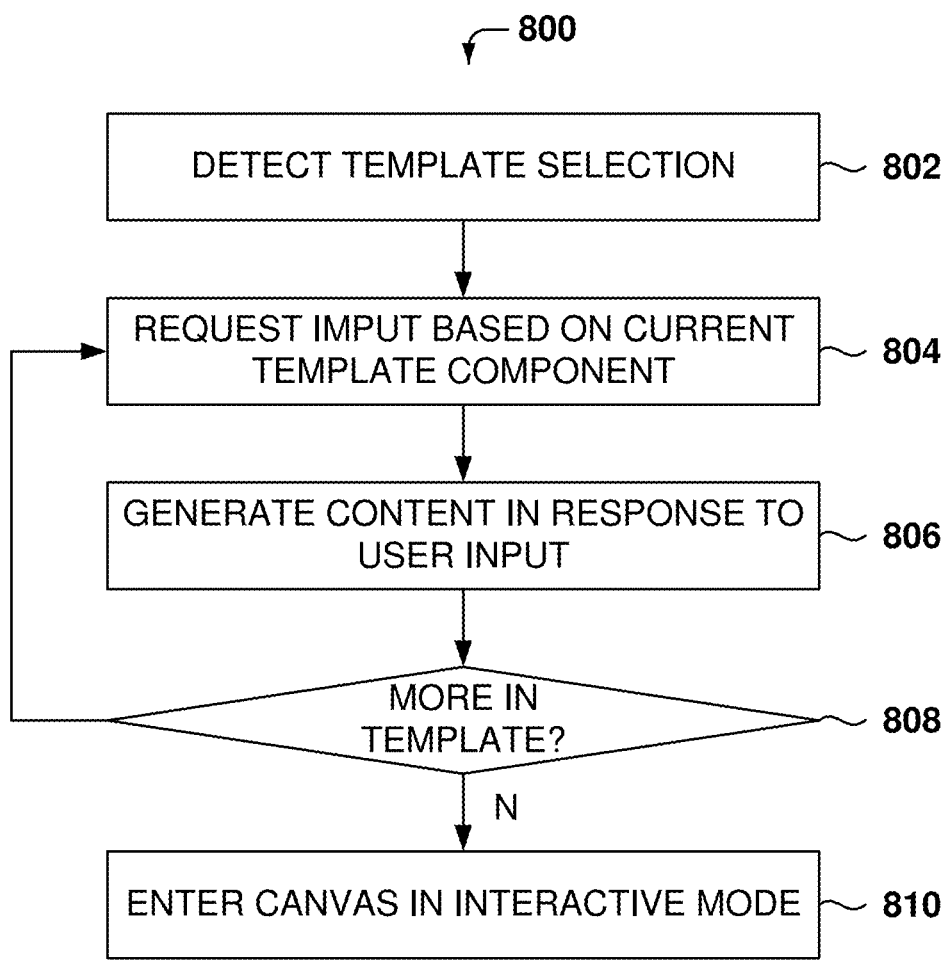
FIG. 8 is a flowchart of a method for using a template to generate content, according to some example embodiments.

FIG. 8 is a flowchart of a method 800 for using a template to generate content, according to some example embodiments. As described above, a template 306 defines the structure of prompts, prompt rules, and other additional context used to generate the canvas. The template is composed of blocks like images, text copy, video, etc. Further, the template can be used for the following:

Specify which atomic blocks to use;
Specify the order in which to use the atomic blocks;
Specify additional inputs to use for text generation (e.g., an existing format, etc.);
Specify prompt constraints or guides to be used for each element or for the entire template;
Reference a prompt template to use;
Use context to refer to various atomic blocks and their relationships;
Choose whether to provide flexibility to go off script, that is, the prompt steps do not have to be strictly followed;
Be added to the system without requiring any code change;
Be stored in a declarative "config" file;
Be associated with an audience profile for the user.

An example of an Instagram post may have the following components: a visual component (an image or a set of images); a caption (a short text associated with the image); and zero or more hashtags to improve discovery.

A template generation tool (not shown) allows the user to create templates and define the components of the template without having to write a program. Components can be added, deleted, edited, and reordered within the template. Additionally, the template may also include relationships between blocks, such as when an image block is generated from a piece of text and vice-versa.

Thus, the user can easily create a template that does the following:
generate an image,
generate a caption for the image, and
generate hashtags for the image and caption.

In addition, the user can associate the template with a particular kind of asset and specify prompt considerations for generating text and image and obtain additional metadata from the asset catalog.

An example of a Facebook ad would include the following elements: a visual component (an image or a set of images); a caption (a short text associated with the image); a call to action (a short punchy headline); and a call-to-action button.

Blog posts can be of many formats, so the template for blog posts may have a variety of formats. One example of a blog post includes the following: a title for the post, an introduction text (describing the subject of the blog); a transition (text to transition from the introduction to the blog's main idea); one or more outline headings (what is covered in the blog); a recap or summary text; and a call to action.

The steps in the blog template would include:
Generate an outline;
Generate title for the blog;
Generate an introduction paragraph;
Generate a punchy image to create engagement around the topic;

Generate a transition paragraph;
Generate an outline for the topics to cover;
Expand on each of the outline topics with a few paragraphs;
Generate optional images for each section; and
Generate a summary for the blog.

FIG. 8 describes the operations for using a template. At operation 802, the content-generation tool detects the selection of a template by the user.

From operation 802, the method 800 flows to operation 804 to request input from the user based on the current template component. The first time operation 804 is performed, the first template component is invoked, and successive iterations will perform the next template component.

From operation 804, the method 800 flows to operation 806 to generate content based on the user input. The content can be refined using the canvas tool.

From operation 806, the method 800 flows to operation 808 to check if there are more template components to perform. If there are more template components, the method 800 flows back to operation 804, and if there are no more template components, the method 800 flows to operation 810 to enter the canvas in interactive mode and enable the user to refine the output.

Figure 9:
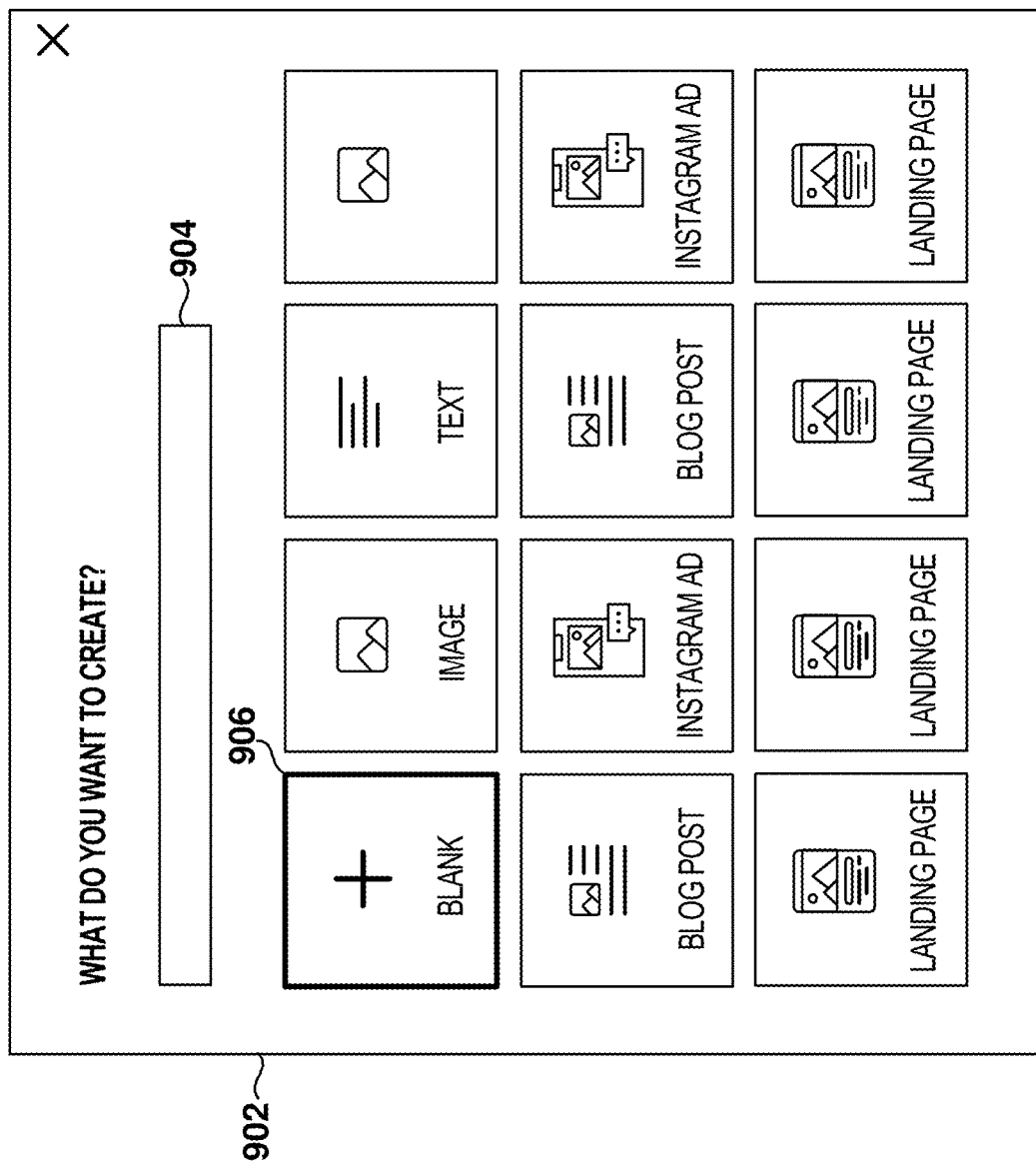
FIG. 9 is a UI for selecting a template, according to some example embodiments.

FIG. 9 is a UI 902 for selecting a template, according to some example embodiments. After the user selects the option to create a new canvas, the UI 902 gives several options to the user, such as entering a search 904, start from a blank canvas 906, and select a template to create an image, text, blog post, Instagram ad, landing page, etc.

The content-generation tool provides some out-of-the box templates, such as the basic ones to create a text, create an image, etc., or more complex ones like creating an Instagram ad or a landing page for a website. As discussed above, the user may also create custom templates without having to programmatically create the templates, although, in some embodiments, an option to programmatically create a template is also provided, e.g., by the use of an Application Programming Interface (API).

Figure 10:
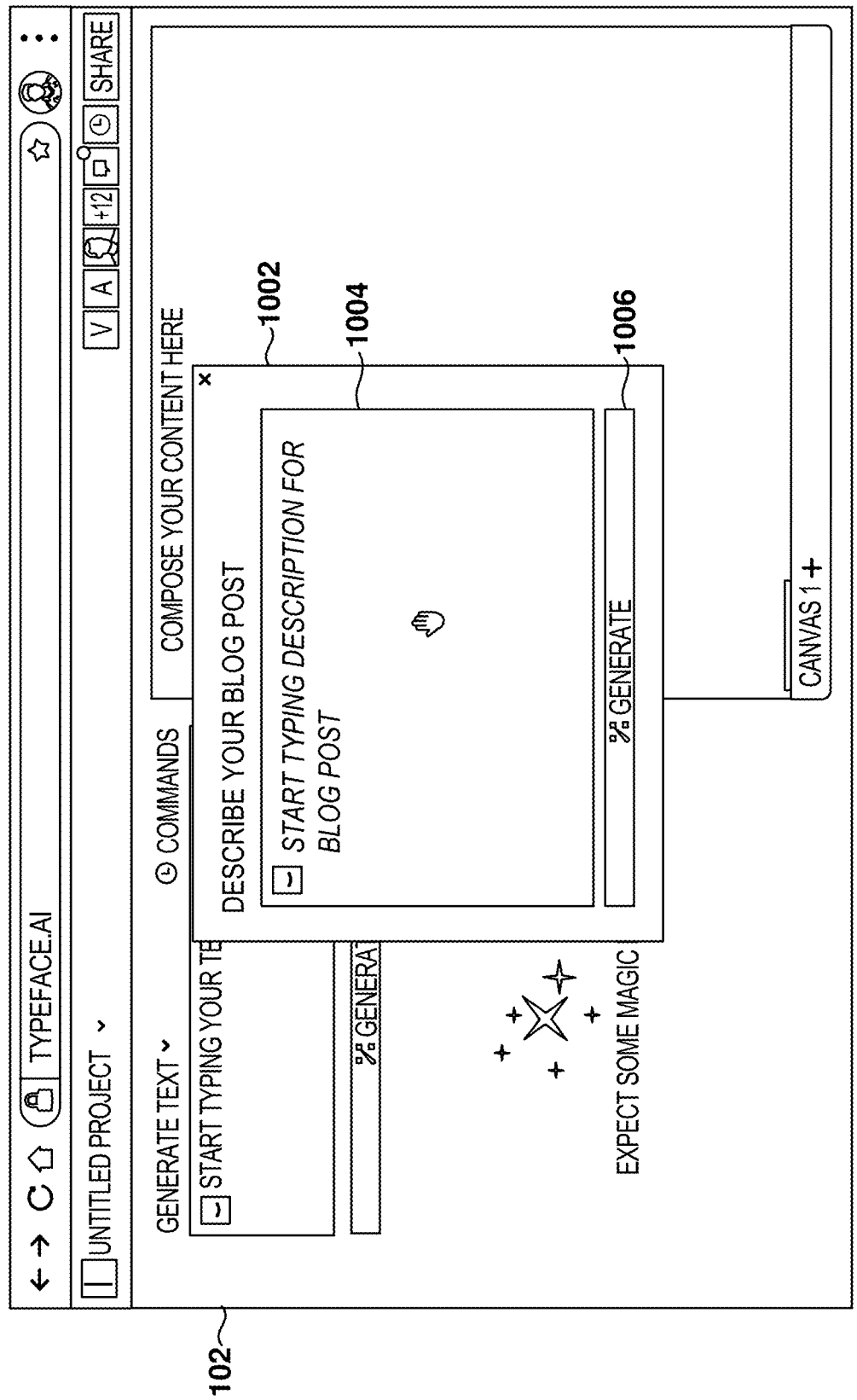
FIG. 10 is a UI for generating a blog post using the template, according to some example embodiments.

FIG. 10 is a UI 102 for generating a blog post using the template, according to some example embodiments. After the template for the blog post is selected, the UI 102 provides a window 1002 to perform the first component of the template, and then continue with each template component. Other template operations may include other types of input requests, such as tone of the communication, intended audience, camera type, graphics type, product, etc.

For example, after entering the blog title and other inputs, the window 1002 includes a field 1004 to enter text describing the blog post. After the user enters the text, the generate button 1006 may be selected and the description for the blog post will be generated by the content-generation tool.

FIG. 11 illustrates the generation of text with the content-generation tool, according to some example embodiments. After the user enters the input in field 1004, as described above with reference to FIG. 10, and selects the generate button 1006, the content-generation tool generates the text 1102.

The illustrated example is for the generation of text, but other examples may include generation of images, videos, 3D images, etc. For example, the user entered the following:

Please write a two-page blog post about the benefits of using contract management software. In your post, discuss how it can help create contracts with ease, facilitate collaboration and negotiation, automated contract workflows, manage contracts in one place, and uncover opportunities, risks and trends.

The content-generation tool generated several results, the first one being as follows:

When it comes to creating contracts, contract management software can make your life a whole lot easier. Not only can it help you create contracts with ease, but it can also facilitate collaboration and negotiation, automated contract workflows, manage contracts in one place, in and cover opportunities, risk in trends. Here is a closer look at each of these benefits:

1. Creating Contracts

The user can then select the recommended result and add it to the canvas. Therefore, it is easy to create a blog post or an Instagram ad just by following the template's steps, and create something that is multimodal.

Regarding text generation, several GAI tools may be used, such as GPT-3, Frase IO, Peppertype, Rytr, Jasper, and Copy. ai. Tools for image generation include Stable Diffusion, DALL-E, starryai, Craiyon, NightCafe, and Artbreeder. Video generators include, Synthesia, Lumen5, Flexclip, Elai, and Veed.io. Voice generators include Replica, Speechify, Murf, Play.ht, and Lovo.ai.

Any of these tools may be used to generate the corresponding prompts for the desired mode.

FIG. 12A illustrates the generation of a blog post 1202 with the content-generation tool, according to some example embodiments. The blog post includes the generation of a title, description, and image. The illustrated example shows images in the results panel, and one of the images has been added to the canvas.

The prompt to generate the image was:

Product shot of Sling Bag, intricate, elegant, glowing lights, highly detailed, digital painting, art station, glamor post, concept art, smooth, sharp focus, illustration, art by artgerm and greg rutkowski, artey freytag.

Figure 12B:
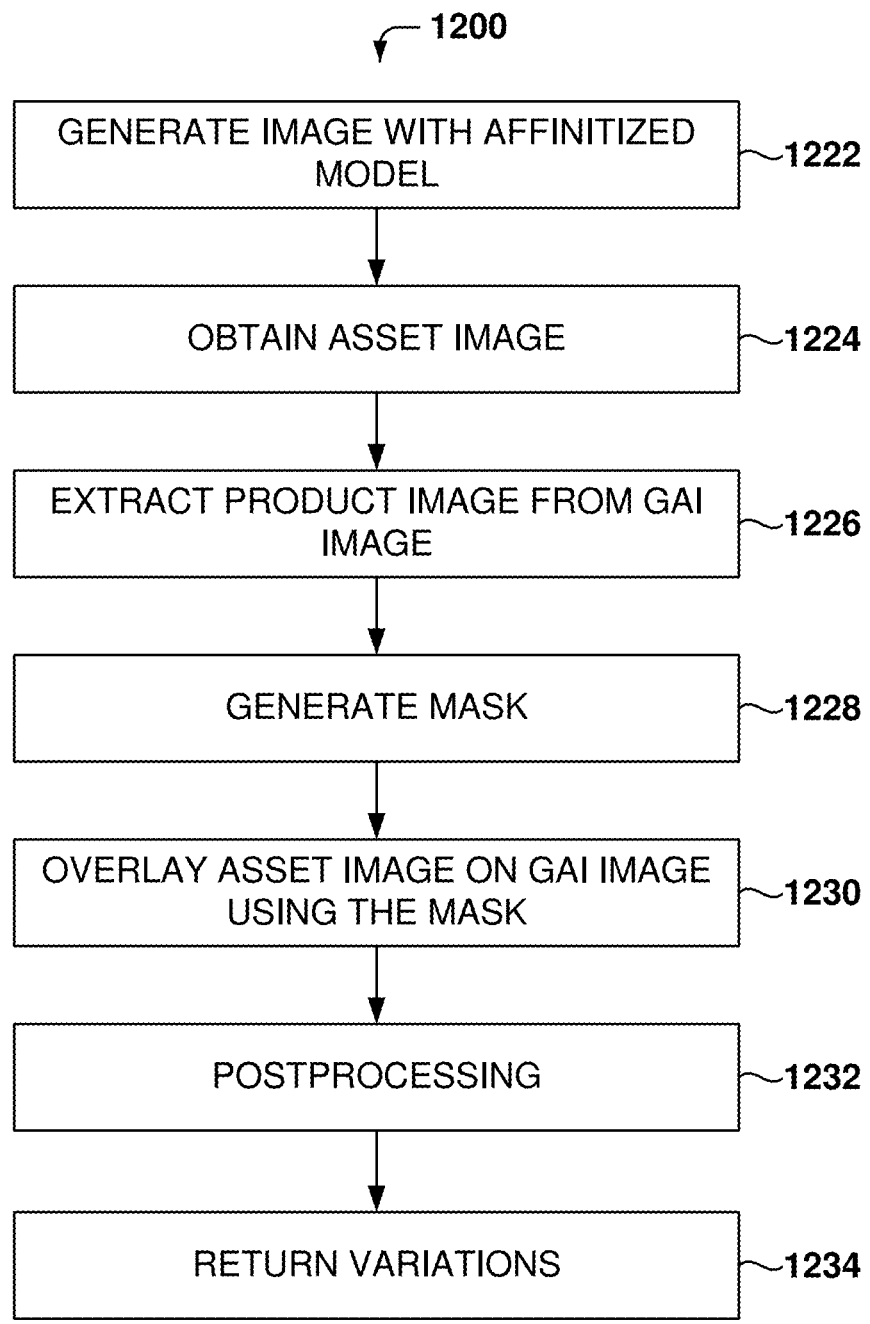
FIG. 12B is a flowchart of a method for the generation of images with the content-generation tool, according to some example embodiments.

FIG. 12B is a flowchart of a method 1200 for the generation of images with the content-generation tool, according to some example embodiments. While the various operations in this flowchart are presented and described sequentially, one of ordinary skill will appreciate that some or all of the operations may be executed in a different order, be combined or omitted, or be executed in parallel.

At operation 1222, an image is generated with the affinitized model for the user. However, the product in the GAI image may not be perfectly represented, and the quality of the image needs to improve in order to preserve the typography, textual content of the product, and the product aspect ratio, color, and style.

To obtain the aforementioned objectives, several operations may be performed, including custom training the model with the product images to generate images that represent correctly, or without little distortion, the product. The content-generation tool can use masking and overlay images to preserve the product details, including the text (e.g., text for the name of the product on a soda can). The content-generation tool may also perform post processing to optimize lighting and the input asset within the generated image.

The process for generating the image begins at operation 1222 to generate the image with the affinitized model (e.g., Stable Diffusion with customization provided by the content-generation tool).

From operation 1222, the method 1200 flows to operation 1224, where an image of the asset is obtained.

From operation 1224, the method 1200 flows to operation 1226, where the product image is extracted for the GAI image generated at operation 1222.

From operation 1226, the method 1200 flows to operation 1228 to generate a mask for the asset in the GAI image.

From operation 1228, the method 1200 flows to operation 1230, where the asset image is overlayed over the GAI image using the mask of the asset.

From operation 1230, the method 1200 flows to operation 1232 to perform postprocessing of the resulting image. The postprocessing includes adjusting lighting and blending. Further, postprocessing can fix luminosity with reference to the asset surrounding. Further yet, postprocessing can pass output through an image-image pipeline with contour masks to support better quality outputs.

From operation 1232, the method 1200 flows to operation 1234, to return one or more variations as results.

Further, an editing tool is also provided where the user may edit the image, such as by adding objects to the image, replacing objects, or erasing objects from the image.

Figure 13:
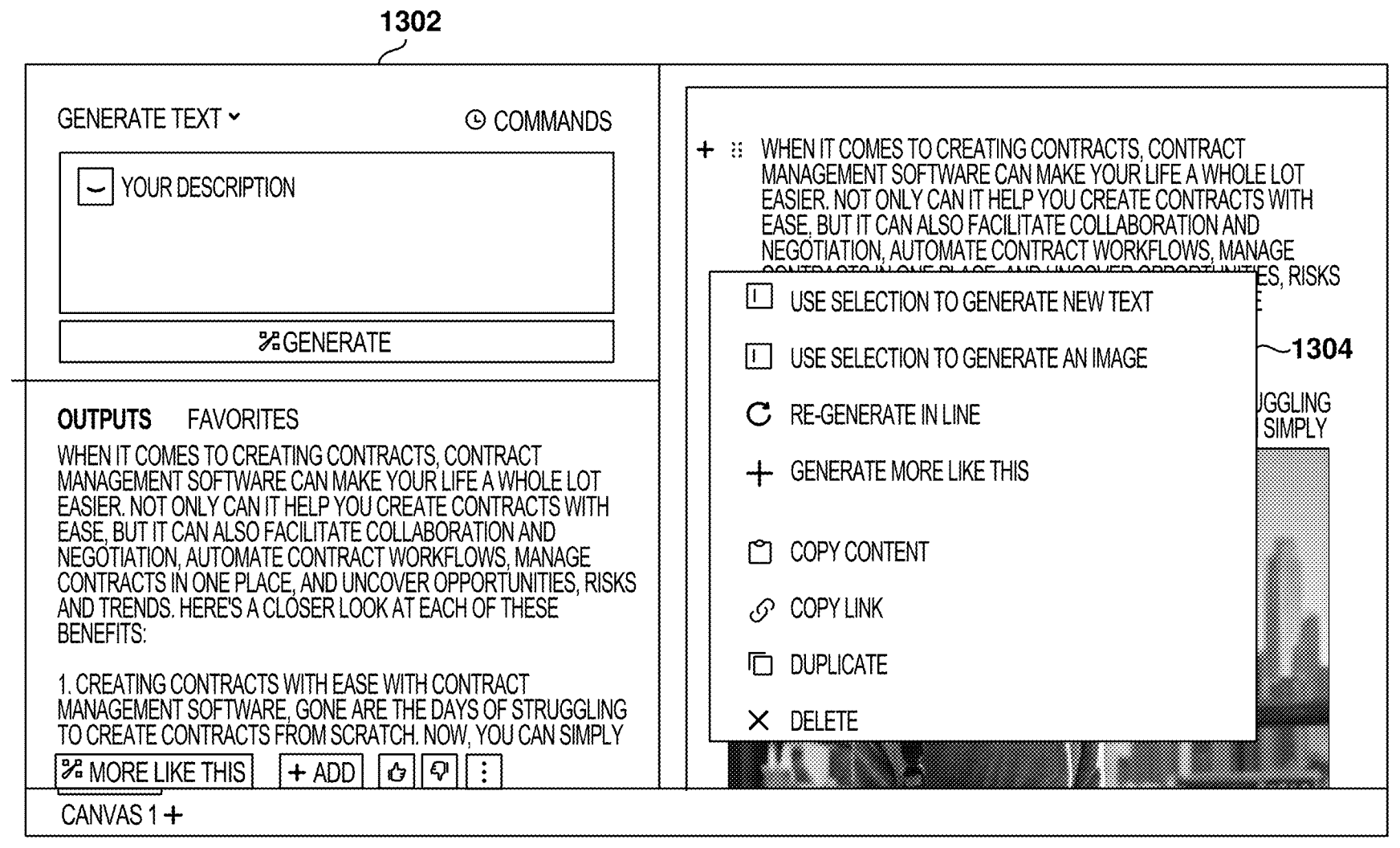

FIG. 13 illustrates the options for regenerating content based on content present in the canvas, according to some example embodiments. After the content-generation tool generates content and the content is added to the results or the canvas, the user may regenerate new content based on the previously generated content.

For example, the user may select some text in the canvas 1302 and invoke new options, such as by right-clicking or double-clicking on the selection. The user may select a whole paragraph or part of the paragraph.

The menu 1304 is then presented, with the options to use the selection to generate new text, use the selection to generate an image, regenerate text in line (e.g., give me another option to replace the selected text), and generate more text like this (to show in the results panel selectable options).

Other options in the menu include other text edit options, such as copy to clipboard, copy link, duplicate, or delete. Furthermore, other editing options may be provided (not shown) for the text in the canvas, such as change font, size, bolden, italicize, paste, etc.

Figure 14:
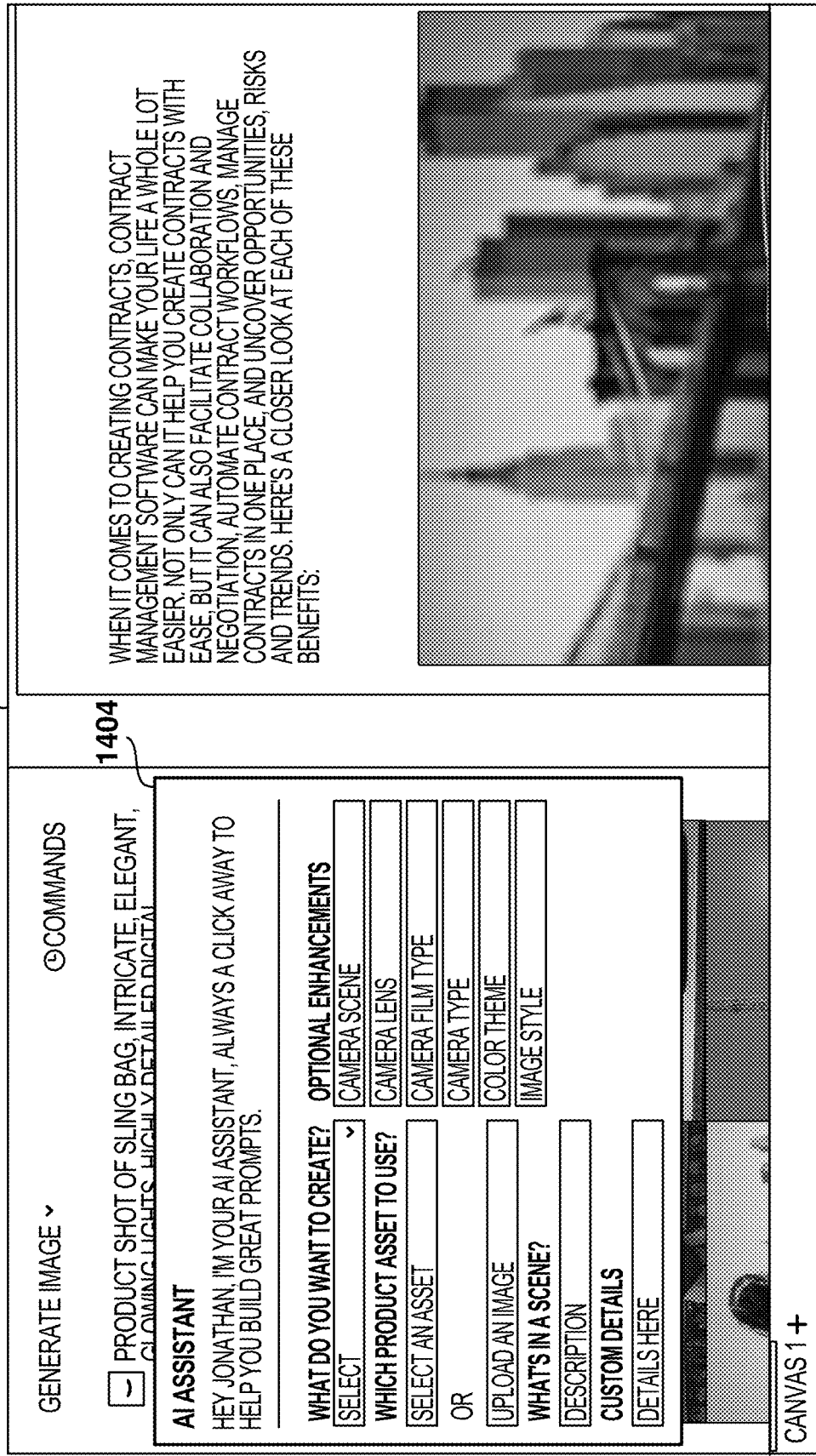
FIG. 14 illustrates the use of the Artificial Intelligence (AI) assistant to generate content, according to some example embodiments.

FIG. 14 illustrates the use of the Artificial Intelligence (AI) assistant to generate content, according to some example embodiments. An option is provided for an assistant to help the user entering the prompt input. When the AI-assistance option is requested, the window 1404 is presented in the UI 1402.

The window 1404 shows a plurality of questions, and the user may select which one, or ones, to answer. In some example embodiments, the questions include "What do you want to create?" and a drop-down menu allows the user to select the mode, such as text, image, video, or audio.

Another question is "Which product asset to use?", and the user is given the choice of selecting an asset or uploading a new image.

Another question is "What is on the scene?", and the user is able to enter a text description.

Another question is "Custom details," and the user is able to enter additional details about the content being generated.

Another question is for "Optional enhancements" for an image. There are several options for enhancements, including camera scene, camera lens, camera film type, camera type, lightning type, color theme, and image style.

In some options, if the user selects a desired option, additional prompting questions may be presented to further define the content.

Other questions may be included, such as, "What details do you want to add?" The details may include special lighting (what kind of lighting is the subject in, such as soft, ambient, ring light, neon), type of environment where the subject is situated (e.g., indoor, outdoor, underwater, in space), color scheme for the output (e.g., vibrant, dark, pastel), what is the point of view (where are you looking at the subject from, e.g., front, overhead, side), type of background (solid, color, nebula, forest), a specific art style (e.g., 3D rendering, studio ghibli, movie poster), a specific photo type (e.g., macro, telephoto), etc.

It is noted that the embodiments illustrated in FIG. 14 are examples and do not describe every possible embodiment. Other embodiments may utilize different options, additional options, etc. The embodiments illustrated in FIG. 14 should therefore not be interpreted to be exclusive or limiting, but rather illustrative.

For example, under custom details, the user may request, "change the voice to be witty", and new text will be generated that is wittier. Another option is to input, "use the text to generate an image," and an appropriate image will be generated based on the text.

Further, the AI assistance may be requested directly from the prompt tool 110, as described in more detail below with reference to FIGS. 19-20.

Figure 15:
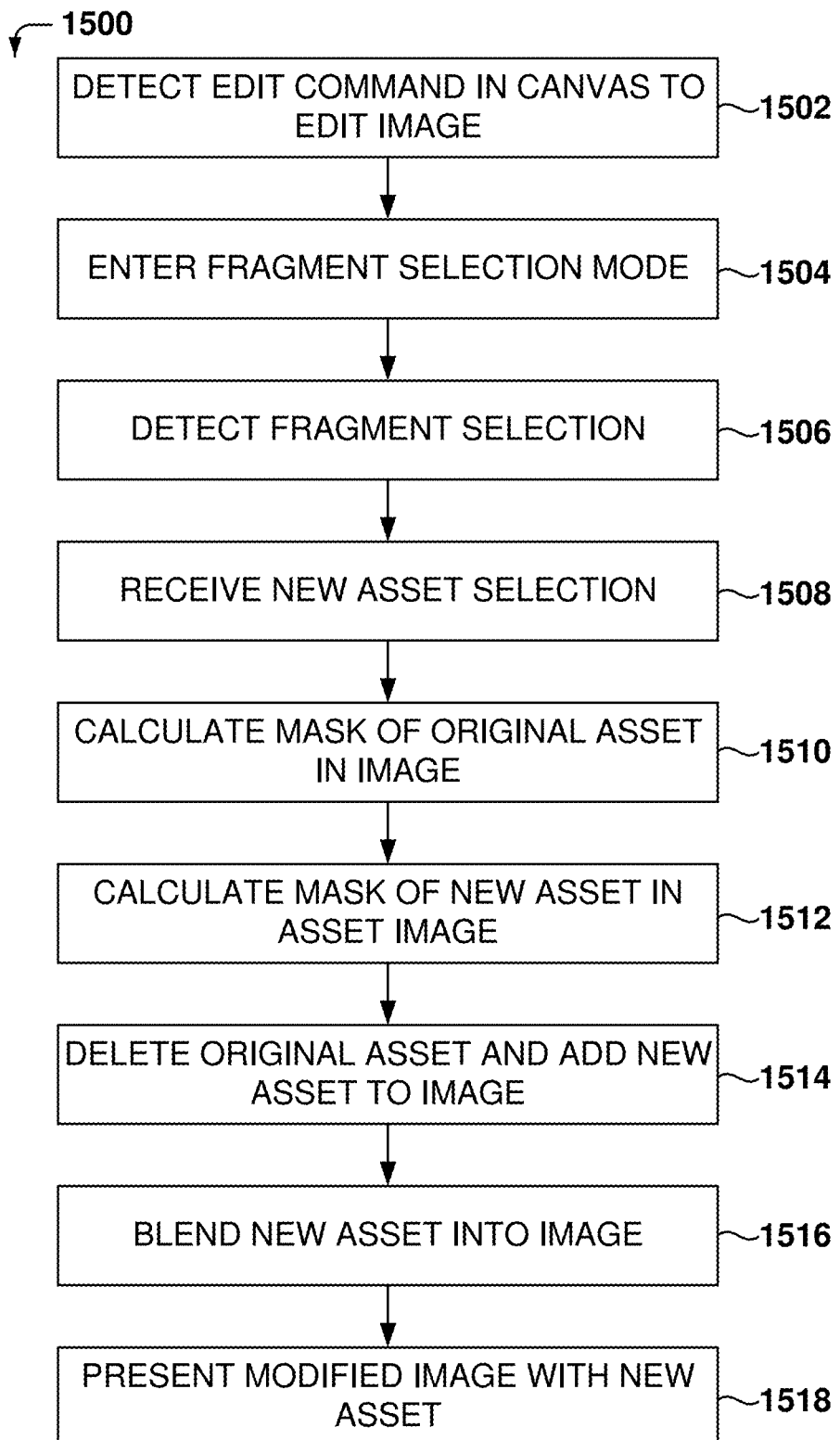
FIG. 15 is a flowchart of a method for changing an asset image in the canvas, according to some example embodiments.

FIG. 15 is a flowchart of a method 1500 for changing an asset image in the canvas, according to some example embodiments. While the various operations in this flowchart are presented and described sequentially, one of ordinary skill will appreciate that some or all of the operations may be executed in a different order, be combined or omitted, or be executed in parallel.

Details on the user interfaces for editing the asset image (e.g., changing the asset in the image) are provided below with reference to FIGS. 16-18. At operation 1502, an edit command in the canvas is detected for editing an image.

From operation 1502, the method 1500 flows to operation 1504 to enter fragment selection mode. For example, the user selects with a mouse motion the fragment of the image containing the asset to be edited or uses a touch device to select the area. The selection can be a square, free form, or some other shape.

From operation 1504, the method 1500 flows to operation 1506 where the fragment selection is detected.

From operation 1506, the method 1500 flows to operation 1508 where the content-generation tool provides an option for the user to select an asset, or a particular image of an asset, and the content-generation tool receives the selection of the asset.

From operation 1508, the method 1500 flows the operation 1510 to calculate a first mask of the original asset in the image based on the input of the user. For example, the asset search is limited to the area that the user selected or nearby pixels in case the selection is not perfect.

From operation 1510, the method 1500 flows to operation 1510 where a second mask is calculated for placing the asset image. The second mask identifies which part of the asset image is actually the asset. For example, a shoe image will typically include the shoe and some background, that is, the shoe does not take the complete asset image, so the second mask is needed to determine which is the relevant part to include.

Typically, the first mask and the second mask will be different; therefore, a process of blending the new image will have to take place.

From operation 1512, the method 1500 flows to operation 1514 to delete the original asset fragment from the image based on the first mask and add the new asset image based on the second mask.

From operation 1514, the method 1500 flows to operation 1516 to blend the new asset image into the original image.

From operation 1516, the method 1500 flows to operation 1518 to present the modified image that includes the asset image from the asset collection or catalog.

Figure 16:
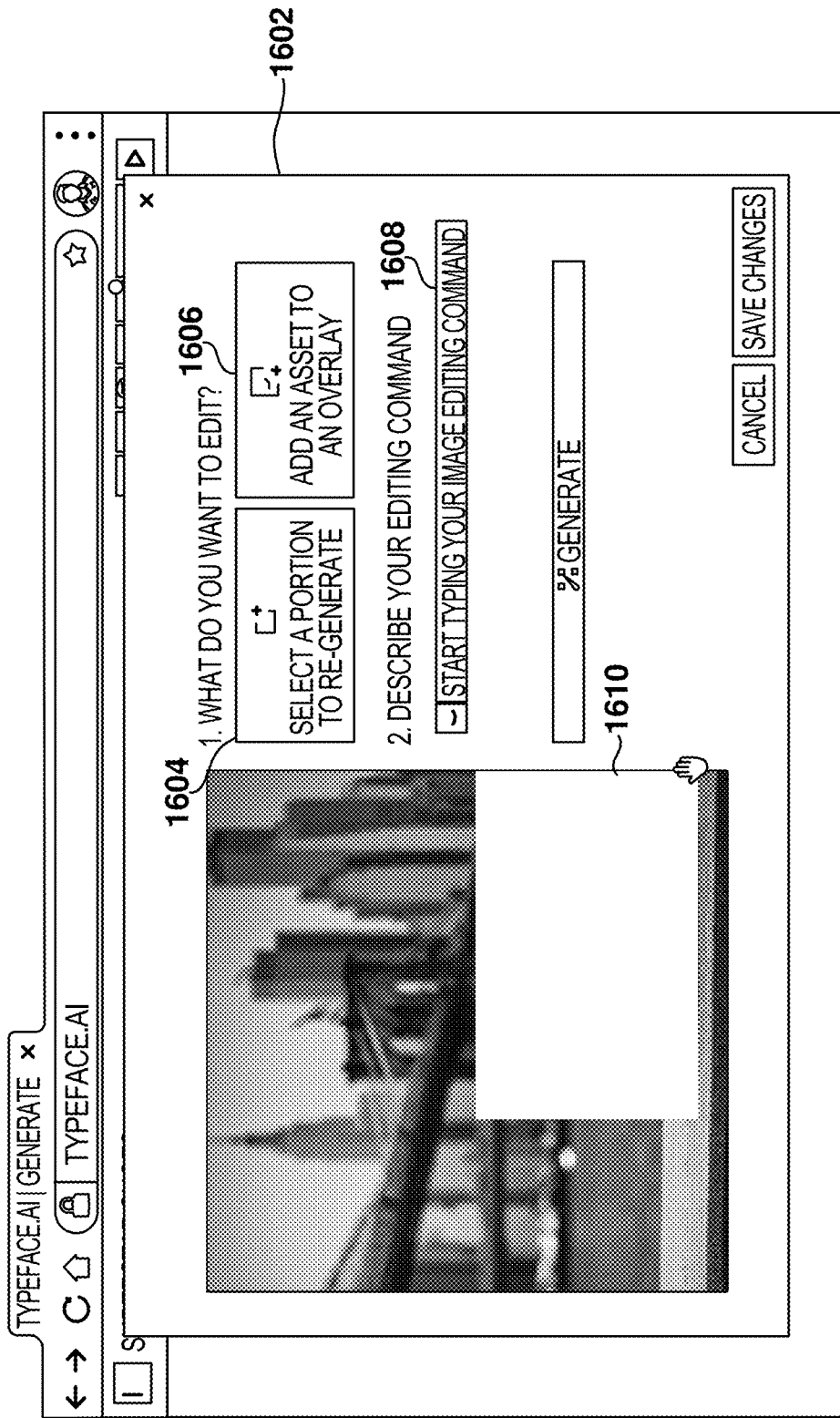
FIG. 16 is a UI for editing generated content, according to some example embodiments.

FIG. 16 is a UI 1602 for editing generated content, according to some example embodiments. After an image has been generated, the user may decide that he does not like how the asset appears, or that he wants to replace the asset for a different type of asset. An option is provided to change the asset in the image while keeping the rest of the image the same.

When the user selects the eight-image option, the UI 1602 is presented with option 1604 to select a portion of the image to regenerate, option 1606 to add an asset as an overlay and blend with the image, and option 1608 to describe the editing command where free text may be entered to describe the requested change. In the illustrated example, the user has selected option 1604 and has used a pointer to select area 1610 where a travel bag is situated.

Figure 17:
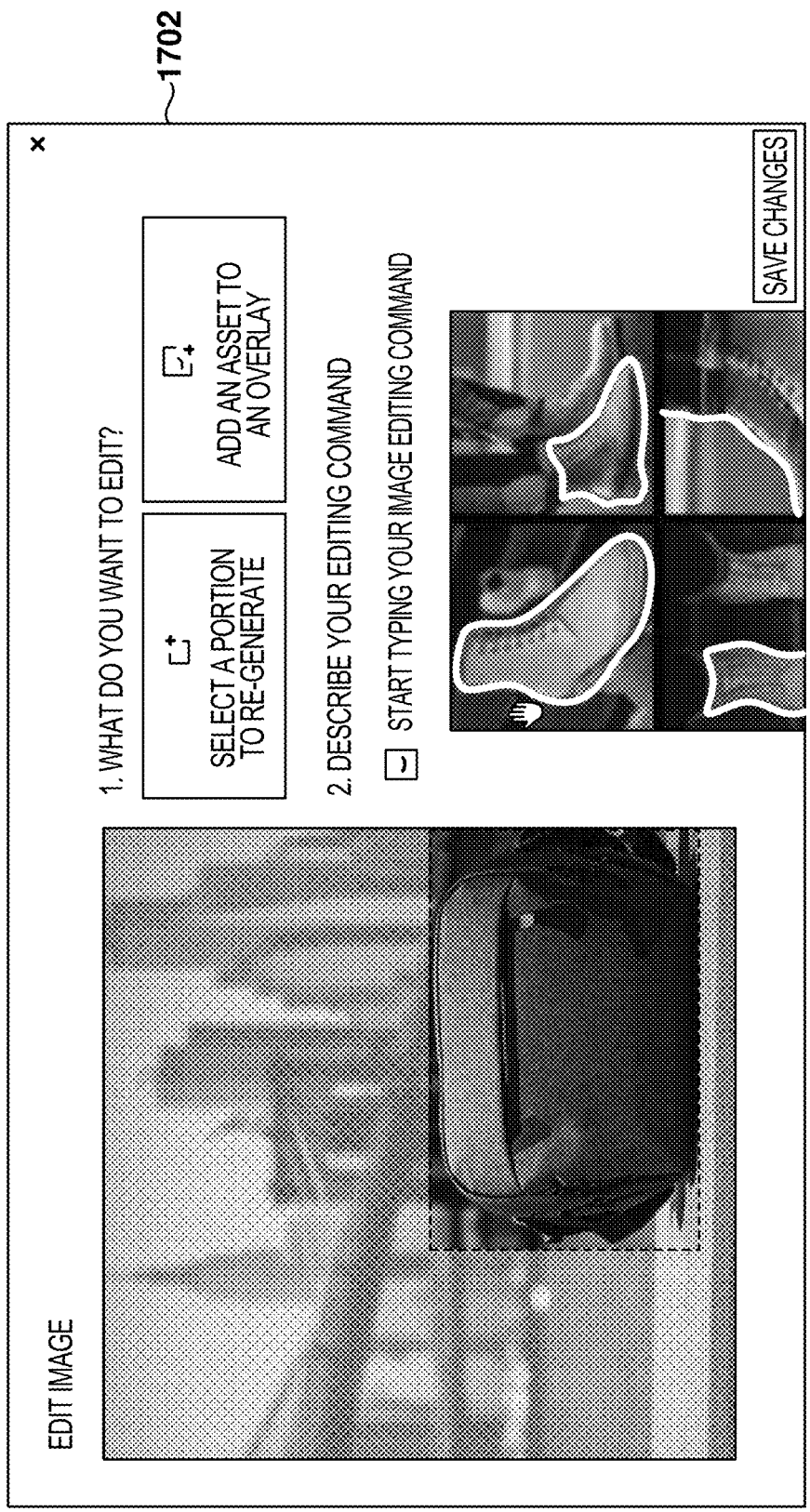
FIG. 17 shows the selection of a new asset to replace another asset in a generated image, according to some example embodiments.

FIG. 17 shows the selection of a new asset to replace another asset in a generated image, according to some example embodiments. After the selection of the asset to be replaced (e.g., from the catalog), the UI 1702 shows options for replacing the asset. In this case, the user has selected an asset for a boot to be replaced.

In response, the UI 1702 shows several options for the asset. This example, each asset image includes a mask for the asset to be embedded, where the mask shows the contour of the shoe in the image. Therefore, when one asset is selected, only the part of the asset within the mask will be blended with the original image.

Afterwards, the content-generation tool blends the new asset image within the original, filling up spaces and blending the new image with the existing image. The content-generation tool will provide several options and the user may select any option or continue editing.

In some example embodiments, a machine-learning program is trained with images of the assets, and the resulting model is able to identify fragments corresponding to different portions in the image. The boundaries (e.g., masks) of the objects are identified by the model.

Figure 18:
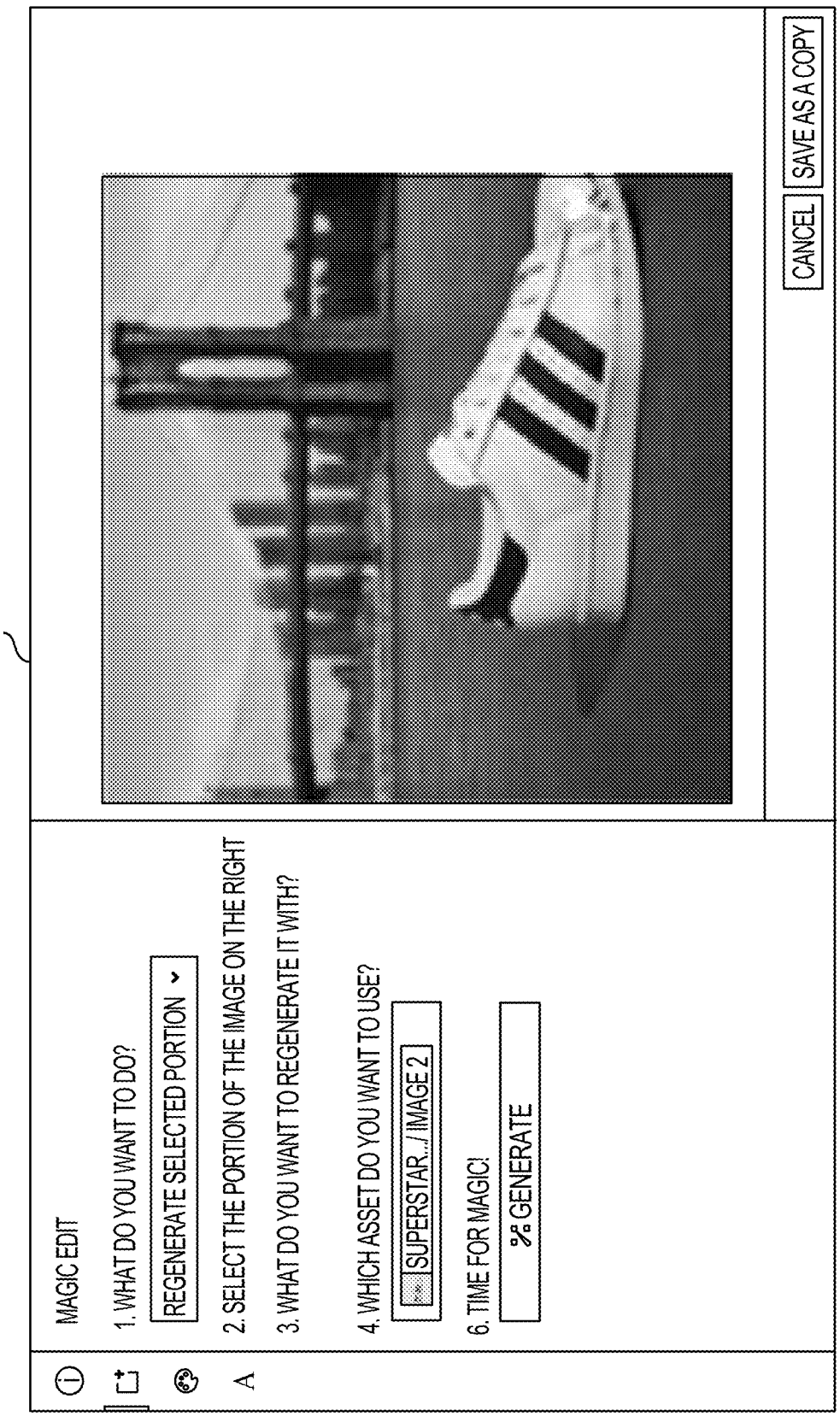
FIG. 18 illustrates the result of replacing an asset in an image, according to some example embodiments.

FIG. 18 illustrates the result of replacing an asset in an image, according to some example embodiments. The UI 1802 shows the result of replacing an asset in the previously generated image. In this example, a shoe has replaced the travel bag that was originally in the image.

FIG. 19 illustrates the use of the prompt tool in the content-generation tool, according to some example embodiments. The prompt panel 104 includes the prompt tool 110 where the user can enter a textual description of the desired generated output. In addition to text, the user may enter a special character or some other input (e.g., right click of a mouse) to select assistance in the description of the text. The content-generation tool will present a menu 1902 with options to define the input. In some example embodiments, the "I" character is used to invoke the menu, but other characters may be used in other embodiments.

The menu 1902 includes multiple options, such as content type, asset, overlay type, camera scene, camera lens, camera film type, camera type, lighting style, color theme, image style, photography style, etc. If the user selects one of the options in the menu 1902, additional options are presented for the selected option. Further, depending on the prompt the user has entered so far, the system can generate variations by appending a few more components to the menu 1902.

In the illustrated example, the user has selected the asset option, so assets from the project or the global catalogs are presented to the user in prompt panel 1904.

In this example, the user has been working in the canvas with Coke cans, so the prompt panel 104 presents the selectable assets to be added to the description. If the user selects one of the assets, the selected asset will be included in the results. As discussed above with reference to FIGS. 5-7, the content generation tool stores assets and metadata that can be used to create the new content. In addition, the metadata store may include details on tone, color, palette, etc., to be used for the user assets.

Under content type, the options may include type of artwork (e.g., photograph, drawing, sketch, 3D render). Additionally, the options may include relationships between various content types like image, text, and video. Content may be derived from other pieces of content, creating rich relationships between individual content types, e.g., image describing the text paragraph above, audio clip that summarizes the blog post, or textual representation for this video file.

Under image style, several options can be provided, such as realistic, oil painting, pencil art, concept drawing, surrealism, matte, elegant, illustration, digital painting, graffiti, chalk, watercolor, beautiful, most beautiful image ever seen, trending, epic composition, etc.

Under subject, the options may include product, person, animal, object, etc.

Under lighting, the options may include accent lighting, ambient lighting, backlight, blacklight, blinding light, candlelight, concert lighting, crepuscular rays, direct sunlight, dusk, Edison bulb, electric arc, fire, fluorescent, glowing, glowing radioactively, glow-stick, lava glow, moonlight, natural lighting, neon lamp, nightclub lighting, nuclear waste glow, quantum dot display, spotlight, strobe, sunlight, ultraviolet, dramatic lighting, dark lighting, soft lighting, gloomy, etc.

Under context, the options may include Indoor, outdoor, at night, sunset, in the park, bridge in background, etc.

Under lens, the options may include ultra wide-angle, wide angle, aerial view, massive scale, street level view, landscape, panoramic, bokeh, fisheye, Dutch angle, low angle, extreme long-shot, long shot, close-up, extreme close-up, highly detailed, depth of field, 4k, 8k, ultra realistic, studio quality, octane render, etc.

Under device, the options may include iPhone, iPad, Sony A1, Nikon D750, Galaxy tablet, etc.

Under details, the options may include highly detailed, grainy, realistic, unreal engine, octane render, bokeh, Vray, Houdini render, quixel megascans, depth of field, Arnold render, 8k, raytracing, CGI, lumen reflections, cgsociety, ultra realistic, volumetric fog, overglaze, analog photo, polaroid, 100 mm, film photography, DSLR, cinema4d, studio quality, etc.

It is noted that the guided experiences follow a rule-based flow to limit the options presented based on the input so far. For example, if an oil painting is selected, there will not options for lens or camera type.

FIG. 20 illustrates the use of the prompt tool in the content-generation tool, according to some example embodiments. After the user selects the asset Mocha Coke asset, the selected asset is included in the prompt tool 110 with a special formatting (e.g., different background shading) to illustrate that a specific option has been selected and is not just text that was typed.

The content-generation tool is aware that the selected asset has a plurality of images, and the asset may also have a custom model associated with this asset. The custom model for the assets comprises a uniquely packaged set of training models that have been trained with unique assets and other data associated with the user assets. Users control access to who can use such custom models and in what context. For example, users may give access to their custom models to people outside their organizations for a fee, e.g., an artist could create their own unique "artist model" that captures their unique style and sell access to this artist model via a marketplace provided by the content-generation tool or some other third-party vendor.

The content-generation tool provides a sharing tool named Typeface+("Typeface plus") to enable users to create their affinitized models and share them with their customers or partners to use. In one example, The Coca Cola Company could use the content-generation tool and create affinitize models for Coca Cola and Coke cans to generate images with these products. The Coca Cola Company, using Typeface+, can share these models with their distributors and resellers so they can generate content with the images of these cans in their advertisements. In another example, a software vendor may create new styles and corresponding models and sell their custom models for others to use.

In the illustrated example, the user is launching Mocha Coke in Japan, so it has additionally entered "coffee, ice, cherry blossoms, Mount Fuji, 8K, UHD," and then selected the "I" symbol again, so the menu 2002 is presented to provide for additional options. After the user selects "all," the user then selects "/" again and additional options are presented in menu 2004, such as in accent lighting, in ambient lighting, in backlight, in blinding light, in candlelight, in concert lighting, in direct sunlight, in dusk, in fluorescent, in glowing, in radioactively, etc.

Once the user finishes entering the input in the prompt tool 110, the content-generation tool will generate the requested output, which is an image for the illustrated example.

Figure 21:
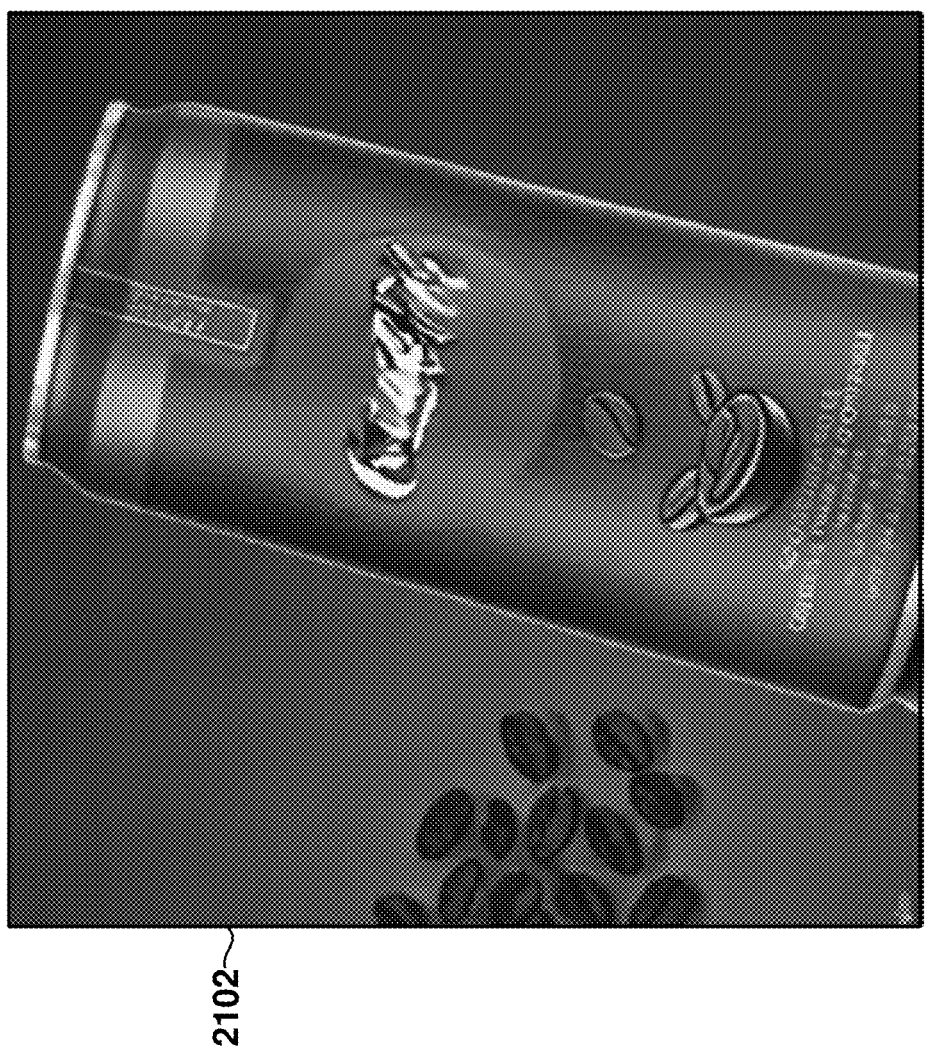
FIG. 21 shows an image created by a Generative Artificial Intelligence (GAI) tool, according to some example embodiments.

FIG. 21 shows an image 2102 created by a Generative Artificial Intelligence (GAI) tool, according to some example embodiments. Currently, one of the problems of GAI is the generation of poor-quality images or images that present some distortion with reference to the desired asset. Typically, GAI tools do not "know" about particular products because of copyright issues these GAI tools can not include product-specific information. For example, the GAI tool may generate "an image of a soda can," but the GAI tool may not know what a Coca-Cola can is, so a request for a Coca-Cola can may produce strange results. Further, even if the GAI tools know about what a Coca-Cola can is, the output may include distortion on the product image, such as mangled text.

In the illustrated example, the GAI tool has generated the image 2102 for a coffee Coca-Cola can. The image 2102 generated of the can is close to the real one, but it is not perfect has it has a distorted Coca-Cola logo and imperfect text in the can.

One of the benefits of having assets in the content-generation tool is the ability to personalize the GAI generated content to avoid having incorrect asset images. When generating images for production, the content-generation tool ensures that the typography and textual content of the product is preserved during generation. Further, the product aspect ratio, color, and style is be preserved as part of the generation.

One of the benefits of the content-generation tool is the ability to personalize and affinitize products of services. Personalize means the ability to create custom models using the custom images of the user's products or services. Personalization allows for the preservation of the product or service images, including text, images, and videos to protect the user's brand.

Affinitize is the ability to create models that are "affine" with the user's assets (e.g., products, voice, sounds, colors, brand kits, etc.) by creating custom models that are trained using specific images for the products, so the AI engine is aware of the products in the catalog and generate content using these products.

Replacing the asset in the image because it may not be immediately obvious as the replacing asset may be partial or not look like the asset being replaced. Further, the replacement of the asset may also require to "re-paint" parts of the image also, beyond simply replacing the assets, as the assets may not have the exact same shape.

Figure 22:
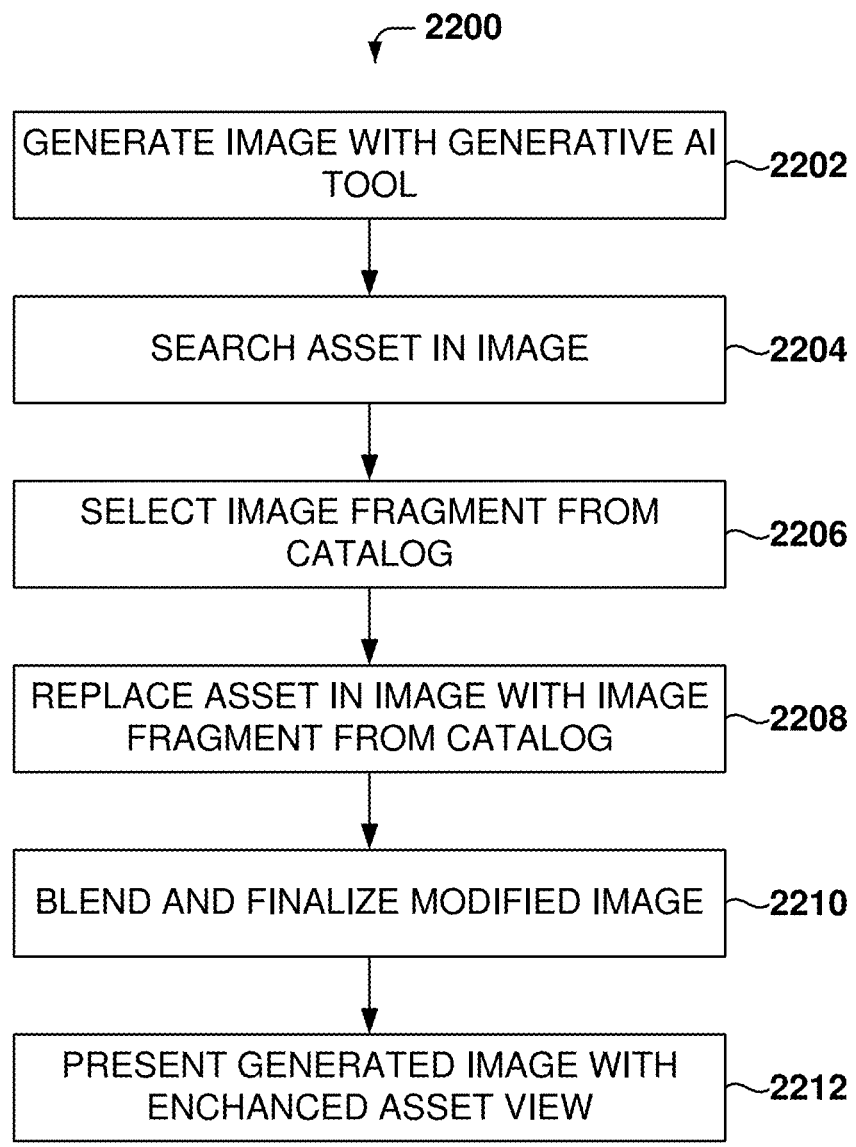
FIG. 22 is a flowchart of a method for inserting an asset image in the GAI-generated image, according to some example embodiments.

FIG. 22 is a flowchart of a method 2200 for inserting an asset image in the GAI-generated image, according to some example embodiments. While the various operations in this flowchart are presented and described sequentially, one of ordinary skill will appreciate that some or all of the operations may be executed in a different order, be combined or omitted, or be executed in parallel.

At operation 2202, an image is generated with the GAI tool. From operation 2202, the method 2200 flows to operation 2204, where the image of the asset is searched in the generated image. In some example embodiments, a tool rembg, which removes the background, is used to find the asset. Other tools may also be used, such as the option to remove background from Google Cloud Vision. Other embodiments may utilize different tools, and the tools listed should therefore not be interpreted to be exclusive or limiting, but rather illustrative.

Additionally, tools for text recognition may be used if the product includes text. After the background is removed, a fine-tune operation may be used to accurately find the product. In addition, aspect ratio comparison may be performed to compare the actual product to the product in the generated image. Further, a structural-similarity comparison may be used and other heuristics, e.g., increasing the mask area by 20% to see whether the mask is accurate.

From operation 2204, the method 2200 flows to operation 2206, where the image fragment for the product is selected for inclusion. It is noted that the same techniques described above may be used to find the mask of the product in the images in the asset catalog.

From operation 2206, the method 2200 flows to operation 2208 where the asset image from the catalog is used to replace the asset in the generated image. In some example embodiments, a tool called LAMA is used to replace the asset by removing the asset from the generated image and overlaying the product image from the catalog. However, other tools may be used to replace the asset.

From operation 2208, the method 2200 flows to operation 2210 to do some post processing (e.g., fix up the image, fix sliding) to improve the blending of the new fragment within the generated image.

From operation 2210, the method 2200 flows to operation 2212, where the generated image with the enhanced asset view is presented.

As discussed earlier, the algorithms to generate content are continuously improved as new additional data is gathered from the user to capture user preferences and what generated content had the most success being included in the canvas.

FIG. 23 illustrates the results of using the asset images in the generated content, according to some example embodiments. UI 2302 shows some of the catalog images for the asset.

UI 2304 shows some of the generated images 2306 by the content-generation tool. In this example, the user has selected image 2308 in the canvas. The generated images 2306 provide a variety of styles and backgrounds for the user to choose. The generated images 2306 show a perfect rendition of the product, because the actual image of the product has been inserted in the results.

Figure 24:
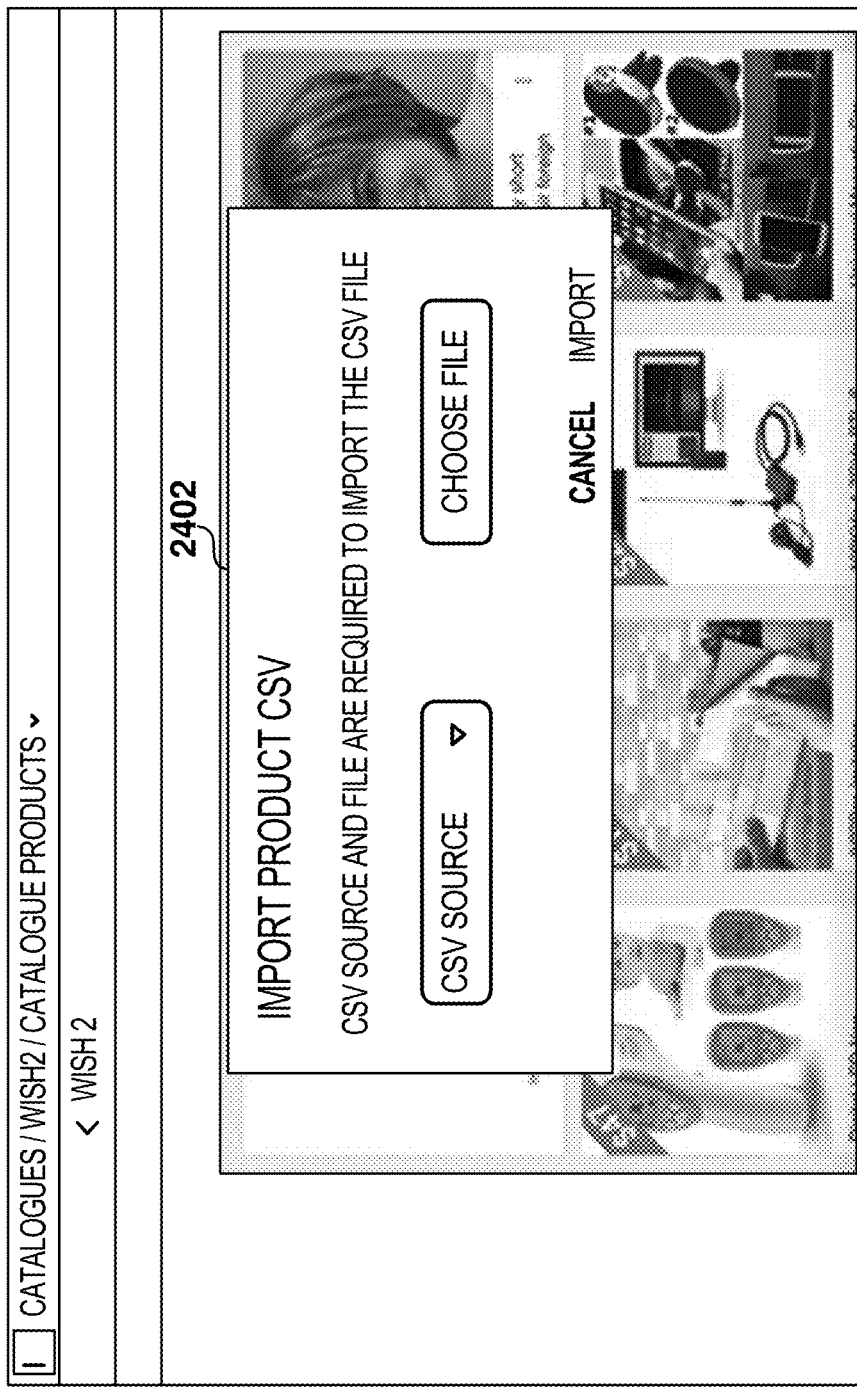
FIG. 24 is a UI for importing a catalog, according to some example embodiments.

FIG. 24 is a UI 2402 for importing a catalog, according to some example embodiments. Sometimes, users have product catalogs that they have used to generate advertisements, such as Facebook or Google. The catalogs have a predefined format. These catalogs can be imported directly into a catalog of the content-generation tool.

In the illustrated example, the user has selected to import an external catalog in Comma Separated Values (CSV) after selecting a file where the catalog is stored. The imported information is stored in a new catalog.

In some example embodiments, the format of the CSV file includes the following fields, for each product, imported from a Facebook catalog, as shown in the following Table:

TABLE 1

| Field | Description | Facebook CSV Field Name |
| --- | --- | --- |
| sourceId | Unique ID representing the product. Typically, the SKU of the product | sourceId |
| name | Name for the product | title |
| description | Description of the product | description |
| heroImage | Hero image URL link for the product | image_link |
| categories | Categories for this product | product_type |
| additionalImages | Double quoted string with comma separated URL links | additional_image_link |
| websiteLink | Link to the website showcasing the product. | link |

Figure 25:
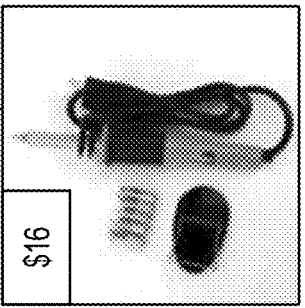
FIG. 25 shows the results of importing the catalog, according to some example embodiments.

FIG. 25 shows the results of importing the catalog, according to some example embodiments. The UI 2502 includes the imported products in the catalog, such as soldering iron 2504, with a description 2506, and corresponding categories 2510. In the example, the description 2506 includes, "Pyrography Tool 5, Soldering Iron Tips, Wood Burning Pen, Soldering Iron Station, Soldering Iron Tool, and Set Carving." The categories 2510 include Tools and Hobbies.

Additionally, the start-training button 2508 is presented to train the GAI tool with information about the imported catalog to create a custom model. The instructions on the UI 2502 read, "You can now start training the AI with your new asset. Once completed, you'll be able to use it in your prompts."

Being able to import catalogs can save many hours of work for the new client by not having to reenter all the information for all their products. The user can now generate appropriate images for their campaigns.

Further, the catalog in the content-generation tool can also be exported to CSV format to be used in a different platform, such as Facebook. The content-generation tool allows the user to personalize images and provide richer content with ease, and then use these results in other platforms. The user can now create an ad in minutes instead of hours and then used the ad in any platform.

Figure 26:
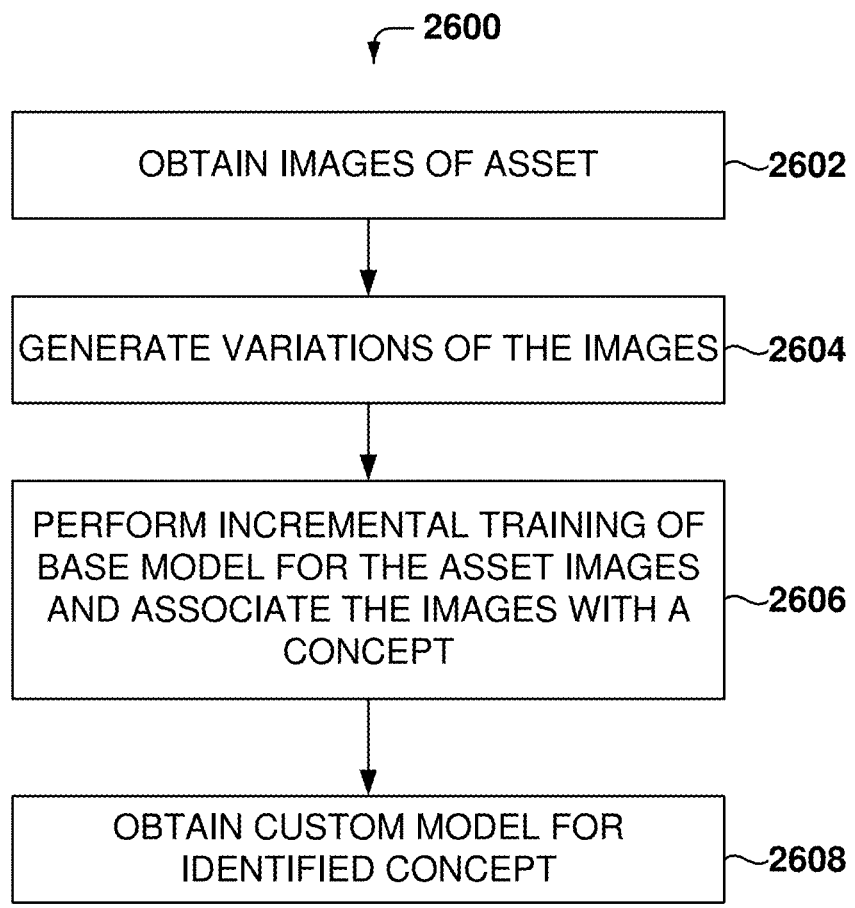
FIG. 26 is a flowchart of a method for training a custom model, according to some example embodiments.

FIG. 26 is a flowchart of a method 2600 for training a custom model, according to some example embodiments. While the various operations in this flowchart are presented and described sequentially, one of ordinary skill will appreciate that some or all of the operations may be executed in a different order, be combined or omitted, or be executed in parallel.

At operation 2602, the images of the asset are obtained. In some example embodiments, additional related images are created by doing variations 2604 of the original images, such as by changing the position of the object (e.g., in a grid of 512×512, placing the object in lower right, upper right, center, etc.) and use the variations for the training also.

In some example embodiments, the tool Stable Diffusion is used to train the model, but other embodiments may utilize other tools. Stable Diffusion is a text-to-image diffusion model that generates photorealistic images from text. It creates realistic and futuristic images. However, training Stable Diffusion is expensive, taking 150K hours on 256 Nvidia A100 GPU cards to train in one experiment.

One way to improve Stable Diffusion is to adds new concepts (also called objects) to be recognized by the model while maintaining the capabilities of the pretrained model on text-to-image generation. That is, incremental training may be performed to learn new concepts without having to retrain the model from scratch, a very expensive operation.

At operation 2606, incremental training is performed for the base model (e.g., Stable Diffusion) with the asset images and some of the associated variations created for the images to be added as concepts available for input.

In some example embodiments, Textual Inversion is used to train new concepts. Textual Inversion is a technique to understand new concepts from a small number of images that can later be used in text-to-image pipelines, where new text objects are learned in the embedding space of the text encoder in the pipeline while the other model parameters are frozen. This technique meets the requirements for creating a personalized Stable Diffusion model.

At operation 2608, the custom model is obtained for the identified concept. Once the model is trained with the new concept, Stable Diffusion is personalized for the new concept, and the new concept may be used as input to the model. For example, if the model of "Coke can" is trained, then the user may enter as input, "Photo shot of Coke can in the summer."

The content-generation tool enables what is call a "blended prompt" feature where parts of the prompt input are interpreted using GAI models (e.g., Stable Diffusion) and other parts of the prompt are interpreted using the custom models.

In some example embodiments, each asset may be trained to obtain a custom model for the asset. In other embodiments, multiple concepts may be trained simultaneously, and the corresponding assets may be created with the same model during inference to generate images for all the assets.

Initially, the model was created with a set of general concepts. For example, the model is able to generate images for shoes. Thus, the model may generate images of shoes. If a custom model is created for a particular brand and model of a shoe, then the custom model can generate images that closely resemble the particular model of shoe. However, the generated images may still not be perfect reproductions of the product, and then the process described in FIG. 22 may be used to make sure the image of the product is perfect.

In some example embodiments, feedback from the user may be collected for the generated images (e.g., a thumbs up or a thumbs down). This collected feedback may be used to analyze and fix the images and the fixed images may be used to retrain the model, so the model keeps improving as additional feedback is collected.

Figure 27:
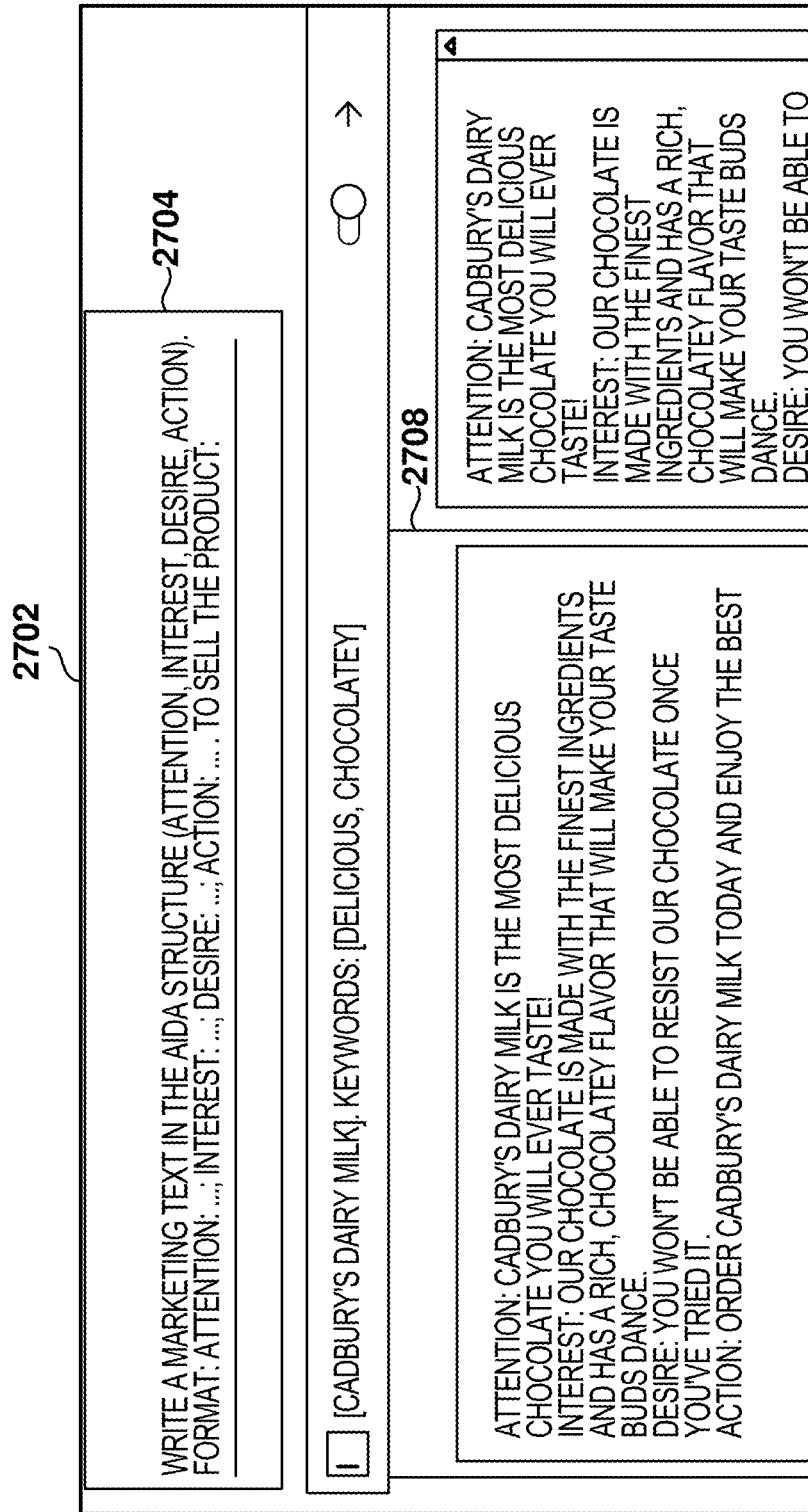
FIG. 27 is a UI illustrating options for entering input in the prompt tool, according to some example embodiments.

FIG. 27 is a UI 2702 illustrating options for entering input in the prompt tool, according to some example embodiments. In some example embodiments, the text generation is performed using a Generative Pre-trained Transformer 3 (GPT-3).

GPT-3 is an autoregressive language model that uses deep learning to produce human-like text. Given an initial text as prompt, GPT-3 produces text that continues the prompt. The architecture is a standard transformer network (with a few engineering modifications) with the unprecedented size of 2048-token-long context and 175 billion parameters (requiring 800 GB of storage). The training method is "generative pretraining," meaning that GPT-3 is trained to predict what the next token is. The GPT-3 model has demonstrated strong few-shot learning on many text-based tasks.

When using GPT-3, the content-generation tool may use the descriptions of assets that may be entered in field 2704. Also, GPT-3 may receive some commands as input to generate the text. For example, the user may enter, "Write a marketing text in the AIDA structure," where AIDA stands for Attention, Interest, Desire, and Action.

The format of the output then follows these options. In the illustrated example, the output 2708 includes the following:

Attention: "Cadbury's Dairy Milk is the most delicious chocolate you will ever taste."
Interest: "Our chocolates are made with the finest ingredients and has a rich, chocolatey flavor that will make your taste buds dance."
Desire: "You won't be able to resist our chocolate once you've tried."
Action: "Order Cadbury's Dairy Milk today and enjoy the best chocolate you ever tasted!"

Figure 28:
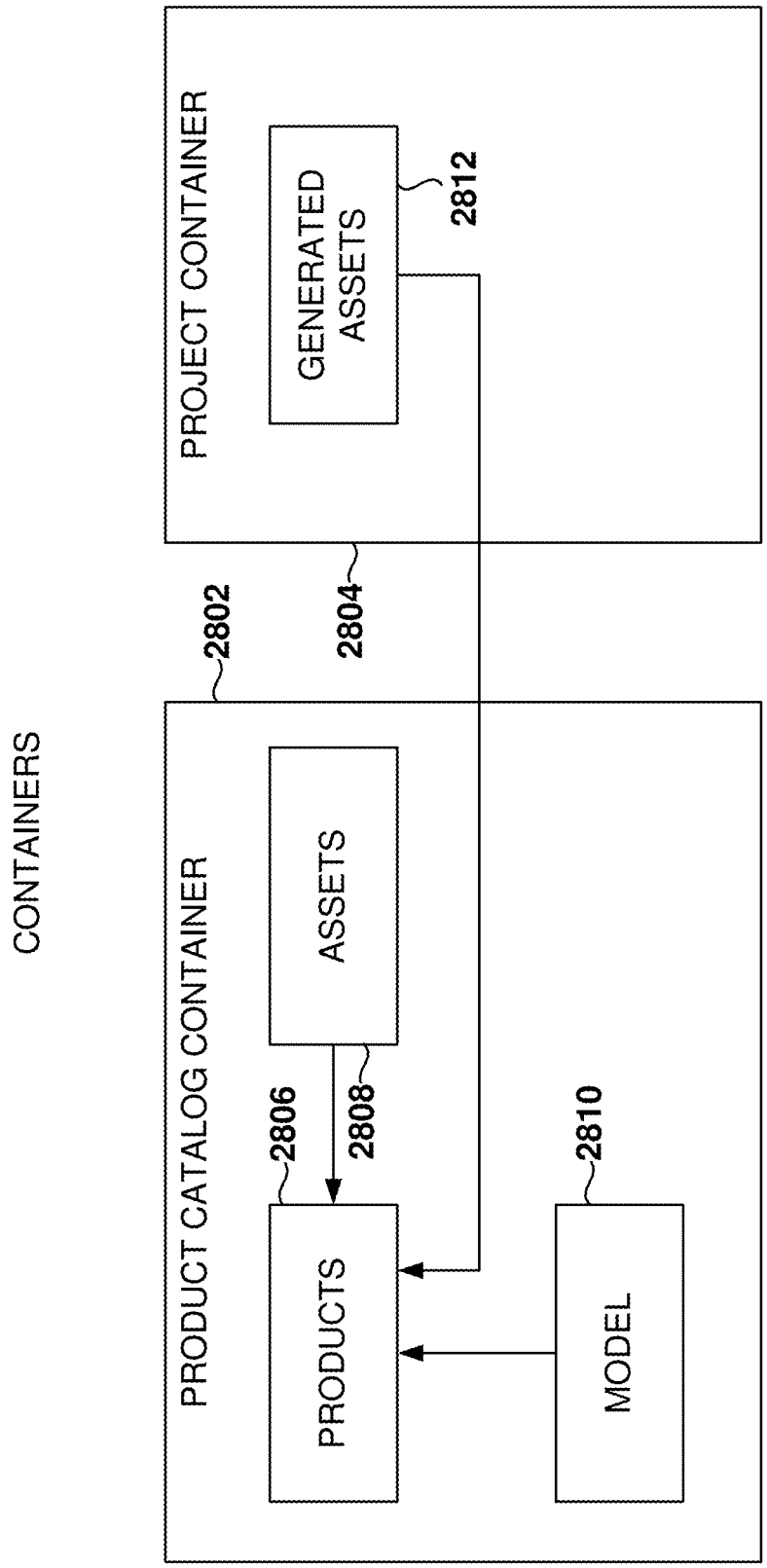
FIG. 28 is a diagram showing the structures of containers in the content-generation tool, according to some example embodiments.

FIG. 28 is a diagram showing the data structures of containers in the content-generation tool, according to some example embodiments. The content-generation tool includes a product catalog container 2802 and a project container 2804.

The product catalog container 2802 includes the information for the catalogs and includes products information 2806, assets information 2808, and model information 2810 with the custom model for the product, if created.

The project container 2804 includes the information for the products and includes information about generated assets 2812 that had been generated for the project.

Figure 29:
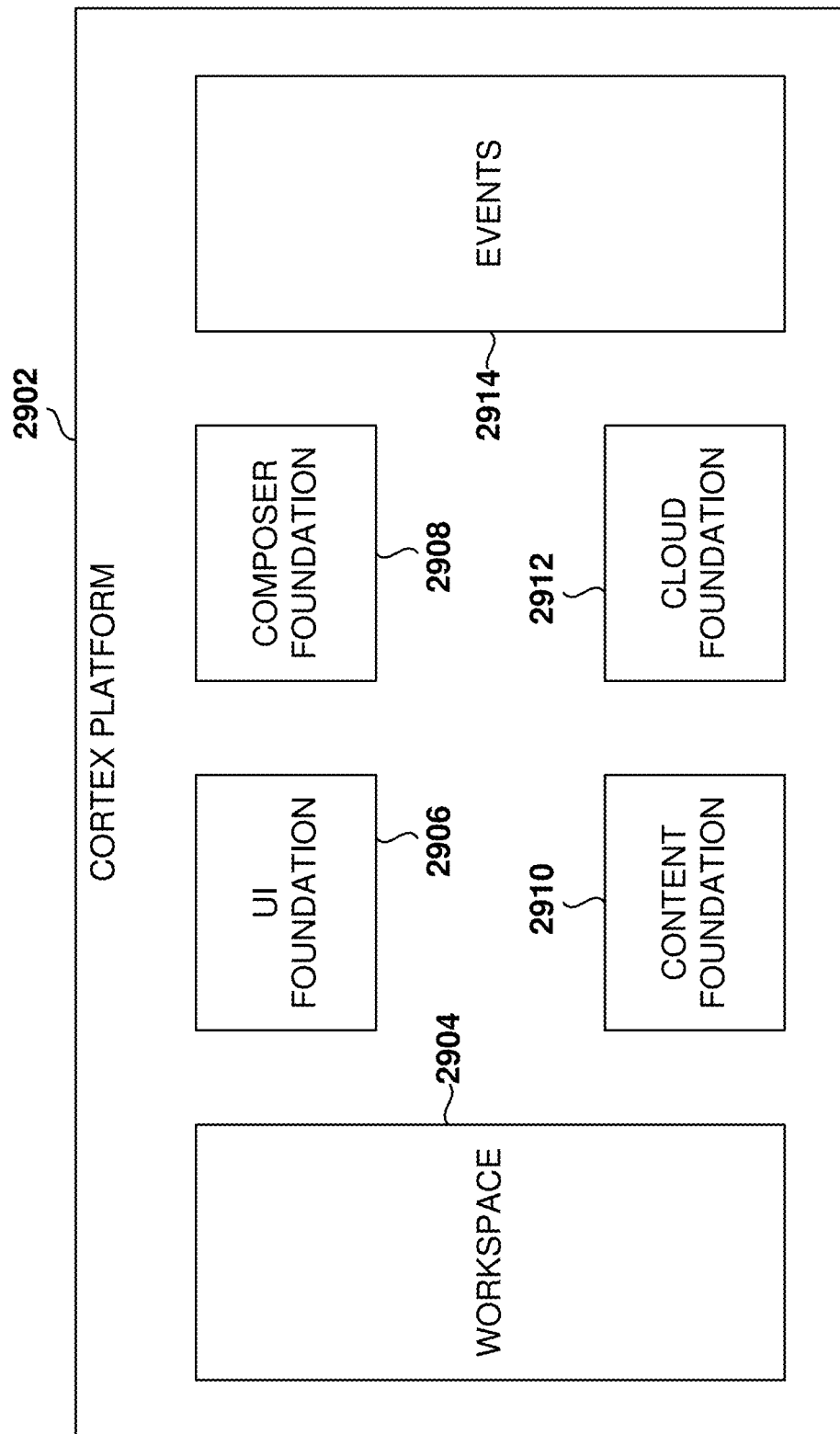
FIG. 29 is a diagram showing the cortex platform of the content-generation tool, according to some example embodiments.

FIG. 29 is a diagram showing the cortex platform 2902 of the content-generation tool, according to some example embodiments. The cortex platform 2902 is the architecture for the content-generation tool and includes a workspace 2904, a UI foundation 2906, a composer foundation 2908, a content foundation 2910, a cloud foundation 2912, and events 2914.

The workspace 2904 is a place for storing information, such as the files associated with assets, catalogs, projects, etc. The UI foundation 2906 manages and presents the UIs that are part of the content-generation tool. The composer foundation 2908 performs the operations to format and present the data.

The content foundation 2910 manages the information that is presented to the user. The cloud foundation 2912 includes the resources available in the cloud, including storage and processing components. The events 2914 refer to events that happen in the content-generation tool, such as the training for a custom model has finished, a catalog has been imported. This information is used by the different UIs to present the pertinent available options.

Figure 30:
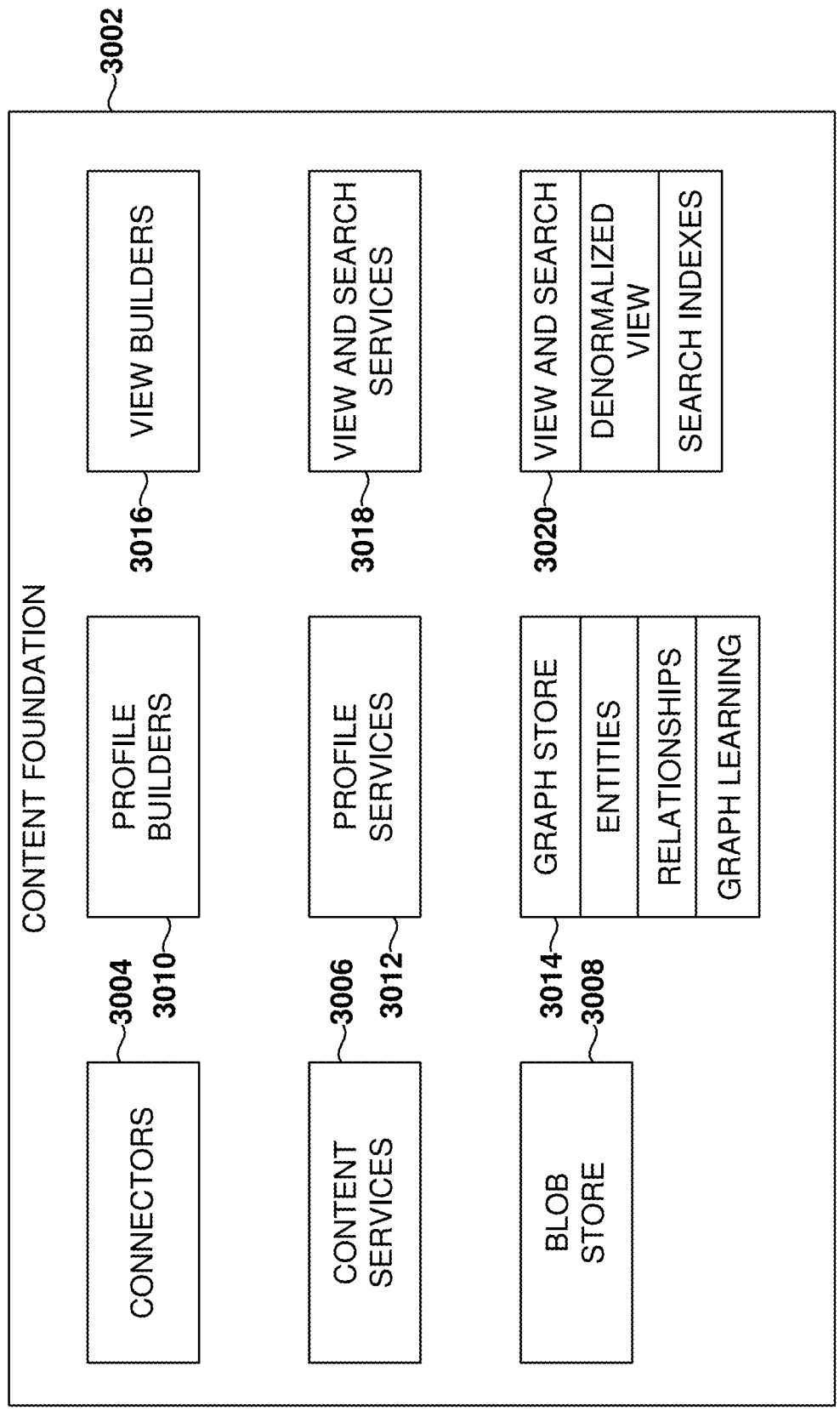
FIG. 30 is a diagram showing the content foundation of the content-generation tool, according to some example embodiments.

FIG. 30 is a diagram showing the content foundation 3002 of the content-generation tool, according to some example embodiments. The content foundation 3002 stores the information for the core entities.

The content foundation 3002 includes connectors 3004, content services 3006 (manages information that is stored in the blob store 3008), a blob store 3008 (repository on information where the data is stored), profile builders 3010 (stores the entities, relationships and learnings), profile services 3012 (provide services to gather profile information), a graph store 3014 (stores information on the entities, relationships, and graph learning), view builders 3016 (prepare presentation of the information), view and search services 3018 (provide services to present information), and view and search data 3020 (stores view information such as denormalized view and search indexes).

Figure 31:
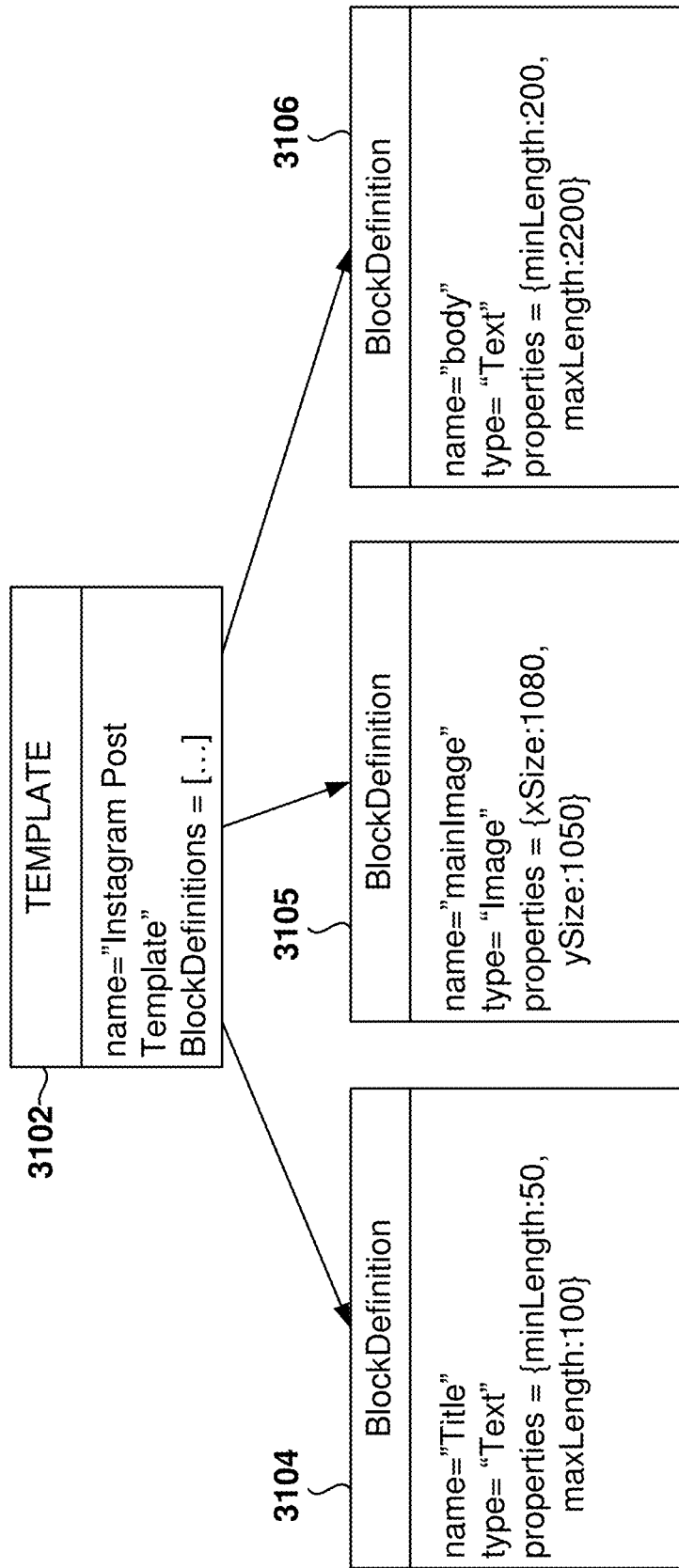
FIG. 31 illustrates the structure of a template, according to some example embodiments.

FIG. 31 illustrates the structure of a template 3102, according to some example embodiments. In some example embodiments, a block is the unit for storing information. The block can be of several types, such as text, images, hashtags (made of text back with additional constraints), audio, video, etc.

Each block type has an associated internal curated prompt corpus that is used to augment user provided prompts. For example, for an image block type, the prompt corpus can consist of categories such as camera, lighting, etc. Within the camera category, there are prompts such as "Nikon" or "Sony." In the lighting category, there can be prompts such as "Sunrise" or "glorious sunset." A sample JSON schema for the prompt corpus of images is as follows:

```
{
    "$schema": "https://json-schema.org/draft/2020-12/schema",
    "type": "object",
    "properties": {
        "cameraPrompts": {
            "type": "string",
            "enum": ["Nikon", "Sony"]
        },
        "lightingPrompts": {
            "type": "string",
            "enum": ["Sunrise", "Sunset"]
        }
    }
}
```

Some of the categories for the text block include tone of voice, writing style, etc. An example JSON schema for the text prompt corpus is as follows:

```
{
    "$schema": "https://json-schema.org/draft/2020-12/schema",
    "type": "object",
    "properties": {
        "toneOfVoice": {
            "type": "string",
            "enum": ["Humorous", "Witty", "Tense"]
        },
        "typeOfText": {
            "type": "string",
            "enum": ["Title", "Paragraph", "Article"]
        },
        "writingStyle": {
            "type": "string",
            "enum": ["Shakespeare", "Modern"]
        }
```

}
}

The generation of the content can also be controlled through content type-specific parameters. For example, for images, parameters such as output resolution size, and for text, parameters such as minLength, maxLength, etc. Each Block type has an associated set of parameters that can be used to control generation of blocks of that type. A sample JSON schema for text block parameters is as follows.

```
{
    "$schema":    "https://json-schema.org/draft/2020-12/
        schema",
    "type": "object",
    "properties": {
        "maxLength": {
            "type": "integer"
        },
        "minLength": {
            "type": "integer"
        },
        "temperature": {
            "type": "integer"
        }
    }
}
```

Context can represent an additional layer for influencing content generation. It can be used to represent: additional keywords or prompts (e.g., prompts appropriate for generating job descriptions), affinitized models, and references to assets (e.g., products or audience).

A sample JSON schema for context is as follows:

```
{
    "$schema" : "https://json-schema.org/draft/2020-12/schema",
    "type" : "object",
    "properties" : {
        "additionalPrompts" : {
            "type" : "array",
            "items" : {
                "type" : "string"
            }
        },
        "affinityModelId" : {
            "type" : "string"
        },
        "category" : {
            "type" : "string"
        }
    }
}
```

The example illustrated in FIG. 31 shows the Instagram post template 3102 that includes three block definitions: a title block 3104 (text between 50 and 100 characters), an image block 3105 (size 1080×1050), and a body block 3106 (text of the post between 200 in 2200 characters).

The block for the template 3102 includes a name ("Instagram Post Template") and a list with the three blocks 3104-3106. Each block includes a name, the type, and the properties of the block (e.g., minimum length, maximum length, horizontal size, vertical size).

Text inputs are usually free form, but by adding properties to the blocks based on the type of content being created helps understand what the user is trying to accomplish, and the content-generation tool is able to better match the results to the desired intent.

The content-generation tool also provides an Application Programming Interface (API) to create templates programmatically. Thus, the API includes commands for template creation and also commands for loading a specified template and generating blocks of content that are returned as results to the API call.

Thus, the content-generation tool provides a visual template editor to create a template via a UI by adding blocks to the template, and the API to generate the template. Further, the canvas in the UI can be used to generate content as well as the API.

Figure 32:
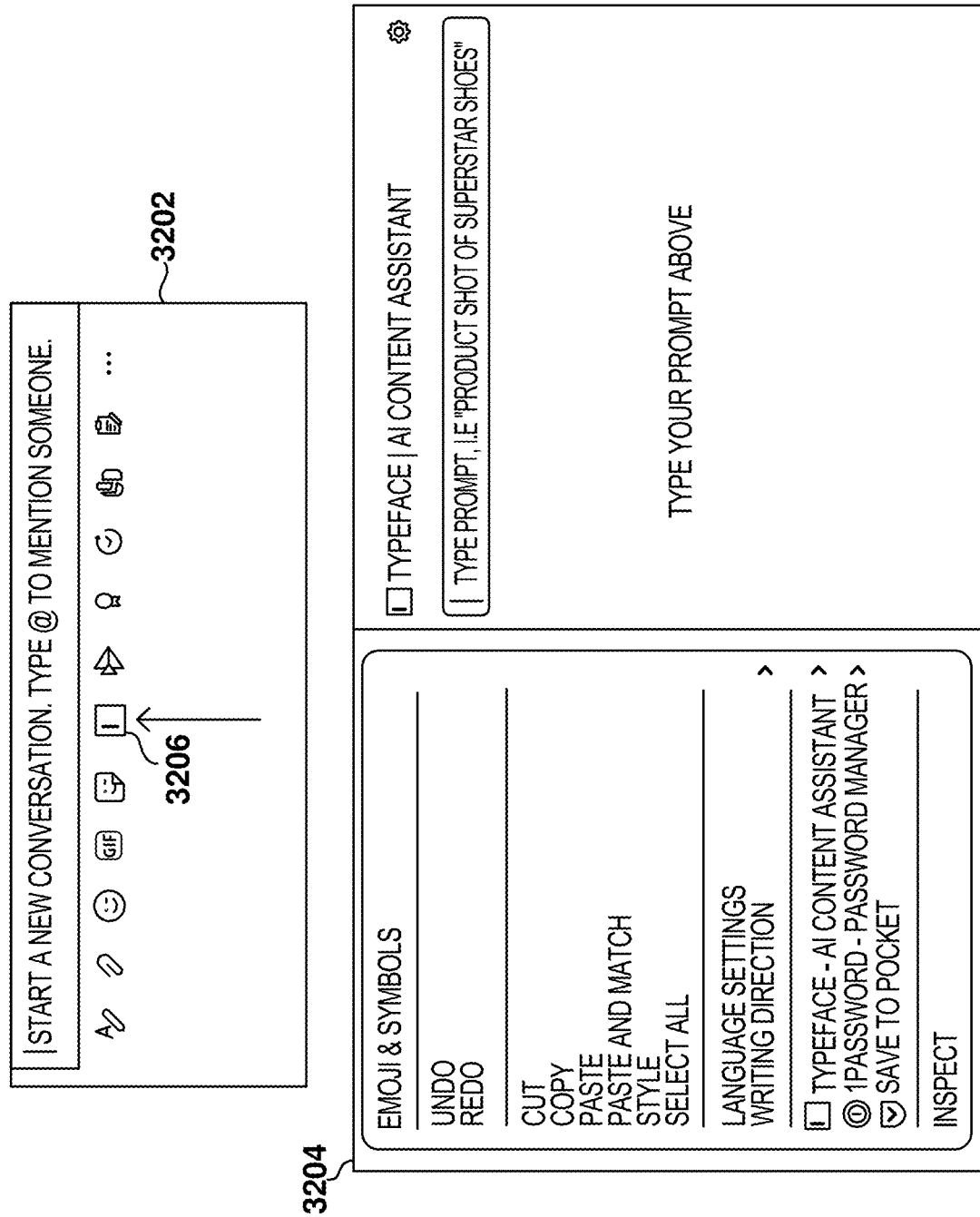
FIG. 32 illustrates the programmatic embedding of the content-generation tool in other programs, according to some example embodiments.

FIG. 32 illustrates the programmatic embedding of the content-generation tool in other programs, according to some example embodiments. The content-generation tool includes program hooks to include commands in other applications to invoke the content-generation tool and then include the content generated by the content-generation tool in the other applications.

The content-generation tool can be embedded in many types of tools, such as text processing tools, image processing tools, video processing tools, collaboration tools (e.g., Slack, MS Teams), browsers, etc.

For example, an icon 3206 may be provided in a Graphical User Interface (GUI) 3202 to invoke the content-generation tool. If the user selects the icon 3206, then window 3204 is presented with a version of the canvas for entering input in the prompt.

The content-generation tool may be invoked with just a few lines of code embedded in the application. When the code is invoked, the code interacts with a server that provides the content-generation tool UI. Thus, it is very easy to embed the content-generation tool in other programs. For example, the powerful prompt tool is provided with its interactive and AI-driven capabilities to generate GAI content.

Figure 33:
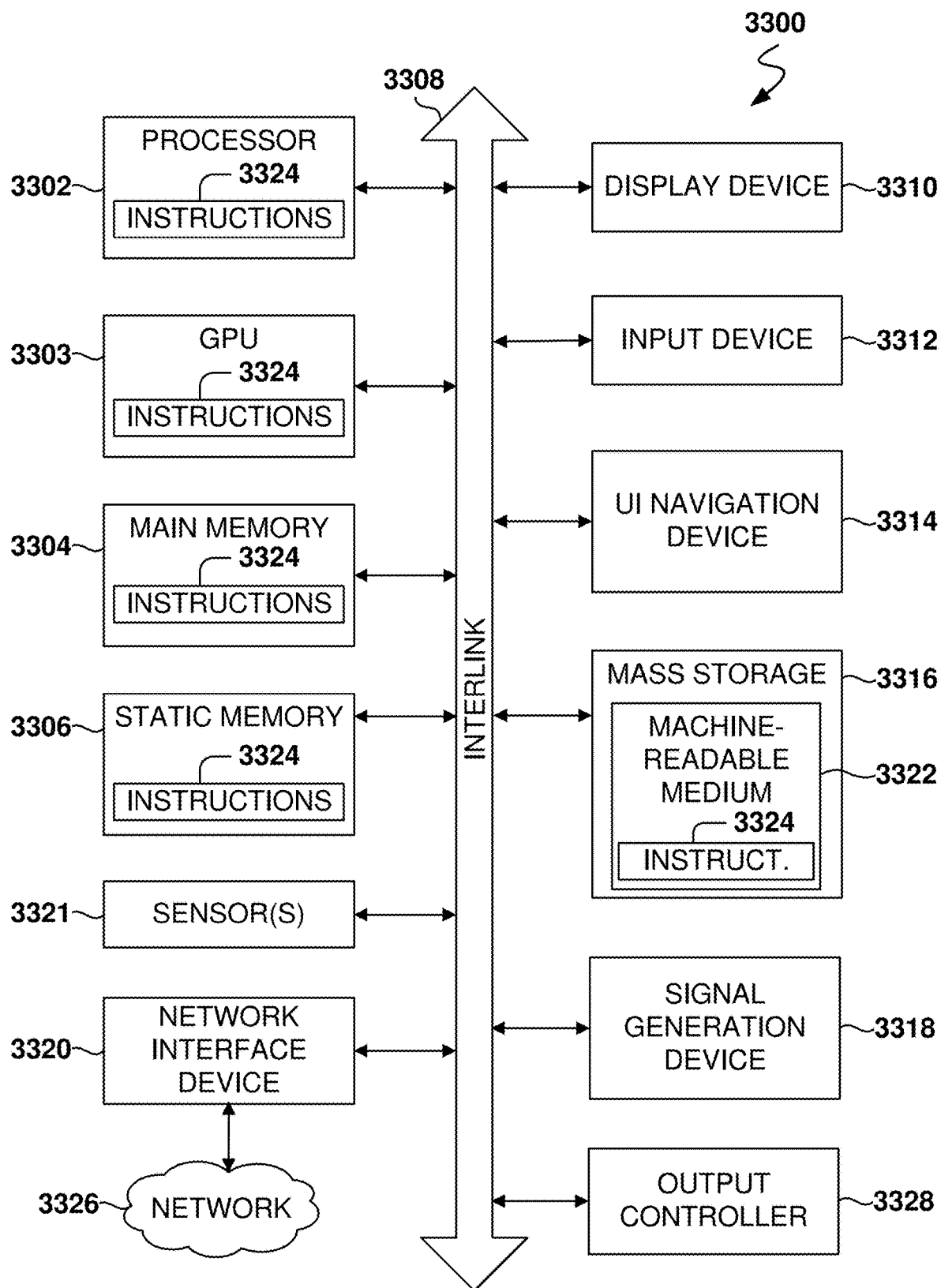
FIG. 33 is a block diagram illustrating an example of a machine upon or by which one or more example process embodiments described herein may be implemented or controlled.

FIG. 33 is a block diagram illustrating an example of a machine 3300 upon or by which one or more example process embodiments described herein may be implemented or controlled. In alternative embodiments, the machine 3300 may operate as a standalone device or may be connected (e.g., networked) to other machines. In a networked deployment, the machine 3300 may operate in the capacity of a server machine, a client machine, or both in server-client network environments. In an example, the machine 3300 may act as a peer machine in a peer-to-peer (P2P) (or other distributed) network environment. Further, while only a single machine 3300 is illustrated, the term "machine" shall also be taken to include any collection of machines that individually or jointly execute a set (or multiple sets) of instructions to perform any one or more of the methodologies discussed herein, such as via cloud computing, software as a service (SaaS), or other computer cluster configurations.

Examples, as described herein, may include, or may operate by, logic, various components, or mechanisms. Circuitry is a collection of circuits implemented in tangible entities that include hardware (e.g., simple circuits, gates, logic). Circuitry membership may be flexible over time and underlying hardware variability. Circuitries include members that may, alone or in combination, perform specified operations when operating. In an example, hardware of the circuitry may be immutably designed to carry out a specific operation (e.g., hardwired). In an example, the hardware of the circuitry may include variably connected physical components (e.g., execution units, transistors, simple circuits) including a computer-readable medium physically modified (e.g., magnetically, electrically, by moveable placement of invariant massed particles) to encode instructions of the specific operation. In connecting the physical components, the underlying electrical properties of a hardware constituent are changed (for example, from an insulator to a conductor or vice versa). The instructions enable embedded hardware (e.g., the execution units or a loading mechanism) to create members of the circuitry in hardware via the variable connections to carry out portions of the specific operation when in operation. Accordingly, the computer-readable medium is communicatively coupled to the other components of the circuitry when the device is operating. In an example, any of the physical components may be used in more than one member of more than one circuitry. For example, under operation, execution units may be used in a first circuit of a first circuitry at one point in time and reused by a second circuit in the first circuitry, or by a third circuit in a second circuitry, at a different time.

The machine 3300 (e.g., computer system) may include a hardware processor 3302 (e.g., a central processing unit (CPU), a hardware processor core, or any combination thereof), a graphics processing unit (GPU 3303), a main memory 3304, and a static memory 3306, some or all of which may communicate with each other via an interlink 3308 (e.g., bus). The machine 3300 may further include a display device 3310, an alphanumeric input device 3312 (e.g., a keyboard), and a user interface (UI) navigation device 3314 (e.g., a mouse). In an example, the display device 3310, alphanumeric input device 3312, and UI navigation device 3314 may be a touch screen display. The machine 3300 may additionally include a mass storage device 3316 (e.g., drive unit), a signal generation device 3318 (e.g., a speaker), a network interface device 3320, and one or more sensors 3321, such as a Global Positioning System (GPS) sensor, compass, accelerometer, or another sensor. The machine 3300 may include an output controller 3328, such as a serial (e.g., universal serial bus (USB)), parallel, or other wired or wireless (e.g., infrared (IR), near field communication (NFC)) connection to communicate with or control one or more peripheral devices (e.g., a printer, card reader).

The mass storage device 3316 may include a machine-readable medium 3322 on which is stored one or more sets of data structures or instructions 3324 (e.g., software) embodying or utilized by any one or more of the techniques or functions described herein. The instructions 3324 may also reside, completely or at least partially, within the main memory 3304, within the static memory 3306, within the hardware processor 3302, or within the GPU 3303 during execution thereof by the machine 3300. In an example, one or any combination of the hardware processor 3302, the GPU 3303, the main memory 3304, the static memory 3306, or the mass storage device 3316 may constitute machine-readable media.

While the machine-readable medium 3322 is illustrated as a single medium, the term "machine-readable medium" may include a single medium, or multiple media, (e.g., a centralized or distributed database, and/or associated caches and servers) configured to store the one or more instructions 3324.

The term "machine-readable medium" may include any medium that is capable of storing, encoding, or carrying instructions 3324 for execution by the machine 3300 and that cause the machine 3300 to perform any one or more of the techniques of the present disclosure, or that is capable of storing, encoding, or carrying data structures used by or associated with such instructions 3324. Non-limiting machine-readable medium examples may include solid-state memories, and optical and magnetic media. In an example, a massed machine-readable medium comprises a machine-readable medium 3322 with a plurality of particles having invariant (e.g., rest) mass. Accordingly, massed machine-readable media are not transitory propagating signals. Specific examples of massed machine-readable media may include non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; and CD-ROM and DVD-ROM disks.

The instructions 3324 may further be transmitted or received over a communications network 3326 using a transmission medium via the network interface device 3320.

Figure 34:
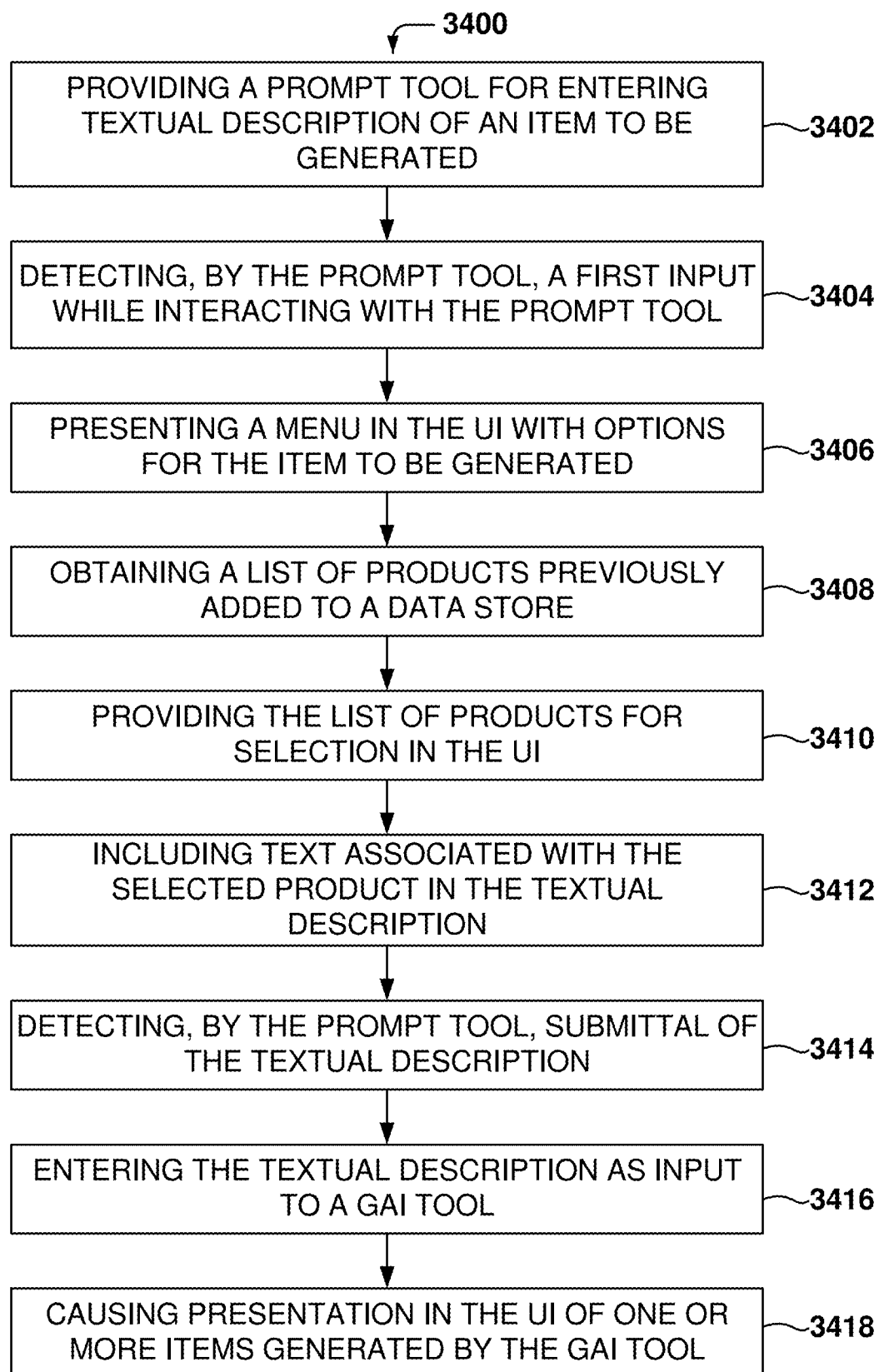
FIG. 34 is a flowchart of a method for providing a prompt tool with interactive entry, according to some example embodiments.

FIG. 34 is a flowchart of a method 3400 for providing a prompt tool with interactive entry, according to some example embodiments. While the various operations in this flowchart are presented and described sequentially, one of ordinary skill will appreciate that some or all of the operations may be executed in a different order, be combined or omitted, or be executed in parallel.

Operation 3402 is for providing, in a user interface (UI), a prompt tool for entering textual description of an item to be generated, where the prompt tool is interactive and configured to analyze the textual description to determine a type of item to be created. The item is one of an output text or an output image based on the textual description.

From, operation 3402, the method 3400 flows to operation 3404 for detecting, by the prompt tool, a first input while interacting with the prompt tool. The first input is one of a special character entered in the textual description or a mouse action requesting assistance.

From, operation 3404, the method 3400 flows to operation 3406 where, in response to the first input, a menu is presented in the UI with options for the item to be generated.

From, operation 3406, the method 3400 flows to operation 3408 where, in response to detecting a selection of asset in the menu, a list of products previously added to a data store is obtained.

From, operation 3408, the method 3400 flows to operation 3410 for providing the list of products for selection in the UI.

From, operation 3410, the method 3400 flows to operation 3412 where, in response to a selection of a product from the list of products, text associated with the selected product is included in the textual description.

From, operation 3412, the method 3400 flows to operation 3414 for detecting, by the prompt tool, submittal of the textual description.

From, operation 3414, the method 3400 flows to operation 3416 for entering the textual description as input to a generative artificial intelligence (GAI) tool.

From, operation 3416, the method 3400 flows to operation 3418 for causing presentation in the UI of one or more items generated by the GAI tool.

In one example, including text associated with the selected product in the textual description comprises utilizing special formatting for the included text in the textual description that has different formatting from text received from a user in the prompt tool.

In one example, the prompt tool is a guided experience following a rule-based flow to limit options presented based on input received.

In one example, the method 3400 further comprises detecting that the selected asset is associated with a custom model for the GAI tool that has been trained with data associated with the selected asset; and utilizing the custom model as the GAI tool for generating the one or more items.

In one example, the prompt tool provides an option to derive multimodal content from other pieces of content generated with the prompt tool.

In one example, the menu includes options comprising at least one of content type, asset, overlay type, camera scene, camera lens, camera film type, camera type, lighting style, color theme, image style, or photography style.

Another general aspect is for a system that includes a memory comprising instructions and one or more computer processors. The instructions, when executed by the one or more computer processors, cause the one or more computer processors to perform operations comprising: providing, in a user interface (UI), a prompt tool for entering textual description of an item to be generated, wherein the prompt tool is interactive and configured to analyze the textual description to determine a type of item to be created, the item being one of an output text or an output image based on the textual description; detecting, by the prompt tool, a first input while interacting with the prompt tool, the first input being one of a special character entered in the textual description or a mouse action requesting assistance; in response to the first input, presenting a menu in the UI with options for the item to be generated; in response to detecting a selection of asset in the menu, obtaining a list of products previously added to a data store; providing the list of products for selection in the UI; in response to a selection of a product from the list of products, including text associated with the selected product in the textual description; detecting, by the prompt tool, submittal of the textual description; entering the textual description as input to a generative artificial intelligence (GAI) tool; and causing presentation in the UI of one or more items generated by the GAI tool.

In yet another general aspect, a non-transitory machine-readable storage medium (e.g., a non-transitory storage medium) includes instructions that, when executed by a machine, cause the machine to perform operations comprising: providing, in a user interface (UI), a prompt tool for entering textual description of an item to be generated, wherein the prompt tool is interactive and configured to analyze the textual description to determine a type of item to be created, the item being one of an output text or an output image based on the textual description; detecting, by the prompt tool, a first input while interacting with the prompt tool, the first input being one of a special character entered in the textual description or a mouse action requesting assistance; in response to the first input, presenting a menu in the UI with options for the item to be generated; in response to detecting a selection of asset in the menu, obtaining a list of products previously added to a data store; providing the list of products for selection in the UI; in response to a selection of a product from the list of products, including text associated with the selected product in the textual description; detecting, by the prompt tool, submittal of the textual description; entering the textual description as input to a generative artificial intelligence (GAI) tool; and causing presentation in the UI of one or more items generated by the GAI tool.

Figure 35:
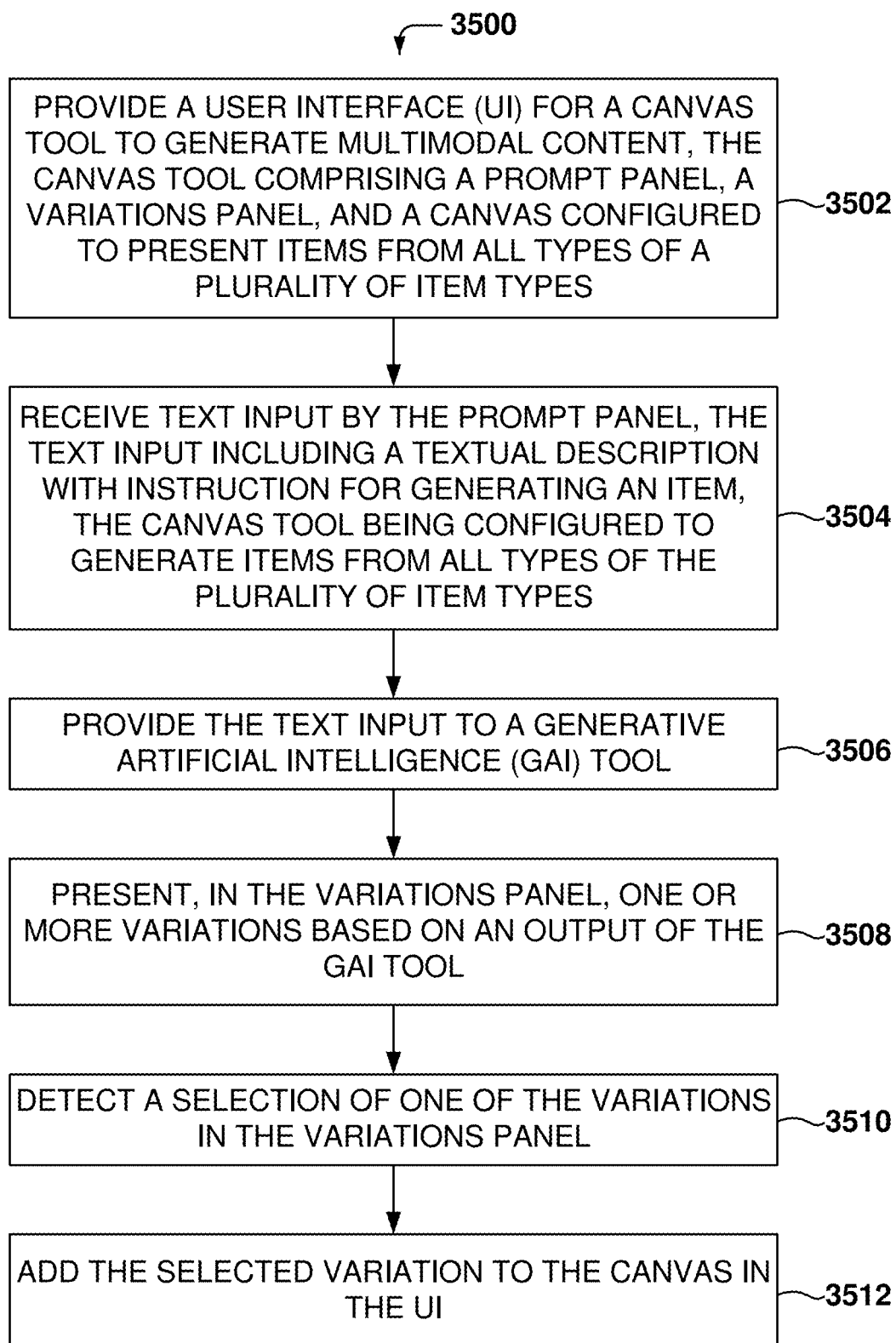
FIG. 35 is a flowchart of a method for providing an interactive canvas tool to generate multimodal, personalized content, according to some example embodiments.

FIG. 35 is a flowchart of a method 3500 for providing an interactive canvas tool to generate multimodal, personalized content, according to some example embodiments.

Operation 3502 is for providing a user interface (UI) for a canvas tool to generate multimodal content, the canvas tool comprising a prompt panel, a variations panel, and a canvas configured to present items from all types of a plurality of item types. The plurality of item types comprises a text type and an image type.

From operation 3502, the method 3500 flows to operation 3504 for receiving text input by the prompt panel. The text input includes a textual description with instruction for generating an item, and the canvas tool is configured to generate items from all types of the plurality of item types.

From operation 3504, the method 3500 flows to operation 3506 for providing the text input to a GAI tool.

From operation 3506, the method 3500 flows to operation 3508 for presenting, in the variations panel, one or more variations based on an output of the GAI tool.

From operation 3508, the method 3500 flows to operation 3510 to detect a selection of one of the variations in the variations panel.

From operation 3510, the method 3500 flows to operation 3512 for adding the selected variation to the canvas in the UI.

In one example, the method 3500 further comprises
2. The method as recited in claim 1, further comprising:
determining a requested item type based on the received text input; and
selecting, based on the requested item type, the GAI tool, from a plurality of GAI tools, for generating the one or more variations.

In one example, the received text input includes a request to generate text, wherein the one or more variations include text descriptions.

In one example, the received text input includes a request to generate an image, wherein the one or more variations include images.

In one example, the method 3500 further comprises, before presenting the one or more variations, modifying each output of the GAI tool to embed an image of a custom asset from a user database.

In one example, the method 3500 further comprises repeating the receiving text input and the generating to create new variations, and adding one of the new variations to the canvas.

In one example, the method 3500 further comprises providing an option in the UI to edit text in the canvas.

In one example, the method 3500 further comprises utilizing a template to generate several items for the canvas, the template comprising a plurality of operations, each operation comprising an option to enter a description in the prompt panel to generate the variations.

In one example, the plurality of item types further comprises a video type and an audio type.

In one example, the canvas comprises a text variation and an image variation.

Another general aspect is for a system that includes a memory comprising instructions and one or more computer processors. The instructions, when executed by the one or more computer processors, cause the one or more computer processors to perform operations comprising: providing a user interface (UI) for a canvas tool to generate multimodal content, the canvas tool comprising a prompt panel, a variations panel, and a canvas configured to present items from all types of a plurality of item types, the plurality of item types comprising a text type and an image type; receiving text input by the prompt panel, the text input including a textual description with instruction for generating an item, the canvas tool being configured to generate items from all types of the plurality of item types; providing the text input to a generative artificial intelligence (GAI) tool; presenting, in the variations panel, one or more variations based on an output of the GAI tool; detecting a selection of one of the variations in the variations panel; and adding the selected variation to the canvas in the UI.

In yet another general aspect, a non-transitory machine-readable storage medium (e.g., a non-transitory storage medium) includes instructions that, when executed by a machine, cause the machine to perform operations comprising: providing a user interface (UI) for a canvas tool to generate multimodal content, the canvas tool comprising a prompt panel, a variations panel, and a canvas configured to present items from all types of a plurality of item types, the plurality of item types comprising a text type and an image type; receiving text input by the prompt panel, the text input including a textual description with instruction for generating an item, the canvas tool being configured to generate items from all types of the plurality of item types; providing the text input to a generative artificial intelligence (GAI) tool; presenting, in the variations panel, one or more variations based on an output of the GAI tool; detecting a selection of one of the variations in the variations panel; and adding the selected variation to the canvas in the UI.

Figure 36:
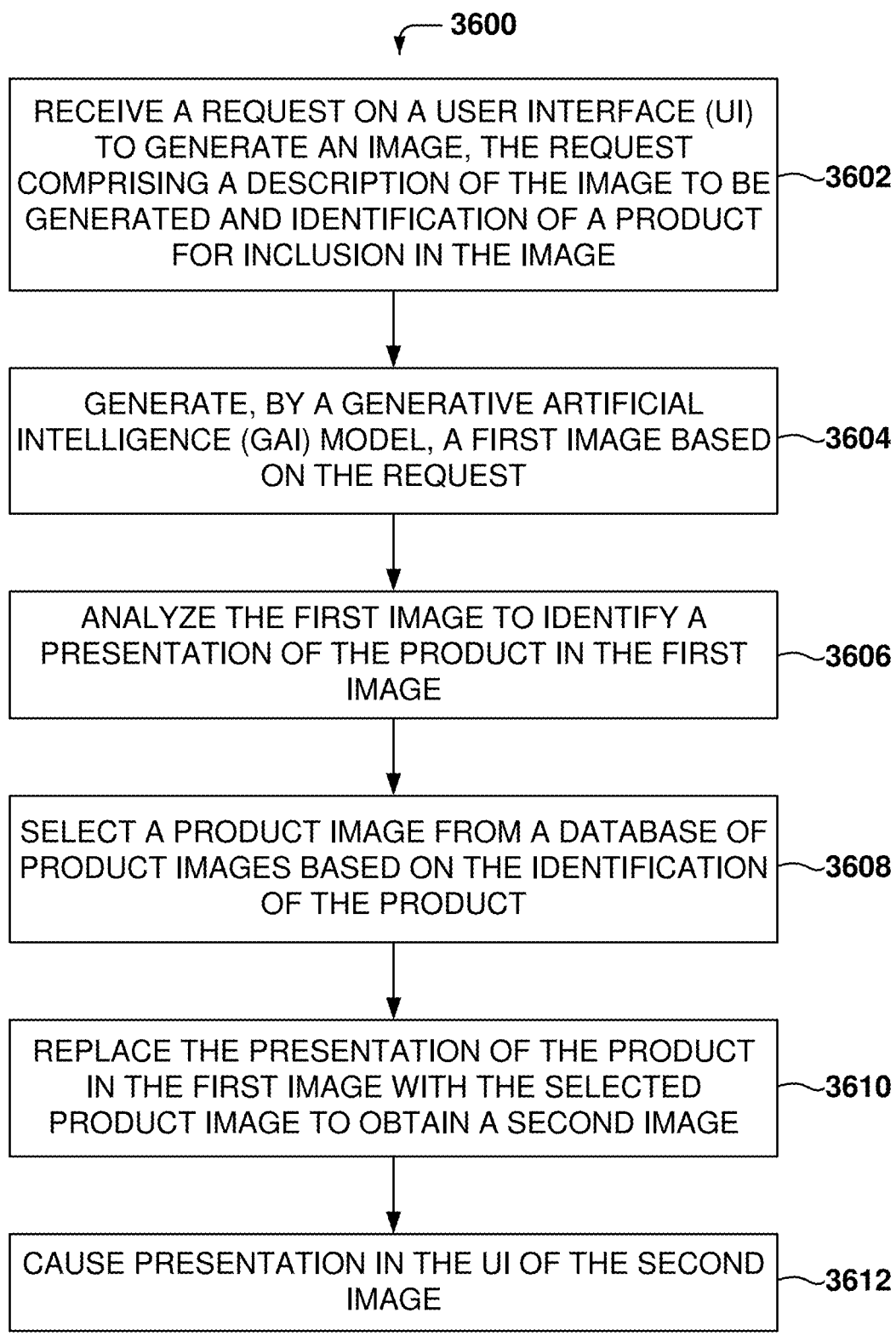
FIG. 36 is a flowchart of a method for enhancing a machine-generated product image, according to some example embodiments.

FIG. 36 is a flowchart of a method 3600 for enhancing a machine-generated product image, according to some example embodiments. While the various operations in this flowchart are presented and described sequentially, one of ordinary skill will appreciate that some or all of the operations may be executed in a different order, be combined or omitted, or be executed in parallel.

Operation 3602 is for receiving a request on a UI to generate an image. The request comprises a description of the image to be generated and identification of a product for inclusion in the image.

From operation 3602, the method 3600 flows to operation 3604 to generate, by a generative artificial intelligence (GAI) model, a first image based on the request.

From operation 3604, the method 3600 flows to operation 3606 for analyzing the first image to identify a presentation of the product in the first image.

From operation 3606, the method 3600 flows to operation 3608 for selecting a product image from a database of product images based on the identification of the product.

From operation 3608, the method 3600 flows to operation 3610 to replace the presentation of the product in the first image with the selected product image to obtain a second image.

From operation 3610, the method 3600 flows to operation 3612 for causing presentation in the UI of the second image.

In one example, the GAI model is affinitized by customizing the GAI model with training data that includes images of the product.

In one example, replacing the presentation of the product in the first image further comprises: inserting the selected product image in the first image to obtain the second image; and postprocessing the second image after the inserting to optimize lighting and a representation of the product in the second image.

In one example, the postprocessing includes adjusting lighting and blending, fixing luminosity with reference to a product surrounding, and enhancing contour masks in the second image.

In one example, analyzing the first image to identify a presentation of the product further comprises generating a mask for the product in the first image, wherein the mask is used to replace the presentation of the product in the first image.

In one example, the method 3600 further comprises generation a plurality of variations of enhanced GAI images of the product, and presenting the plurality of variations on the UI.

In one example, analyzing the first image to identify a presentation of the product further comprises: removing a background in the first image, and search for the presentation of the product in the image with the removed background.

In one example, analyzing the first image to identify a presentation of the product further comprises utilizing text recognition in the first image to find text associated with the presentation of the product.

In one example, analyzing the first image to identify a presentation of the product further comprises performing aspect ratio comparison to compare the product to the presentation of the product in the first image.

In one example, the method 3600 further comprises utilizing a template to generate several items in the UI, the template comprising a plurality of operations, each operation comprising an option to enter a description to generate the several items.

Another general aspect is for a system that includes a memory comprising instructions and one or more computer processors. The instructions, when executed by the one or more computer processors, cause the one or more computer processors to perform operations comprising: receiving a request on a user interface (UI) to generate an image, the request comprising a description of the image to be generated and identification of a product for inclusion in the image; generating, by a generative artificial intelligence (GAI) model, a first image based on the request; analyzing the first image to identify a presentation of the product in the first image; selecting a product image from a database of product images based on the identification of the product; replacing the presentation of the product in the first image with the selected product image to obtain a second image; and causing presentation in the UI of the second image.

In yet another general aspect, a non-transitory machine-readable storage medium (e.g., a non-transitory storage medium) includes instructions that, when executed by a machine, cause the machine to perform operations comprising: receiving a request on a user interface (UI) to generate an image, the request comprising a description of the image to be generated and identification of a product for inclusion in the image; generating, by a generative artificial intelligence (GAI) model, a first image based on the request; analyzing the first image to identify a presentation of the product in the first image; selecting a product image from a database of product images based on the identification of the product; replacing the presentation of the product in the first image with the selected product image to obtain a second image; and causing presentation in the UI of the second image.

Figure 37:
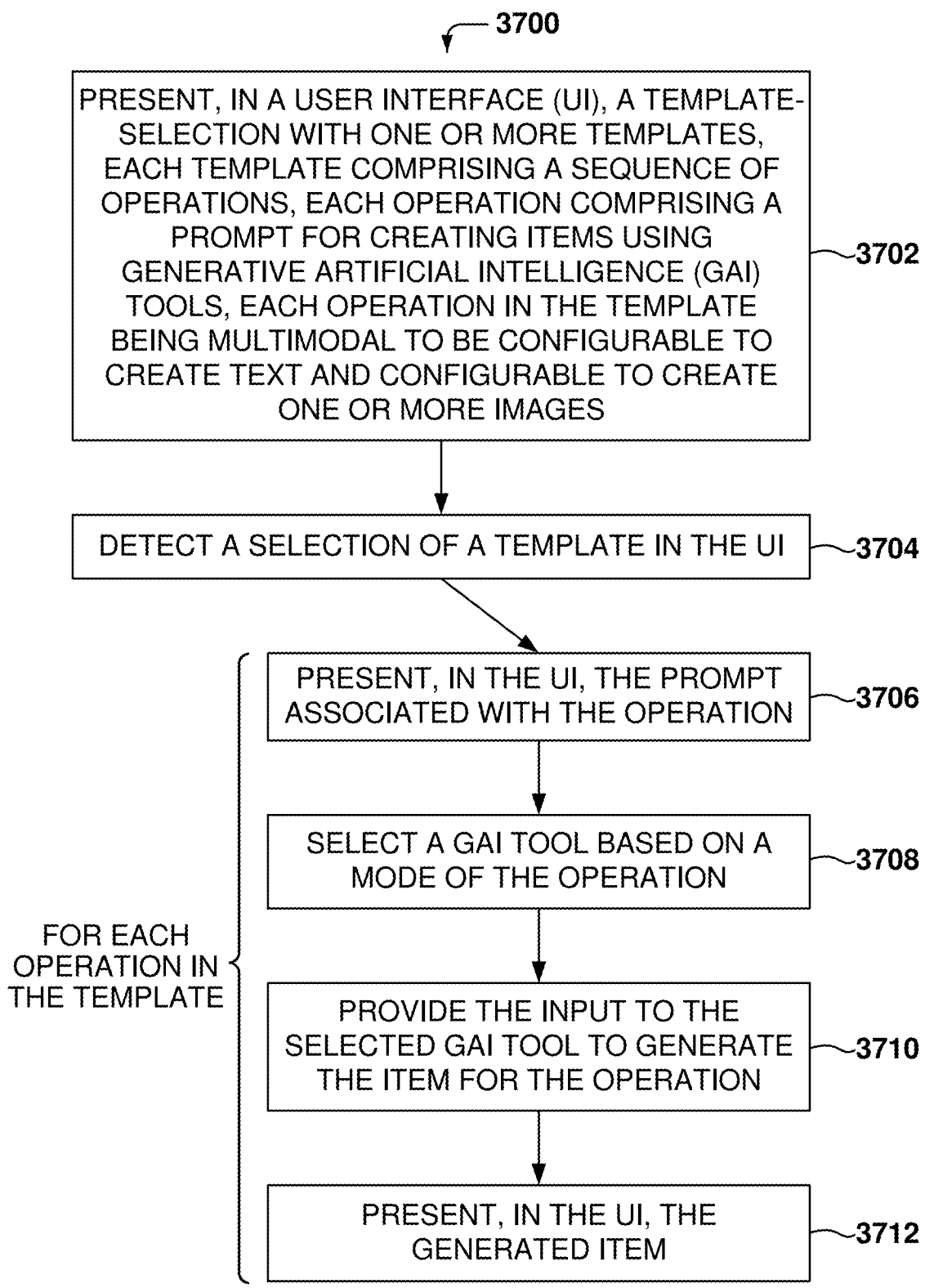
FIG. 37 is a flowchart of a method for generating multimodal content utilizing multimodal templates, according to some example embodiments.

FIG. 37 is a flowchart of a method 3700 for generating multimodal content utilizing multimodal templates, according to some example embodiments. While the various operations in this flowchart are presented and described sequentially, one of ordinary skill will appreciate that some or all of the operations may be executed in a different order, be combined or omitted, or be executed in parallel.

Operation 3702 is for presenting, in a UI, a template-selection with one or more templates. Each template comprises a sequence of operations, and each operation comprises a prompt for creating items using generative artificial intelligence (GAI) tools. Further, each operation in the template is multimodal to be configurable to create text and configurable to create one or more images.

From operation 3702, the method 3700 flows to operation 3704 for detecting a selection of a template in the UI.

After operation 3704, operations 3706, 3708, 3710, and 3712 are performed for each operation in the selected template. Operation 3706 is for presenting, in the UI, the prompt associated with the operation of the template.

From operation 3706, the method 3700 flows to operation 3708 where, in response to receiving an input for the prompt, a GAI tool is selected based on a mode of the operation.

From operation 3708, the method 3700 flows to operation 3710 for providing the input to the selected GAI tool to generate the item for the operation.

From operation 3710, the method 3700 flows to operation 3712 for presenting, in the UI, the generated item.

In one example, the template is configurable to be associated with an asset, wherein providing the input to the selected GAI tool further comprises obtaining metadata for the asset from an asset catalog, and providing the metadata for the asset to the GAI tool.

In one example, the method 3700 further comprises tracking a plurality of operations to generate multimodal content; presenting, in the UI, the tracked plurality of operations; and providing, in the UI, an option to generate a template based on the tracked plurality of operations, wherein the template is generated without requiring programming.

In one example, the template is further configurable to create a video file and configurable to create a sound file.

In one example, the template is further configurable to include relationships between blocks, wherein a first relationship comprises generating an image based on a generated text, and a second relationship comprises generating text based on an image.

In one example, the operations of the template include at least one of entering text for a title, selecting a product from a catalog, entering a description of the image, or entering a prompt input for generating text.

In one example, the template is an Instagram template for generating an Instagram post, the Instagram template comprising one or more images, a text associated with the one or more images, and one or more hashtags.

In one example, the template is a Facebook template for generating a Facebook post, the Facebook template comprising one or more images, a text associated with the one or more images, a headline, and a call-to-action button.

In one example, the template is a blog-post template for generating a blog post, the blog-post template comprising a title, an introduction text, a transition text, one or more outline headings describing what is covered in the blog post, a summary text, and a call to action.

In one example, the sequence of operations for a blog-post template comprises: generating an outline, generating a title for the blog post, generating an introduction paragraph, generating an image based on a topic of the blog post, generating a transition paragraph, generating an outline for topics to cover in the blog post, expanding the outline topics with one or more paragraphs, generating optional images for each topic, and generating a summary for the blog post.

In one example, the sequence of operations for a sample template comprises generating an image, generating a caption for the image, and generating hashtags based on the generated image and the generated caption.

In one example, the method 3700 further comprises, after performing the operations of the selected template, providing a canvas in the UI in interactive mode to enable refinement of the items generated using the template.

Another general aspect is for a system that includes a memory comprising instructions and one or more computer processors. The instructions, when executed by the one or more computer processors, cause the one or more computer processors to perform operations comprising: presenting, in a user interface (UI), a template-selection with one or more templates, each template comprising a sequence of operations, each operation comprising a prompt for creating items using generative artificial intelligence (GAI) tools, each operation in the template being multimodal to be configurable to create text and configurable to create one or more images; detecting a selection of a template in the UI; and for each operation in the selected template: presenting, in the UI, the prompt associated with the operation; in response to receiving an input for the prompt, selecting a GAI tool based on a mode of the operation; providing the input to the selected GAI tool to generate the item for the operation; and presenting, in the UI, the generated item.

In yet another general aspect, a non-transitory machine-readable storage medium (e.g., a non-transitory storage medium) includes instructions that, when executed by a machine, cause the machine to perform operations comprising: presenting, in a user interface (UI), a template-selection with one or more templates, each template comprising a sequence of operations, each operation comprising a prompt for creating items using generative artificial intelligence (GAI) tools, each operation in the template being multimodal to be configurable to create text and configurable to create one or more images; detecting a selection of a template in the UI; and for each operation in the selected template: presenting, in the UI, the prompt associated with the operation; in response to receiving an input for the prompt, selecting a GAI tool based on a mode of the operation; providing the input to the selected GAI tool to generate the item for the operation; and presenting, in the UI, the generated item.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

Additionally, as used in this disclosure, phrases of the form "at least one of an A, a B, or a C," "at least one of A, B, and C," and the like, should be interpreted to select at least one from the group that comprises "A, B, and C." Unless explicitly stated otherwise in connection with a particular instance, in this disclosure, this manner of phrasing does not mean "at least one of A, at least one of B, and at least one of C." As used in this disclosure, the example "at least one of an A, a B, or a C," would cover any of the following selections: {A}, {B}, {C}, {A, B}, {A, C}, {B, C}, and {A, B, C}.

Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

What is claimed is:

1. A computer-implemented method comprising:
   providing, in a user interface (UI), a prompt tool for entering textual description of an item to be generated, wherein the prompt tool is interactive and configured to analyze the textual description to determine a type of item to be created, the item being one of an output text or an output image based on the textual description;
   detecting, by the prompt tool, a first input while interacting with the prompt tool, the first input being one of a special character entered in the textual description or a mouse action requesting assistance;
   in response to the first input, presenting a menu in the UI with options for the item to be generated;
   in response to detecting a selection of asset in the menu, obtaining a list of products previously added to a data store;
   providing the list of products for selection in the UI;
   in response to a selection of a product from the list of products, including text associated with the selected product in the textual description;
   detecting, by the prompt tool, submittal of the textual description;
   entering the textual description as input to a generative artificial intelligence (GAI) tool; and
   causing presentation in the UI of one or more items generated by the GAI tool.

2. The method as recited in claim 1, wherein including text associated with the selected product in the textual description comprises:
   utilizing special formatting for the included text in the textual description that has different formatting from text received from a user in the prompt tool.

3. The method as recited in claim 1, wherein the prompt tool is a guided experience following a rule-based flow to limit options presented based on input received.

4. The method as recited in claim 1, further comprising:
   detecting that the selected asset is associated with a custom model for the GAI tool that has been trained with data associated with the selected asset; and
   utilizing the custom model as the GAI tool for generating the one or more items.

5. The method as recited in claim 1, wherein the prompt tool provides an option to derive multimodal content from other pieces of content generated with the prompt tool.

6. The method as recited in claim 1, wherein the menu includes options comprising at least one of content type, asset, overlay type, camera scene, camera lens, camera film type, camera type, lighting style, color theme, image style, or photography style.

7. The method as recited in claim 6, wherein options for content type comprise at least one of photograph, drawing, sketch, or 3D render.

8. The method as recited in claim 6, wherein options for image style comprise at least one realistic, oil painting, pencil art, concept drawing, surrealism, matte, elegant, illustration, digital painting, graffiti, chalk, watercolor, beautiful, most beautiful image ever seen, trending, or epic composition.

9. The method as recited in claim 6, wherein options for subject comprise at least one of product, person, animal, or object.

10. The method as recited in claim 6, wherein options for lighting comprise at least one of accent lighting, ambient lighting, backlight, blacklight, blinding light, candlelight, concert lighting, crepuscular rays, direct sunlight, dusk, Edison bulb, electric arc, fire, fluorescent, glowing, glowing radioactively, glow-stick, lava glow, moonlight, natural lighting, neon lamp, nightclub lighting, nuclear waste glow, quantum dot display, spotlight, strobe, sunlight, ultraviolet, dramatic lighting, dark lighting, soft lighting, or gloomy.

11. The method as recited in claim 6, wherein options for context comprise at least one of indoor, outdoor, at night, sunset, in a park, or bridge in background.

12. The method as recited in claim 6, wherein options for lens comprise at least one of ultra wide-angle, wide angle, aerial view, massive scale, street level view, landscape, panoramic, bokeh, fisheye, dutch angle, low angle, extreme long-shot, long shot, close-up, extreme close-up, highly detailed, depth of field, 4k, 8k, ultra realistic, studio quality, or octane render.

13. The method as recited in claim 6, wherein options for details comprise at least one of highly detailed, grainy, realistic, unreal engine, octane render, bokeh, Vray, Houdini render, quixel megascans, depth of field, Arnold render, 8k, raytracing, CGI, lumen reflections, cgsociety, ultra realistic, volumetric fog, overglaze, analog photo, polaroid, 100 mm, film photography, DSLR, cinema4d, or studio quality.

14. A system comprising:
   a memory comprising instructions; and
   one or more computer processors, wherein the instructions, when executed by the one or more computer processors, cause the system to perform operations comprising:
      providing, in a user interface (UI), a prompt tool for entering textual description of an item to be generated, wherein the prompt tool is interactive and configured to analyze the textual description to determine a type of item to be created, the item being one of an output text or an output image based on the textual description;
      detecting, by the prompt tool, a first input while interacting with the prompt tool, the first input being one of a special character entered in the textual description or a mouse action requesting assistance;
      in response to the first input, presenting a menu in the UI with options for the item to be generated;
      in response to detecting a selection of asset in the menu, obtaining a list of products previously added to a data store;
      providing the list of products for selection in the UI;

in response to a selection of a product from the list of products, including text associated with the selected product in the textual description;

detecting, by the prompt tool, submittal of the textual description;

entering the textual description as input to a generative artificial intelligence (GAI) tool; and causing presentation in the UI of one or more items generated by the GAI tool.

15. The system as recited in claim 14, wherein including text associated with the selected product in the textual description comprises:

utilizing special formatting for the included text in the textual description that has different formatting from text received from a user in the prompt tool.

16. The system as recited in claim 14, wherein the prompt tool is a guided experience following a rule-based flow to limit options presented based on input received.

17. The system as recited in claim 14, wherein the instructions further cause the one or more computer processors to perform operations comprising:

detecting that the selected asset is associated with a custom model for the GAI tool that has been trained with data associated with the selected asset; and utilizing the custom model as the GAI tool for generating the one or more items.

18. The system as recited in claim 14, wherein the prompt tool provides an option to derive multimodal content from other pieces of content generated with the prompt tool.

19. A non-transitory machine-readable storage medium including instructions that, when executed by a machine, cause the machine to perform operations comprising:

providing, in a user interface (UI), a prompt tool for entering textual description of an item to be generated, wherein the prompt tool is interactive and configured to analyze the textual description to determine a type of item to be created, the item being one of an output text or an output image based on the textual description;

detecting, by the prompt tool, a first input while interacting with the prompt tool, the first input being one of a special character entered in the textual description or a mouse action requesting assistance;

in response to the first input, presenting a menu in the UI with options for the item to be generated;

in response to detecting a selection of asset in the menu, obtaining a list of products previously added to a data store;

providing the list of products for selection in the UI;

in response to a selection of a product from the list of products, including text associated with the selected product in the textual description;

detecting, by the prompt tool, submittal of the textual description;

entering the textual description as input to a generative artificial intelligence (GAI) tool; and causing presentation in the UI of one or more items generated by the GAI tool.

20. The non-transitory machine-readable storage medium as recited in claim 19, wherein including text associated with the selected product in the textual description comprises:

utilizing special formatting for the included text in the textual description that has different formatting from text received from a user in the prompt tool.

\* \* \* \* \*